United States Patent
Sieracki et al.

(10) Patent No.: US 10,235,588 B1
(45) Date of Patent: *Mar. 19, 2019

(54) SYSTEM AND METHOD FOR ADAPTIVELY CONFORMED IMAGING OF WORK PIECES HAVING DISPARATE CONFIGURATION

(71) Applicant: REALITY ANALYTICS, INC., New York, NY (US)

(72) Inventors: Jeffrey Mark Sieracki, Clarksville, MD (US); John J. Dellomo, Silver Spring, MD (US)

(73) Assignee: Reality Analytics, Inc., New York, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/018,566

(22) Filed: Feb. 8, 2016

Related U.S. Application Data

(63) Continuation of application No. 13/858,939, filed on Apr. 8, 2013, now Pat. No. 9,258,550.
(Continued)

(51) Int. Cl.
*G06K 9/32* (2006.01)
*G06K 9/18* (2006.01)
(Continued)

(52) U.S. Cl.
CPC ....... *G06K 9/3233* (2013.01); *G06K 9/00362* (2013.01); *G06K 9/18* (2013.01);
(Continued)

(58) Field of Classification Search
CPC .... G06K 9/3233; G06K 9/00362; G06K 9/46; H04N 13/0296; H04N 13/0282
See application file for complete search history.

(56) References Cited

U.S. PATENT DOCUMENTS

| 5,864,640 A | 1/1999 | Miramonti et al. |
| 6,917,700 B2 | 7/2005 | Schuler et al. |

(Continued)

FOREIGN PATENT DOCUMENTS

| WO | 9960525 A1 | 11/1999 |
| WO | 0214982 A2 | 2/2002 |

OTHER PUBLICATIONS

Martin Labrecque, Muttee Sheikh, Jill San Luis, Benzakhar Manashirov, Mohammed Elsayed, Automated Embedded Optical Object Recognition, Innovate Canada FPGA Programming Competition, 2008.
(Continued)

*Primary Examiner* — Chan Park
*Assistant Examiner* — Elisa Rice
(74) *Attorney, Agent, or Firm* — Rosenberg, Klein & Lee

(57) ABSTRACT

A system is provided for adaptively conformed imaging of work pieces having disparate configurations, which comprises a mount unit for holding at least one work piece, and an imaging unit for capturing images of the work piece held by the mount unit. At least one manipulator unit is coupled to selectively manipulate at least one of the mount and imaging units for relative displacement therebetween. A controller coupled to automatically actuate the manipulator and imaging units executes scene segmentation about the held work piece, which spatially defines at least one zone of operation in peripherally conformed manner about the work piece. The controller also executes an acquisition path mapping for the work piece, wherein a sequence of spatially offset acquisition points are mapped within the zone of operation, with each acquisition point defining a vantage point for the imaging unit to capture an image of the work piece from.

18 Claims, 78 Drawing Sheets
(47 of 78 Drawing Sheet(s) Filed in Color)

Related U.S. Application Data

(60) Provisional application No. 61/801,010, filed on Mar. 15, 2013, provisional application No. 61/621,570, filed on Apr. 8, 2012.

(51) Int. Cl.
  *G06K 9/46* (2006.01)
  *G06K 9/00* (2006.01)
  *H04N 13/282* (2018.01)
  *H04N 13/296* (2018.01)

(52) U.S. Cl.
  CPC .............. *G06K 9/46* (2013.01); *H04N 13/282* (2018.05); *H04N 13/296* (2018.05)

(56) References Cited

U.S. PATENT DOCUMENTS

| | | | |
|---|---|---|---|
| 7,039,219 B2 | 5/2006 | Liu et al. | |
| 7,212,656 B2 | 5/2007 | Liu et al. | |
| 2004/0057613 A1 | 3/2004 | Noto et al. | |
| 2004/0165775 A1* | 8/2004 | Simon | G06K 9/6211 382/181 |
| 2008/0287790 A1* | 11/2008 | Li | A61B 8/12 600/437 |
| 2009/0091566 A1* | 4/2009 | Turney | G02B 21/006 345/419 |
| 2009/0238434 A1 | 9/2009 | Feke et al. | |
| 2010/0141752 A1 | 6/2010 | Yamada et al. | |
| 2010/0254592 A1 | 10/2010 | Cheng | |
| 2011/0181591 A1 | 7/2011 | Benitez et al. | |
| 2013/0287286 A1* | 10/2013 | Zingaretti | G06T 7/0004 382/141 |

OTHER PUBLICATIONS

Jose J. Esteve-Taboada, David Mas, Javier Garcia, Three-dimensional object recognition by Fourier transform profilometry, Applied Optics, vol. 38, No. 22, Aug. 1, 1999.

Tien-Hsin Chao, Hanying Zhou, George Reyes, High-Speed Optical Object Recognition Processor With Massive Holographic Memory, Proc. SPIE 4929, Optical Information Processing Technology, 237 (Sep. 16, 2002).

Qing Chen, Emil M. Petriu, Optical Character Recognition for Model-based Object Recognition Applications, In: Proc. HAVE 2003—IEEE Intl Workshop on Haptic, Audio and Visual Environments and their Applications, Ottawa, ON, Canada, Sep. 2003.

Horia Vlad Balan, Visual Object Recognition in RoboCup, Bachelor Thesis, Bremen, May 6, 2004.

\* cited by examiner (a) (b)

3D scene segmentation maps image features and domain knowledge to identify key elements and to plan high-detail image acquisition paths.

(c)

Label elements are captured at multiple useable angles, flattened and enhanced for optimal OCR.

(B1)

(B2)

(B3)

(B4)

SYSTEM AND METHOD FOR ADAPTIVELY CONFORMED IMAGING OF WORK PIECES HAVING DISPARATE CONFIGURATION

RELATED APPLICATION DATA

This Application is Continuation of patent application Ser. No. 13/858,939, filed 8 Apr. 2013, which is based on Provisional Patent Application No. 61/621,570, filed 8 Apr. 2012 and Provisional Patent Application No. 61/801,010 filed 15 Mar. 2013.

BACKGROUND OF THE INVENTION

The present invention is directed to a system and method for processing signal data for signature detection. More specifically, the system and method are directed to adaptively conformed imaging of work pieces which may be of disparate configuration. In various embodiments and applications, the system and method provide for such adaptively conformed imaging in automated manner to build an electronic database of specimens or other targeted items sufficient not only for quick and efficient indexing for reference purposes, but also for image based identification and taxonomic classification purposes, among others.

In certain illustrative applications, the system and method operate upon work pieces comprising pinned biological specimens such as insects and the like. One class of such specimens includes specimens from man-made collections which are maintained over many years, often being organized and re-organized during the period. While a typical range of configurations is observed, the consistency of these specimens is hardly precise by machine handling standards, and generally tend to widely vary over time, depending on the curation personnel and procedures at hand and the degree/frequency of user access.

Typically, collected specimens in these contexts are pinned work piece assemblies—that is, impaled on a pin support, usually along with corresponding labels bearing the specimens' identity and/or other descriptive information. It is a relatively easy task for a human user to intelligently examine such a work piece assembly, identifying which parts of it are of interest, which parts of it constitute support structure, and where (if anywhere) it is labeled. The same task is extremely difficult for an automated machine. In particular, if a human user wishes to measure, image, or otherwise collect data on such specimen, they must intelligently assess the item, determine how they can orient it to see the subject of interest and how they can orient it to read and record information from any label that may be attached.

As a practical example, consider FIG. 1A which shows examples of insects from storage drawers at a facility, within a typical, large institutional collation, that houses millions of such specimens. Note that although the drawers appear reasonably well organized from a human point of view, they are in fact highly disorganized from a machine processing point of view. Insect specimen pins are not located at regular intervals, wings and support structures lean and overlap, and the individual pinned insect configurations vary widely. Note also that the insect mounting structures vary significantly from one another. In some cases, the insect specimens are impaled but on a single pin, in others, they are impaled on a sub-pin (termed "minutin" in the art) coupled to a main pin. In other cases, the insect specimens are supported on a piece of form or paper tab. Generally, labels are situated under the insect specimen, but the format, size and angle of labels vary significantly, as do the writing or print found thereon, which may range, for example, from 17th century handwriting to laser printing. In some cases, multiple stacked labels are provided for the same specimen.

While a human handler can easily recognize where the insect specimen is mounted and where the label is located, it is an extremely challenging task for a machine system to make the same distinctions. There are no suitable measures known in the art for sufficiently automated handling of such specimen work pieces to automatically capture and record high-resolution images of the specimens and their label data. The task of recognizing a target of interest (the specimen) in an arbitrary supporting structure, and determining how to image the target within appropriate limits to preserve visual angles and avoid collisions with the work piece, remain remains a significant challenge in the art. In addition, the ability to recognize, isolate, and capture a label on a work piece within these limits, and doing so in a manner that optimizes post-facto readability (either by a human or by Optical Character Recognition (OCR)) remains another great challenge in the art.

Potential applications of data recovered from collected specimens such as those shown in FIG. 1A are significant as biological collections are largely untapped sources of valuable data. Each specimen records an anatomical variety of a species captured at a particular space and time. Large digital databases of insect specimens, vast in geographic, historical, and anatomical scope, may help answer previously intractable questions. For example, geo-location forensics is one emerging application in national intelligence and criminal justice. One publicized murder conviction in 2007 rested partly on the identity and geographic origin of insects found on the front grill of a rental car. Similarly, the identity of insects picked from the front grill of a vehicle intercepted at a terrorist facility may provide insight into where the vehicle had been and when, if the specimen can be quickly and accurately identified without other extraneous knowledge as to the insects or their indigenous characteristics. Forensic benefits may be realized also from insects or insect parts recovered from clothing, baggage, individuals, or even explosive devices.

Insects and related arthropods are also known to vector some of the most globally important and deadly diseases. Mosquitoes vector malaria, filariasis, dengue fever, St. Louis encephalitis, West Nile virus, and Eastern and Western equine encephalitides, yellow fever, which collectively result in millions of deaths each year. Ticks, sand flies, assassin bugs, and tse-tse flies are but a few of the other well-known disease vectors. Electronic insect specimen databases established with a suitable measure of consistency and uniformity would provide epidemiologists knowledge of current and past distributions of disease vectors, and facilitate the modeling of potential ranges for both vector and disease, given weather disturbances, global climate change, or other likely perturbations to insect vector distributions. Moreover, the ability to detect anomalies may provide early warning of significant threats, whether natural or manmade.

In US agriculture, billions of dollars are lost annually to crop damage or spent on combating pests. Exotic invasives arrive on a regular basis. The soybean aphid, Asian longhorn beetle, Asian tiger mosquito, emerald ash borer, gypsy moth, Argentine fire ant, Japanese beetle, citrus psylla, and medfly are just a few of the many exotic pestiferous insect species causing significant economic damage. Electronic specimen databases may provide readily accessible information as to the likely origins of such exotic pests. This information may then be used to seek biological control agents in the country and locality of origin, and give immediate insight into the pest's biology, aiding the development of control methods.

For these and other reasons, accurately and consistently digitizing specimen records in standardized manner from natural history collections is a critical task. Such data would be crucial for documenting species declines or extirpations, the historical presence of particular species, changes in species distribution, or range expansion of invasive species. Ecological restoration, assessments of biodiversity, conservation, and the documentation and prediction of the effects of global climate change all require these historical and modern insect records.

The aforementioned applications all rely on accurate insect species identification. Presently, professional taxonomists are employed to identify specimens. One of the principle functions of the USDA Systematic Entomology Laboratory, for example, is to identify "urgents," insects intercepted at US ports of entry whose identity may determine the fate of inspected cargo, which often may be worth millions of dollars. Standardized image capture and processing can support automated means of insect identification, modernizing and relieving systems now reliant on a shrinking and aging taxonomist workforce, and increasing the speed of identification where timely diagnoses are increasingly needed, such as in intelligence operation and port intercept applications.

To enable the advances discussed above, massive insect collections must be digitized; the Smithsonian Institute alone presently houses over 35 million specimens. These specimens are irregularly sized, mounted and labeled to a variety of standards, housed in tightly packed drawers, in compactor-cabinet rooms having a combined footprint that could be measured in acres.

Yet, current digitizing practices rely almost exclusively on human labor, with individuals manually typing in label contents. Typical data entry proceeds at a rate and cost wholly incapable of handling the enormous numbers of specimens. At 5 minutes per specimen for an experienced pair of curators to mount, illuminate, obtain clear photographs at several angles, and manually enter the textual information into a computer database, it would take over 300 years to digitize the existing Smithsonian collection. High-resolution photography often adds upwards of a half hour per specimen.

At present, there is no feasible way to rapidly digitize and catalog these specimens. Even new specimens cannot be photographed and recorded as fast as they arrive. Slide- or flatbed-scanners are sometimes employed in the rare circumstances where smaller, soft-bodied specimens are preserved on microscope slides. Certain known devices have been used for recording and cataloging pinned specimens; however, they record and catalog drawer contents en masse and do not provide for any high-quality individual specimen imagery, nor provide for any label data capture. Nor do such known devices provide any possibility at all of imaging the bulk of specimen surfaces that are simply not visible when packed in a box or drawer.

There is therefore a need for a system and method whereby non-standard, or irregularly configured work pieces such as these pinned specimens may individually be electronically imaged, recorded, and cataloged in standardized manner There is a need for such system and method by which standardized imaging and recording of the specimen data may be accomplished in automatic yet adaptively conformed manner for disparately configured work pieces.

There is a need for such system and method which may carry out the standardized imaging and recording quickly and efficiently.

Insects serve as just one example of specimen collections needing digitization in this regard. Other biological specimen collections have similar significant and important applications that can be enabled by large scale digital capture. Natural collections, archived object collections, and forensic examinations are other areas where massive digital capture would potentially enable watershed changes in the art.

Typical high-throughput robotic handling systems used in manufacturing and other settings rely largely on standardization of the work pieces. Parts handled are machine made or mounted in highly standardized handling units. Adaptive handling is employed for some items of moderate variation—such as fruit, for example—but these pieces are substantially similar in their geometric configuration and handling is not typically required to be millimeter precise. Thus, the need for adaptive, fine scale manipulation of parts not inherently designed or labeled for mechanized handling.

A general need arises in any instance where it becomes desirable to adaptively manipulate a class of work pieces with variable configuration, and in particular, where such manipulation is dependent upon an automated identification of specific target features within a composite work piece (such as a specimen, a region of a specimen, a label, etc.) so that the target feature may be precisely imaged or otherwise treated while avoiding interference from the remainder of the work piece.

SUMMARY OF THE INVENTION

It is an object of the present invention to provide a system and method for automatic yet adaptively conformed imaging of disparately configured work pieces.

It is another object of the present invention to provide a system and method for substantially standardized imaging and recording of specimen data from specimen work pieces of disparate configuration.

It is yet another object of the present invention to provide a system and method for automatically imaging, recording, and cataloguing data captured from physical specimen work pieces in an electronic database for subsequent access in image based identification and taxonomic classification of unknown specimens.

These and other objects are attained by a system formed in accordance with certain embodiments of the present invention system for adaptively conformed imaging of work pieces having disparate configurations. The system comprises a mount unit for holding at least one work piece, and at least one imaging unit for capturing images of the work piece held by the mount unit. At least one manipulator unit is coupled to selectively manipulate at least one of the mount and imaging units for relative displacement therebetween. A controller is coupled to the manipulator and imaging units. The controller automatically actuates the manipulator and imaging units to execute scene segmentation about the held work piece, wherein at least one zone of operation is spatially defined in peripherally conformed manner about the held work piece. The controller also executes an acquisition path mapping for the held work piece, wherein a sequence of spatially offset acquisition points are mapped within the zone of operation, with each acquisition point defining a vantage point from which the imaging unit captures an image of the held work piece.

A system formed in accordance with certain embodiments of the present invention provides for adaptively conformed imaging of specimen work pieces having disparate multi-featured pinned configurations. The system comprises a mount unit including at least one pin holder for securing at least one specimen work piece thereto, and an imaging unit for capturing images of the specimen work piece held by the mount unit. At least one robotic manipulator unit is coupled to selectively manipulate at least one of the mount and imaging units for relative displacement therebetween. A controller is coupled to the manipulator and imaging units. The controller automatically actuates the manipulator and imaging units to execute three-dimensional scene segmentation about the held specimen work piece, wherein at least one zone of operation is spatially defined in peripherally conformed manner about the held specimen work piece. Such scene segmentation includes reference imaging, wherein the imaging unit is actuated to acquire a plurality of reference images of the held specimen work piece from different aspect angles. Scene segmentation further includes feature discovery, wherein the reference images are processed to distinguish discrete features of the held specimen work piece, where the discrete features include a pin, and a specimen and label respectively impaled thereon. The controller also executes an acquisition path mapping for the held specimen work piece, wherein a constellation of spatially offset acquisition points are mapped about the held work piece within the zone of operation. Each acquisition point defines a vantage point for the imaging unit to capture an image of the held specimen work piece therefrom.

A method formed in accordance with certain other embodiments of the present invention provides for adaptively conformed imaging of work pieces having disparate configurations. The method comprises securing at least one work piece on a mount unit, and establishing at least one imaging unit for capturing images of the work piece held by the mount unit. At least one manipulator unit is established to selectively manipulate at least one of the mount and imaging units for relative displacement therebetween. A controller coupled to the manipulator and imaging units automatically actuates the manipulator and imaging units to execute scene segmentation about the held work piece, wherein at least one zone of operation is spatially defined in peripherally conformed manner about the held work piece. The controller also executes an acquisition path mapping for the held work piece, wherein a sequence of spatially offset acquisition points are mapped within the zone of operation, with each said acquisition point defining a vantage point from which the imaging unit captures an image of the held work piece.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The subject system and method are generally directed to the field of signal and image processing and feature detection, and incorporates elements relating to the field of robotic path planning and other fields involving mechanized, autonomous handling. The subject system and method include automatically and rapidly assessing a free-form physical specimen work piece in order to enable high-throughput, automated digitization thereof using imaging or other sensor scanning approach.

The system and method provide for situations where only certain portions of the work piece are of interest as a target for such acquisition, and the locations of the targeted portions on the work piece are not precisely standardized. Certain embodiments find particular application in machine vision, in robotic path planning, in adaptive imaging, and in holding and manipulating work piece specimens at various orientations to adaptively conform the imaging on-the-fly to the particular configuration defined by given work piece features. In accordance with certain aspects of the present invention, the discovery and capture of label information are carried out in certain embodiments in view of 3-D modeling for the work piece portions, with processing to adaptively compensate the captured label information to optimize label readability both for human users and optical character recognition (OCR) systems.

High-throughput industrial robotic systems known in the art typically leverage standardization of work pieces, and/or work-piece containers, in order to achieve certain efficiencies. Thus standardized work piece units (test tubes, boxes, cans, electrical components, etc.) may be located, placed, and manipulated quickly using software controlled systems that are highly tuned to the work piece shape, size, and configuration. Simple sensors and basic machine vision systems are well suited to a highly modularized and standardized work environment. Often, these environments are further augmented by organizing work pieces in standardized pallets, placed in Cartesian grids so that a machine can be programmed to know exactly where the materials are located without even requiring a sensor. No adaptation measures are taken nor even needed because of the standardized work piece configuration.

In contrast, there are myriad non-standardized work pieces that cannot easily be handled by such systems. This includes older components that are not designed for machine handling, arbitrary shaped objects that are not manufactured to tight specifications or that are natural (non-manmade) items, or that are produced by a randomized process. In addition to issues of variation in shape and configuration, such work piece specimens are generally not labeled for machine handling, with for example, a barcode, RF tag, or even a precisely defined written label.

Figure 1A:
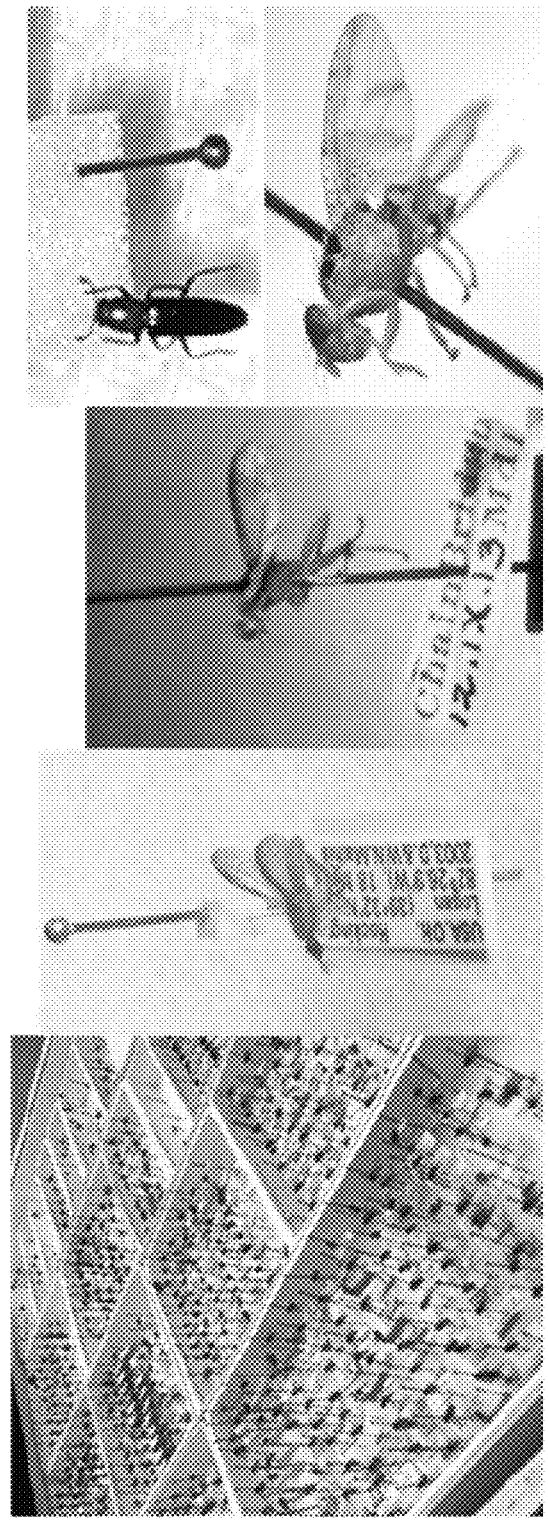
FIG. 1A is a set of photographic views illustrating various specimen work pieces to be adaptively imaged in accordance with certain embodiments of the present invention.

In general concept, the present invention is related to an imaging system and method. In particular, it is related to an automated imaging/data collection system and method for specimens of various types in various contexts. The example particularly illustrated in FIG. 1A relates to insect specimen work pieces which are typically (though typically not with precise uniformly or consistency) held in a certain general manner, namely with a main pin on which an insect or other specimen is impaled. The specimen is impaled on the pin to be relatively situated toward the head or uppermost part of the pin. Beneath the insect, a label is impaled which gives various information pertaining to that particular specimen.

In archival systems within large institutions and museums, there is a multitude of such specimens collected over the years lined in drawers. A plethora of storage drawers stacked one on top of each other within shelves, packed into compactor drawers, in large warehouse structures house an enormous collection of such specimen assembly (collectively referred to herein as "specimen" or "work piece"). Large collections may hold tens of million of specimens, yet their cataloging is often rudimentary. For example, many different related examples of a species are stored in general areas so a person in search of a particular specimen will have to spend quite a bit of time and effort not only to find the appropriate drawer but also to locate specimens of interest within that drawer. It is a chore to find a specimen of interest, and a further chore to remove this specimen to an appropriately equipped examination area so that it may be mounted, magnified, and lit for examination.

One of the applications of the present system and method is to go through a digitizing process where each of these species and/or each of these specimens may be individually catalogued and indexed for quick and accurate automated location. Ideally, a user wanting to locate some specimen of a specific subspecies from a specific geographic region collected in, say, March of 1953, could look it up for prompt direction to the exact drawer which houses the specimen. To automate cataloging of the appropriately indexed specimens, the subject system and method employ a photo capturing or other imaging unit which is robotically driven, preferably, and controlled to handle and process specimen work pieces individually, and to do so with sufficient simplicity and speed to make the cataloguing task not only feasible but quite manageable.

Furthermore, the specimens may, by use of the subject system and method in certain exemplary embodiments, not only be cataloged but also imaged rapidly, accurately, from numerous angles, and at high resolution. Thus, the subject system and method provide the user not only with a digital catalog of indexed specimens, but in many instances will enable the user to entirely avoid retrieval of the physical specimen for their work. The user is thereby freed from the tedious retrieval process, and possibly even saved the trouble and expense of having to travel to the collection. The user may comfortably review these digital databases from anywhere in the world using a network connected computer device.

It will be appreciated that the subject system and method may be suitably configured to handle a pallet or conveyor feed for combined/concurrent processing of more than one specimen work piece, depending on the particular applications. The subject system and method serves to reduce handling time for individual specimen cataloging from tens of minutes per specimen down to seconds per specimen; however, for fully automated digital capture of tens of millions of insect specimen work pieces within a major collection, it may be preferable even with the advantages of the subject system and method to implement using multiple systems operating in tandem and automatically fed Specific embodiments of the subject invention are directed, without limitation, to the handling and work-piece-adaptive, 3-D oriented image capture of various work pieces having disparate configurations. One example of such disparately configured work pieces is found in pinned insect specimens, such as are found in museums and biological collections. It will be apparent to one skilled in the art that other work piece types may be handled according to certain aspects of the present invention. The subject system and method may be adapted to different applications to accommodate such differences as the available domain knowledge, system size and scale, and attachment measures for the work piece specimen to a manipulator (if the work piece, not an imaging unit, is to be moved).

Further examples of disparately configured work pieces include other biological specimens (birds, reptiles, mammals, fish, etc.); geological specimens including rocks, fossils, minerals, etc.; manmade specimens including archeological items, works of art, collected items in archives and so forth. Outside the area of archival and museum specimen digitization, the subject system and method may also be employed in evidence handling for forensic purposes, including for example found items, bomb or ballistic fragments, bone or bone fragments, vehicle wreckage, and the like. In those embodiments where the work piece is moved relative to an imaging unit, the system and method may be adapted to accept other than pin-mounted objects simply by replacement of one manipulator end effector with another. In addition to arbitrary physical objects, embodiments in certain applications may be suited to also handle specialized items such as slide mounted specimens, or items held or preserved in clear containers such as vials, jars, or test tubes. Thus while exemplary embodiments illustratively disclosed herein are configured for pinned insect specimen work piece handling, the term "specimen" or "work-piece specimen" are, unless otherwise specified, used herein to generally mean any item for which the subject invention might reasonably be adapted to manipulate.

The subject system and method incorporate imaging equipment. This includes standard optical imagery, as well as imagery by any other suitable means known in the art, by which to a 2-D pixel referenced data set may be generated. This includes, but is not limited to, infrared (IR), ultraviolet (UV), radio frequency (RF) aperture sensing and other electromagnetic modality equipment, as well as acoustic, laser scanning, and multi- or hyper-spectral systems. The term "imagery" is used generally herein, and the word "illumination" herein means not only optical light but the application of any energy source appropriate to the scanning/sensing modality employed. Such imaging may be enhanced by appropriate focusing aparti (e.g., macroscopic or microscope lenses in optical, shaped antennas or apertures in RF, etc.). In addition, the system can, as will be apparent to one skilled in the art, be used to capture other, non-imaging data about a work-piece specimen during the manipulation of one relative to the other.

Figure 1B:
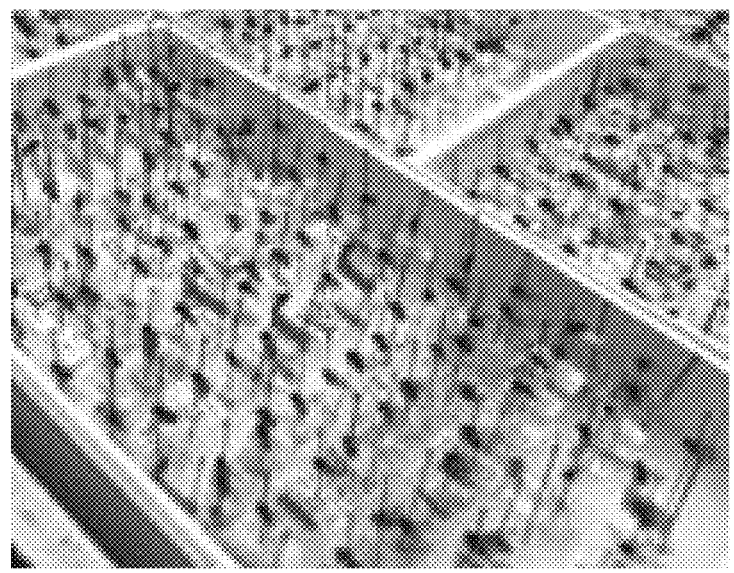
FIG. 1B is a schematic diagram illustrating the application of a system formed in accordance with an exemplary embodiment of the present invention to operate on specimen work pieces of the type illustrated in FIG. 1A.
Figure 1B:
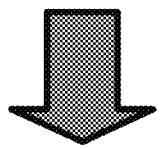
Figure 1B:
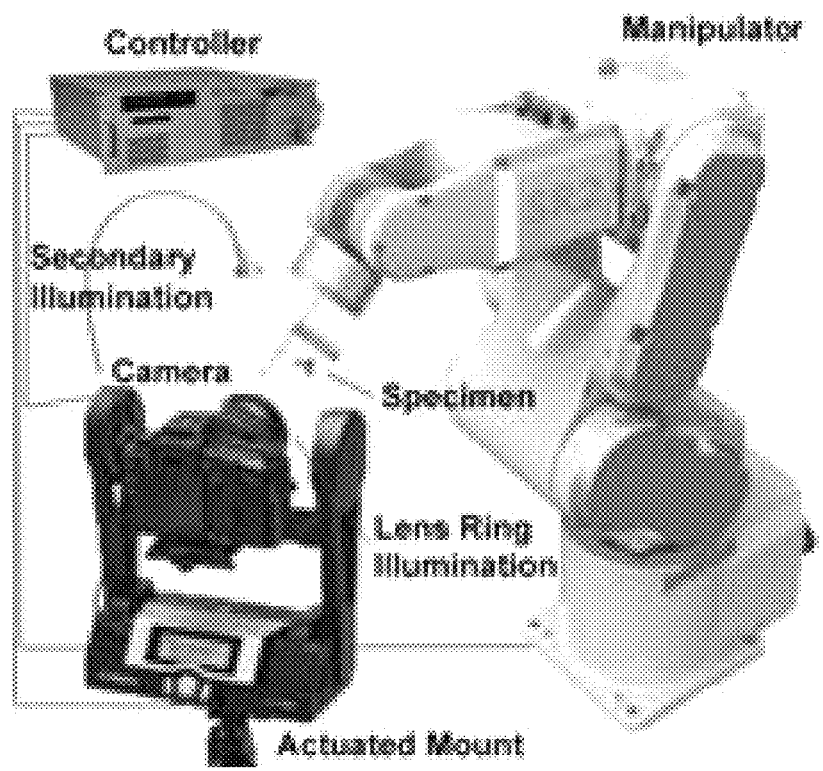

Referring to FIG. 1B, there is shown one exemplary embodiment of an imaging system formed in accordance with the present invention. In this example, the system enables accurate yet safe automated handling of pinned specimen work pieces. The system automatically effects rapid and unobscured imaging (capture and recording) of the specimen at high-resolution, along with its label data. The system operates to first recognize a target(s) of interest (the specimen and label, for instance) in an arbitrary supporting structure, and adaptively determines how to image such target while maintaining direct unobstructed views thereof, and without colliding either with the work piece or with any other surrounding structure. The system preferably does the same to image not only the specimen, but also its label. In connection with the label, moreover, the system optimizes the post-facto readability of the information borne on the label (to support subsequent examination either by a human or by OCR) by processing its image according to the adaptive framework established for imaging the targets.

When suitably implemented in an exemplary embodiment, the system may be employed to automatically and rapidly digitize large pinned-insect collections. A collection the size of the Smithsonian's (some 30 Million+), for example, could be completed using the system well within a five year timeframe. This would require digitizing roughly 13 insect specimen work pieces per minute, or one insect specimen every 4.5 seconds. To achieve this goal, multiple systems may be operated, each fed by automated pick-and-place loaders, with human operators quickly feeding the contents of entire storage trays to the digitizer. The system will automate digitizing of the specimen labels, marking them with barcodes, RFID tags, and/or other indicia so that future tracking would not require OCR.

In the exemplary embodiment illustrated in FIG. 1B, the system preferably includes a multi-axis manipulator unit (having at least 2-axis motion). For example, the unit may include a robotic arm manipulator of a suitable type known in the art, which preferably picks up one individual specimen work piece at a time and moves and re-orients it with respect to an imaging unit which is supported on an actuated mount. In this embodiment, the imaging unit is implemented in the form of a photo-sensor based device such as a digital camera. The camera is held stationary during an imaging session, while the specimen work piece is moved by the robotic arm manipulator about the camera between imaging shots. The system further includes a controller operably coupled as shown to control both the robotic arm manipulator and the camera. The controller is preferably also coupled to control the actuated mount for re-positioning and/or re-orientation of the camera for adjustment purposes. The equipment used to implement the disclosed system may be of any suitable type known in the art appropriate for the particularly intended application.

As shown, each specimen work piece in the illustrated application includes a pin which impales both the insect specimen (or other categorized and indexed target of interest) and its identifying/descriptive label, the overall assembly being collectively referred to herein as the work piece. The mechanical operation of the robotic arm will not be exactly consistent each time it goes to pick up a work piece. For example, the insect or other such target/specimen in question may be separated from the label by varying distances. The insect may be located further up the pin in some specimen work pieces than others, and it may not be uniformly centered for all work pieces. Additionally, the specimens themselves may vary quite a bit from one another in type and bodily configuration. For instance, some specimens may be organic while others may be non-organic; and, they may be of various sizes.

The "pin," illustrated within the context of the exemplary system embodiment disclosed, is just one example of numerous possible mounting structures, the purpose of which is to join, approximately organize, and/or provide handling points for the actual salient features of the work piece. In this case, the salient features include the insect specimen and its associated label or labels. Other insect specimens (and/or labels) may be mounted on other structures (e.g., slides, vials, etc.). Yet other biological specimens may use larger, different mounting structures which serve similar purposes, and still other work pieces (whether organic or otherwise) served by other embodiments of the subject system may either be mounted on appropriate structures or, in certain instances, may be safely handled directly by an appropriate end-effector. Regardless, the subject system and method are employed to find salient features within the overall work piece, and to adaptively conform handling and imaging to the individual configuration of each.

Considering that the structure of the specimen itself and the corresponding work piece will vary from one specimen to another, the robotic manipulator first segments the scene in accordance with certain aspects of the present invention. As described in following paragraphs, this scene segmentation of the work piece enables the system to distinguish the discrete features of the work piece. In the example shown, the distinguished features preferably include the pin, specimen, and label; and, scene segmentation discovers the respective spatial extent and relative positions/orientations of the features, geometrically modeling the same three dimensionally. This scene segmentation carried out in the illustrated example includes a quick, preliminary photographic capture session, wherein the work piece is positioned and oriented at various points in space about the camera and the camera actuated to capture several reference images (generally two but preferably three to five) of the work piece from different aspect angles. The controller executes scene segmentation processing based on the reference images to define a zone of operation which delineates limits for work piece movement relative to the camera to preserve clear line of sight to the specimen and label and to ensure sufficient clearance to avoid collisions with either the work piece or any other surrounding structure (such as portions of the robotic arm manipulator itself).

After scene segmentation based on the reference images, the system carries out a more detailed data acquisition process (in the form of further photographic capture, within the illustrated embodiment). The system maps an image acquisition path within the zone of operation about the features distinguished during scene segmentation. The acquisition path is formed by a sequence of acquisition points from which images are respectively captured of certain of the features. The work piece is manipulated in the illustrated embodiment to situate the camera at all or selected ones of the acquisition points relative to the target features of the individual work piece and there actuated to capture a series of images for the specimen. Preferably, one acquisition path is generated and followed to image the specimen, and another acquisition path is generated and followed to image the label. Fewer acquisition points are typically required for the label than for the specimen, since only one or two views of the label may be necessary to ascertain the information borne thereon.

In accordance with certain aspects of the present invention, the system works adaptively in this manner to examine work pieces that do not share a standardized configuration. The system then prescribes one or more acquisition paths customized according to the features discovered in the work piece, and follows the corresponding path to capture a series of images for each feature of interest (like the specimen and label). Unlike many robotic applications which deal with standardized work pieces, settings, and tasks, the subject system accurately yet quickly adapts itself to the particular task necessitated by the particularly nuanced configuration of each individual work piece.

Within even the same specimen work piece, various misalignments could occur with repeated handling. For example, the label could be displaced or additional labels may be added, the pin could be adjusted, and the angle at which the insect itself is held could be disturbed. In some instances, the specimens may even be removed from a pin for closer inspection by an entomologist, then returned and remounted. Additionally, the loading of specimen work pieces onto the system may not be uniform from one session to the next. The subject system negates the potentially adverse effects of such variations by adaptively mapping the acquisition path to be followed based upon scene segment of each work piece to be imaged, recorded, and cataloged.

Two exemplary measures for securely loading a specimen work piece onto the system are shown in FIG. 19. One of the illustrated mechanisms includes a pin vice which coaxially clamps the work piece pin much in the same manner that a drill chuck would grip a bit. While this mechanism consistent in providing coaxial hold of pinned work pieces, it is still vulnerable to small misalignments when the clamping blades do not engage pins squarely. Furthermore, the pin vice provides no mechanical enforcement of the rotation angle (about the pin) at which a pin is loaded; this will also vary from instance to instance. The other mechanism shown is a foam based device favored by many entomologists. The foam gripping mechanism employs what equates to a cylinder filled with high density foam. The pin is inserted into the cylinder without an angular guide or support. Hence, pins tend to be inserted at arbitrarily varied angles. Quite a bit of variance may result from one loading to another, highlighting the benefits of scene segmentation processing adaptively carried out by the system for each work piece to be imaged. Such processing enables adaptively conformed imaging of work pieces despite their different configurations. This yields a degree of imaging standardization that facilitates comparative referencing and analysis of captured specimen images in a collection database. These work piece mounting mechanisms are examples, and other suitable types may be employed, including for instance actuated pinching devices, suction tubes, or other effectors known in the art which may replace the pin-vice, and so forth. Note that the mounting mechanisms are illustrated both in end-effector configurations (under which they are mounted to the end of a manipulator arm) and table-mount configurations (used in an alternate configuration where the imaging unit rather than the work piece is manipulated). The issues of variations in holding angle, however, are relevant in either mode of operation.

Figure 9A:
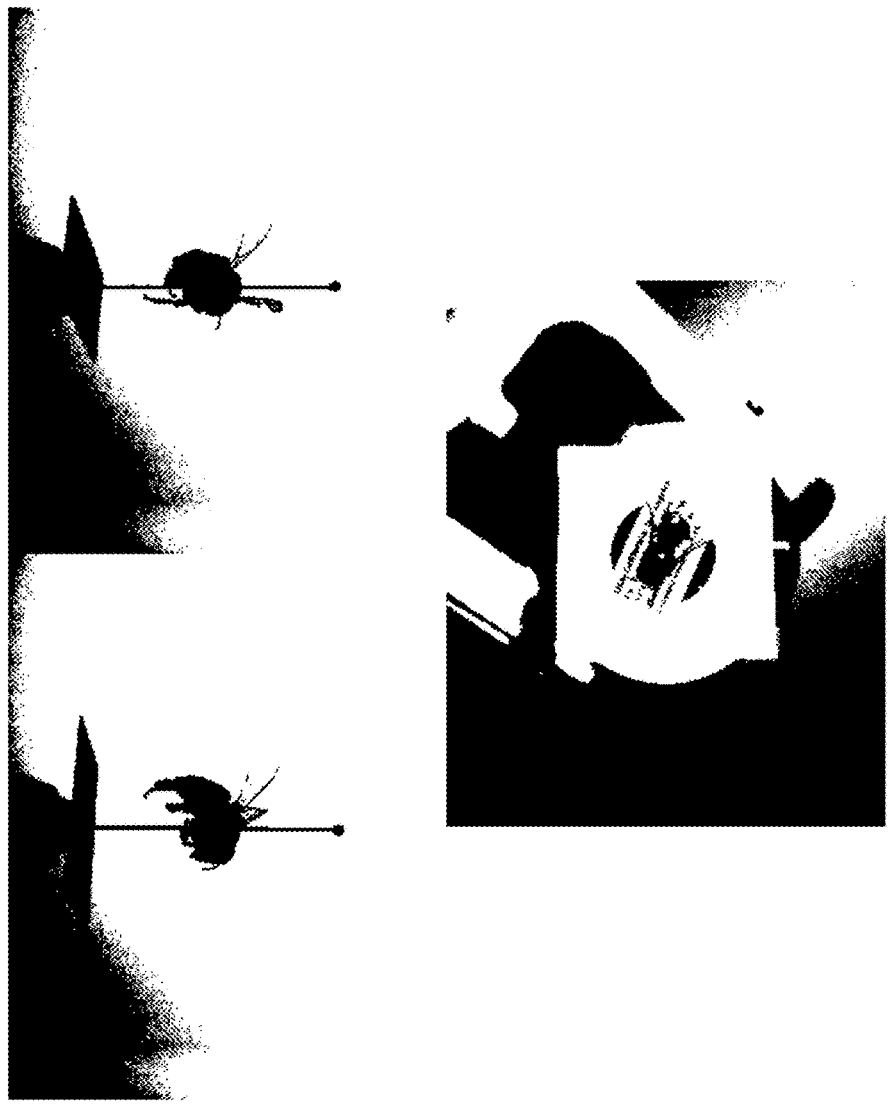
FIG. 9A is a set of silhouetted reference images captured in a scene segmentation process carried out in accordance with an exemplary embodiment of the present invention with respect to an insect specimen work piece.
Figure 9B:
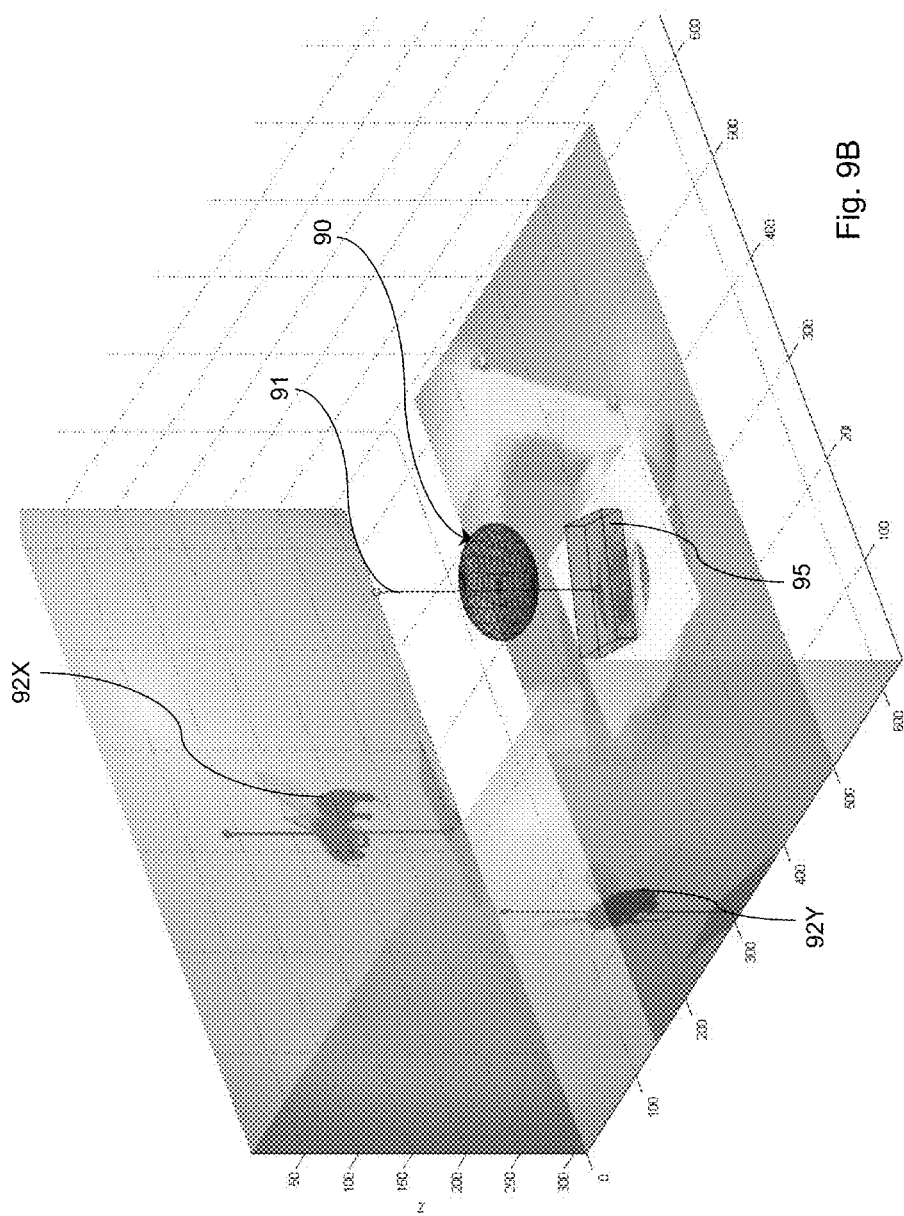
FIG. 9B is a graphic rendering illustrating a projected 3D structure model generated in connection with a scene segmentation process carried out in accordance with an exemplary embodiment of the present invention with respect to an insect specimen work piece.

FIG. 9A illustrates the use of backlighting to enhance the acquisition of reference images in connection with scene segmentation. The three photographs are enhanced in silhouette by suitably controlled backlighting, preferably from a 90 degree axis impinging the plane that the work piece is projected upon for a reference image. The reference images thus captured enhanced in silhouette (92X, 92Y in FIG. 9B) are individually treated to discover their identifiable features/components of interest—for example, the portions of the insect/specimen body, the pin, and the label which are visible within the silhouettes. Reference images of the silhouetted projections are used to construct a stick figure skeletal representation of the entire work piece structure. With reference to FIG. 9B, once scene segmentation has been completed, the ellipsoid figure 90 (in blue) estimates the peripheral boundary containing the insect specimen body, and the red rectangular box 95 estimates the peripheral boundary containing the label, though its precise location within the box may not have been determined yet. The pin itself is represented by a vertical blue line 91.

Once the work piece components and their spatial relationships (and other parametric information therefor) have been defined, decomposed, and segmented to formulate their 3-D models (as shown in FIG. 9B), the system generates an optimal acquisition path along which to direct the robot arm to manipulate the specimen for collection of the work piece's image data. A comprehensive set of image data is then captured by camera actuation at the acquisition points of the acquisition path.

Preferably, the camera unit/work piece relationship is controlled to approach the specimen as closely as possible while maintaining safe clearance, so that microscopic images of the insect specimen itself may be clearly captured. To achieve this, it is important to know where that insect is on the work piece in relation to other features, and its determined location is effectively used in the center of the ellipsoid as the focal point. The acquisition path is automatically generated based on what was learned during scene segmentation to situate the camera unit in ideally conformed manner about the work piece models in this manner. The acquisition path is so generated that the camera may take one or more clear pictures of the specimen which are not obscured by the label. The acquisition path is preferably generated so that the camera may also take one or more pictures of the label which are not obscured by the specimen and sufficiently clear that the label-borne textual information may be recorded potentially with OCR (optical character recognition).

Figure 10A:
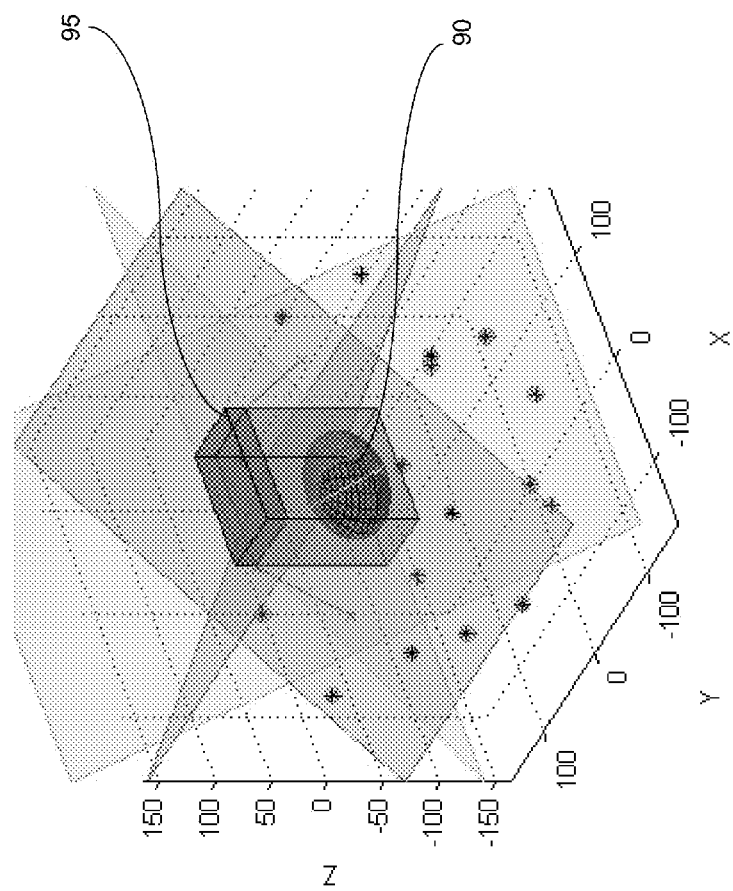
FIGS. 10A-B are graphic renderings illustrating an adaptive acquisition point planning process carried out in accordance with an exemplary embodiment of the present invention to image different features distinguished for an insect specimen work piece.
Figure 10B:
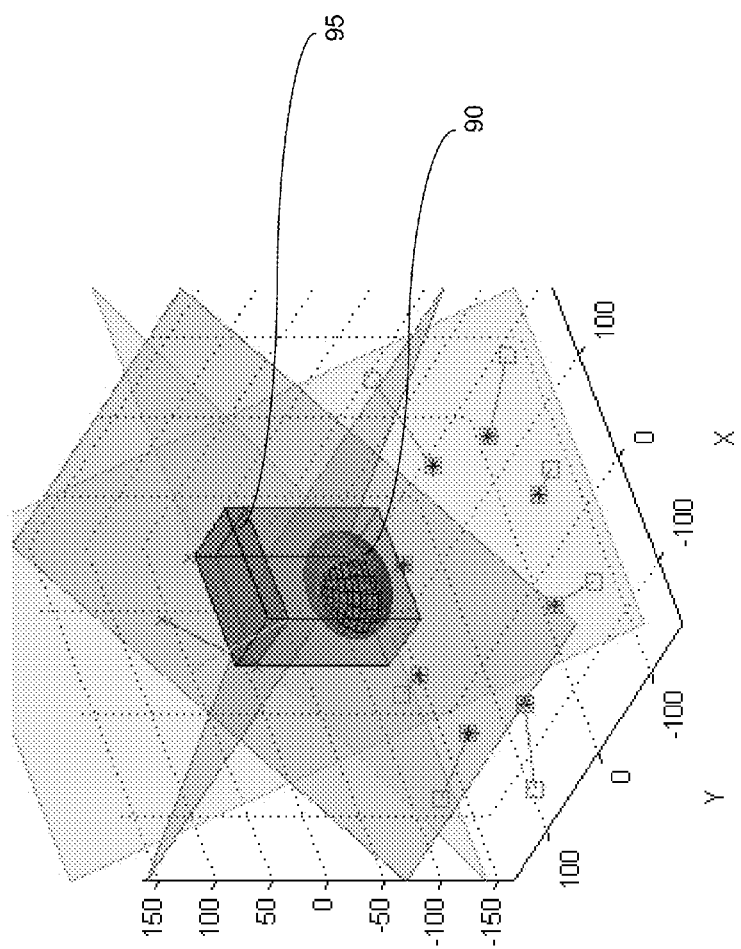

FIGS. 10A and 10B show the 3-D models established by scene segmentation in this exemplary application, as in FIG. 9B, but in inverted form. While the pin 91 has been removed from these views, the ellipsoid 90 is still clearly represented to indicate the specimen's spatial location and orientation relative to the label box 95. The figures also show numerous starred markers indicating potential acquisition points along one or more acquisition paths, three-dimensionally denoting points from which view angles ideal for capturing images of the given work piece's features may be had. Essentially, the stars in this imaging sequence example represent spatial locations of image acquisition points at approximately 45 degrees intervals from one another around the center of the ellipsoid 95. A full set of angularly displaced, hemispherically disposed acquisition points marked by the stars to delineate an acquisition path about the specimen is illustratively shown in FIG. 10A (for imaging the specimen within the ellipsoid 90). The differently colored planes indicate angled planes which delimit the line of sight zones respectively for viewing the specimen with respect to the label (that is, not screened or otherwise obstructed to the imaging source by the label) and for viewing the label with respect to the specimen (that is, not screened or otherwise obstructed by the specimen to the imaging source).

Figure 18:
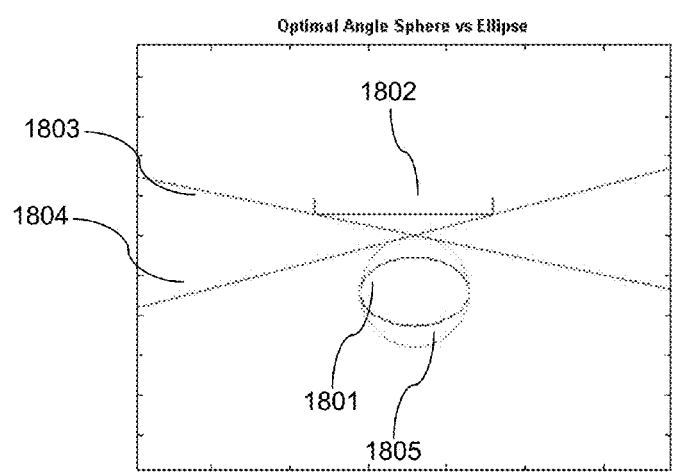
FIG. 18 is a schematic diagram illustrating the determination of restricted viewing angle limits for avoiding mutual occlusion by distinguished features of an insect specimen work piece in a scene segmentation process carried out in accordance with an exemplary embodiment of the present invention.

This is schematically illustrated more simply in FIG. 18 which shows a 2-dimensional view of the line-of-sight limits represented by the angled planes of FIGS. 10 A and 10B. In the particular case illustrated, a sphere 1803 is schematically defined about a projection 1801 of a specimen ellipsoid. The near side of a co-existing label is indicated by the line 1802. From any point below the red angled line 1804, for example, the view of the label is at least partially occluded in the astronomical sense (by the specimen). Similarly, from any point above the angled line 1803, the view of the insect specimen is at least partially obscured by the label. That is to say, the angled lines 1803 and 1804 define the limits for obtaining clear unobstructed images of the specimen and label respectively. Outside of this range, while images may still be captured, focal planes are elongated and stretched. Therefore, to obtain an unshielded view of the work piece's features, like the specimen surfaces which face the label, it is ideal to image beneath line 1803 to avoid shielding by the label itself.

It is preferable to capture a view orbiting around the insect or other specimen by taking photographs thereof from various sides and view perspectives. Referring back to FIG. 10B, the "*" (or star) markers represent predetermined baseline points defined on the X-Y plane relative to the visual center of the specimen, for example. The starred points represent ideal points (in this case for imaging the label from the specimen side), but there are additional acceptable adjusted points as represented by the empty boxes leading from or disposed near the starred points should the predetermined points fail to provide unshielded views of the targeted feature to be imaged. The system uses the predetermined starred points to first center a potential hemispheric acquisition path, adapted with respect to the features of the particular specimen configuration on any instant work piece that has been loaded. The squares shown in FIG. 10B represent the closest locations to the preferred (starred) points from which a photographic image may be taken to obtain a completely unobstructed view of the entire label. The system automatically adjusts the imaging acquisition points where necessary, from the starred baseline points to the view angle-adjusted squared points, in order to avoid occlusion. The system does this accordingly for both the insect specimen and the label, to establish optimal acquisition paths therefor.

The specimen may preferably be imaged from a full set of acquisition points angularly distributed all the way around the specimen to generate comprehensive imagery of the entire specimen. In contrast, pictures of the label may preferably only need to be taken from two or so acquisition points to sufficiently image its informational content, although additional or less pictures may be taken if the particular requirements of the intended application so require. In addition, preferably at the option of the user, imagery from any given acquisition point may be augmented by multiple exposures acquired at the same azimuth and elevation angles relative to the work piece but at different radial distance. Thus, the system may be actuated to "z-slice" or "focus stack," in a suitable manner known in the art, a collection of images to provide extremely enhanced sharpness and depth of field in the final rendered image of the work piece from a particular view angle.

While the work piece is being imaged, it is important to protect it from damage, in particular, from being squashed or bumped by the camera or other imaging unit during relative repositioning between acquisition points. Therefore, once the work piece is located, the various possible points from which that work piece may be imaged are determined. In other words, the system determines zones relative to the work piece where the imaging unit cannot enter—either because collision with the work piece structure may occur, or because the robot arm (or the work piece or camera it is holding, depending on the embodiment) may be manipulated to hit itself. Another, larger rectangular box is, therefore, defined to extend between and encompass the label box 95 and specimen ellipsoid 90. This larger box effectively delineates a "stay away zone" of operation. Preferably, this zone is defined dynamically. Once such "stay away zone" has been established, the system completes path planning based thereon. Combined with the view angle limits, this "stay away zone" yields a zone of safe operation within which a robot arm or other mechanism may be safely maneuvered from point to point to orient the camera to obtain a comprehensive series of images adaptively conformed manner about the work piece, without bumping anything or otherwise causing damage to the work piece.

Again, the zone is defined relative to the work piece features, and the motions described are relative motions between the physical elements of the imaging unit and the work piece. This is true, for example, whether the system is configured to move the work piece relative to a stationary camera, to move a camera relative to a stationary work piece, or to move both via multiple actuated manipulators relative to each other. The system is preferably configured to further constrain the generated path to meet additional constraints relative to these mechanical manipulation systems. In particular, no part in motion, work-piece, camera, or other mechanical structure may be manipulated along a path that will result in collision between one member and another. There may be other mechanical structures on the work table, and self-collision of, for example, a robotic arm with itself due to in-judicial servo positioning could cause damage when operating at high-speed. In addition, each mechanical actuator will have limits of motion that must be respected—thus, for example, one path may require a robot arm to flip joint configurations from left- to right-handed multiple times, while another, more efficient path will minimize or avoid such time consuming operations. Finally, the safety of the specimen work piece, which may be damaged due to shock, vibration, excessive acceleration or excessive wind force loading from high speeds, is preferably considered in refining the acquisition path to suit a given instance of work piece and imaging goals.

Once it fully executes scene segmentation, the system possesses sufficient geometric information about the work piece and the structural configuration and spatial relationships of its targeted features to pinpoint safe and optimal acquisition spots surrounding the main feature's (specimen's) visual center. The system processes the information as disclosed herein to automatically prescribe and update if necessary acquisition points from which to image the work piece features while avoiding the "stay away zone" and occlusion of the targeted features being imaged.

Having described in broad concept various aspects of the system and method as implemented in an exemplary embodiment and application, certain portions of the system and method are described in more detail below.

Exemplary Embodiments: System Implementations

FIGS. 3(a) and 3(b) comparatively illustrate first and second configurations for the exemplary system embodiment shown in FIG. 1B. The configuration illustrated in FIG. 3(a) shows, as before, a specimen-in-motion set up for the system, where the specimen work piece is held and manipulated by the robot arm manipulator relative to a stationary camera or other imaging unit. The imaging unit, in some configurations, is also actuated to permit pan and tilt operations; however, this is not required given sufficient degrees of freedom in moving the robot arm. The configuration illustrated in FIG. 3(b) shows in contrast a camera-in-motion set up for the system, where the camera or other imaging unit is held and manipulated by the robot arm manipulator relative to a stationary specimen work piece. In certain alternate embodiments (not shown), the system may comprise a flat, linear actuated stage on which the specimen may be moved. Both configurations employ a robotic platform comprising a manipulator mounted to a table or work cell. System configuration (a) enables higher throughput due to low specimen work piece mass, while system configuration (b) is preferable in cases where specimen work piece movement loads may provide unacceptable flex upon a somewhat delicate specimen. Configuration (a) in certain applications also simplifies the illumination systems required, since the specimen is consistently imaged at the same physical position and angle relative to the work area. Note that certain elements of system configuration (a) shown in FIG. 3(a) are omitted from the view shown in FIG. 3(b) for the purposes of brevity and clarity, but are in fact included in the system configuration of (b) as shown in configuration (a).

Figure 22:
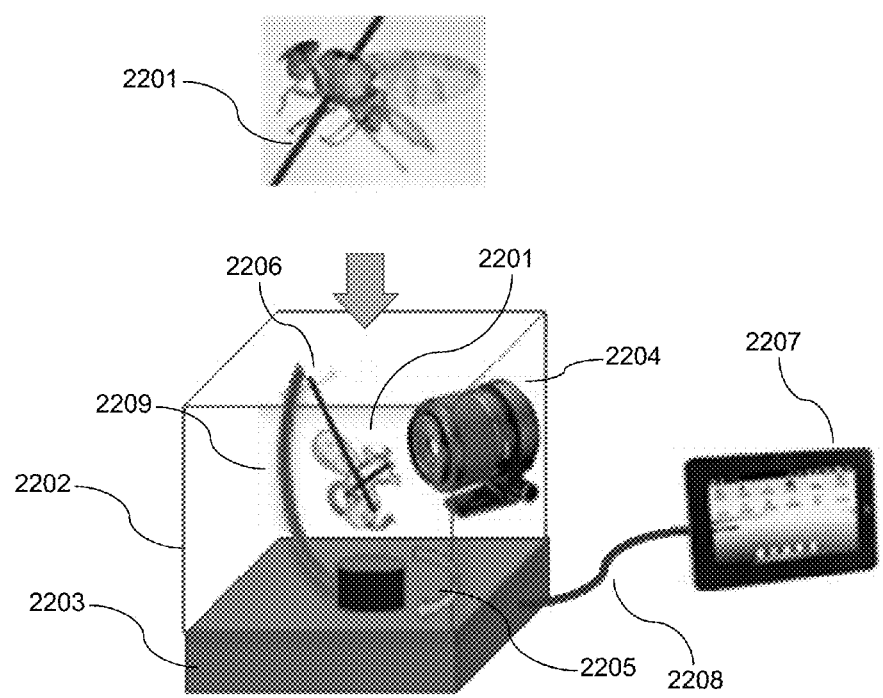
FIG. 22 is a schematic diagram of a system formed in accordance with an exemplary embodiment of the present invention, configured for portable field use to adaptively image insect specimen work pieces.

Although not necessary in all embodiments, the preferred embodiments incorporate the use of a manipulator arm as shown over a linearly actuated flat stage. The demands of precise close-in imaging and adaptive access to the specimen at a variety of 3-D angles are well suited for the capabilities of such manipulator arm. Such manipulator arm may also be configured to carry out pick-and-place operations for automatic specimen work piece loading from trays or conveyer systems. As an additional example, FIG. 22 illustrates an alternate configuration in which a set of purpose-designed, actuated mechanical frames replace the general-purpose manipulator arm. In this exemplary configuration, the specimen is manipulated in 3-axes, plus a fourth linear displacement axis, and the camera lens is actuated to move linearly as well. Thus both the work piece and the imaging unit move rather than one or the other alone.

The system in the illustrated embodiment the imaging unit is implemented, for example, as a tethered, high-quality digital camera system preferably working though a 1:1 capable (or better) macro lens. The camera may be fixed to the work cell or table surface in certain embodiments, with the arm providing all necessary relative motion of the specimen. In the illustrated system configuration (a) the camera is supported on an actuated mount, providing for fine adjustment of the camera angle in addition to the manipulator arm movements. This is optional, and the choice will depend on a trade-off analysis of accuracy and expense relating to the actuator and manipulator. In addition, the actuated camera mount may in certain embodiments be controlled to contribute complementary camera movements (beyond mere adjustments) to reduce motion range requirements on the manipulator. This would allow, for example, specimen and OCR imagery to be optimized with regard to frame centering and parallax, and perspective foreshortening to be minimized while reducing demands on specimen placement precision. In certain embodiments the actuated camera mount may be controlled to provide ultra-fine pan and/or tilt of the camera so that ultra-high resolution (gigapixel+) images may be generated by combining a mosaic of highly detailed pictures. In certain other embodiments, with a fixed camera, similar ultra-high resolution mosaic image capture may be alternatively achieved through fine manipulator control.

In the configuration of FIG. 3(b), the camera is fixed to the manipulator, and is moved by the manipulator relative to a specimen work piece mount anchored to the work table. In this case the specimen may be fixed, or it may be on a rotational or linear actuator, providing similar trade-offs as described in connection with configuration (a) (with respect to a fixed vs. actuated camera). In general, these system configurations (a) and (b) may be used to achieve similar results, and the calculations for achieving necessary imaging angles are mathematically reciprocal since the configurations share the common goal of relatively positioning the 3-D specimen work piece features and the imaging unit in precise relative alignments.

As noted in preceding paragraphs, the "camera" or imaging unit need not be of photo-sensitive or other optical type, but may comprise any suitable imaging instrument known in the art. Where the imaging unit is a camera, it need not be of the SLR (single-lens reflex) type illustrated. In particular, high-throughput embodiments will generally use a shutter-less camera body. This is because shuttered cameras have a relatively low life-time (typically on the order of 100,000 cycles). Furthermore, the use of precise actuated motion and illumination control in the disclosed systems obviates the need for stop motion shutter action.

The camera is linked for control and image transfer via an operational tether in the illustrated system embodiment, which may comprise, for example, a wired USB or a wireless wi-fi link, or other suitable type of communications link known in the art. The camera may be fitted with a variety of available of lenses, flash fittings, and other accessories to suite different specimen capture operations. In certain alternate embodiments, a second, more basic camera may be used for gross scene tracking and/or reference image acquisition (for scene segmentation purposes), while a high-resolution camera is reserved for detailed acquisitions of target images. In certain embodiments, 3-D imaging may be achieved either through the use of a dual lens camera system, or through acquisition of multiple images at positions and angles suitably arranged to achieve proper parallax views.

The camera uses auto-focus in certain embodiments; however, both hunt time and spot-focus accuracy error issues may arise in high-speed operation. Thus, fixed focus operation is preferable in certain embodiments, where the manipulator is programmably controlled to place the target image area at precise distances from the camera's lens. This approach may be augmented by multiple "z-stacked" images, wherein small adjustments are made in the position of the specimen target region relative to the focal plane of the lens, and a series of images are collected at these different positions. Likewise, fixed exposure may be used to shorten the time between images where work piece lighting has been pre-metered or is otherwise predicted by the embodied system.

In both system configurations, primary foreground illumination of the specimen work piece is provided preferably by a diffused LED ring light mounted around the lens. In addition, spot LED light sources are used to illuminate the specimen work piece at different aspect angles for location assessment and tracking imagery. In certain embodiments, stage lighting and/or background lighting measures are suitably used to improve contrast, control background color, and aid in scene segmentation and work piece element identification and tracking. Other lighting systems may be substituted for the illustrated lighting components in alternate embodiments.

The illustrated system configuration (a) also includes a computer processor based controller, suitably linked to the operative portions of the system. In general, multiple physical controllers may be implemented. In alternate embodiments (not shown), a real-time programmable servo controller for a six-axis manipulator may be employed, coupled to a PC computer system which runs system software to activate the servo controller for moving the manipulator, to adjust illumination, to acquire imagery, to process imagery, to conduct path planning operations, and to effect storage of high-resolution data on a disk or other storage media.

Figure 2B:
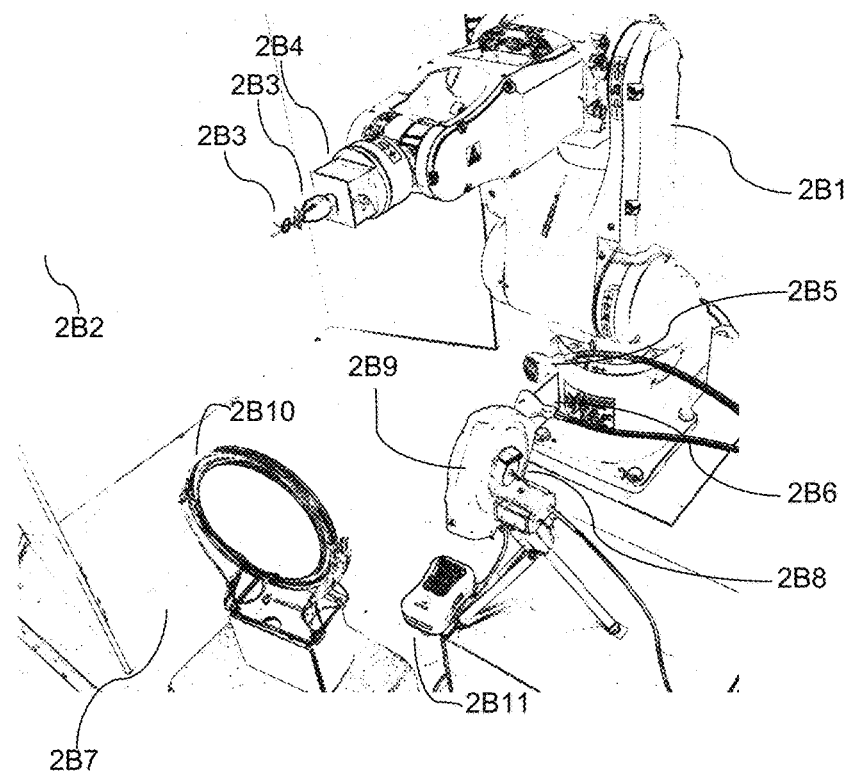
FIG. 2B is a schematic diagram of a system formed in accordance with an exemplary embodiment of the present invention, in a first configuration.
Figure 3:
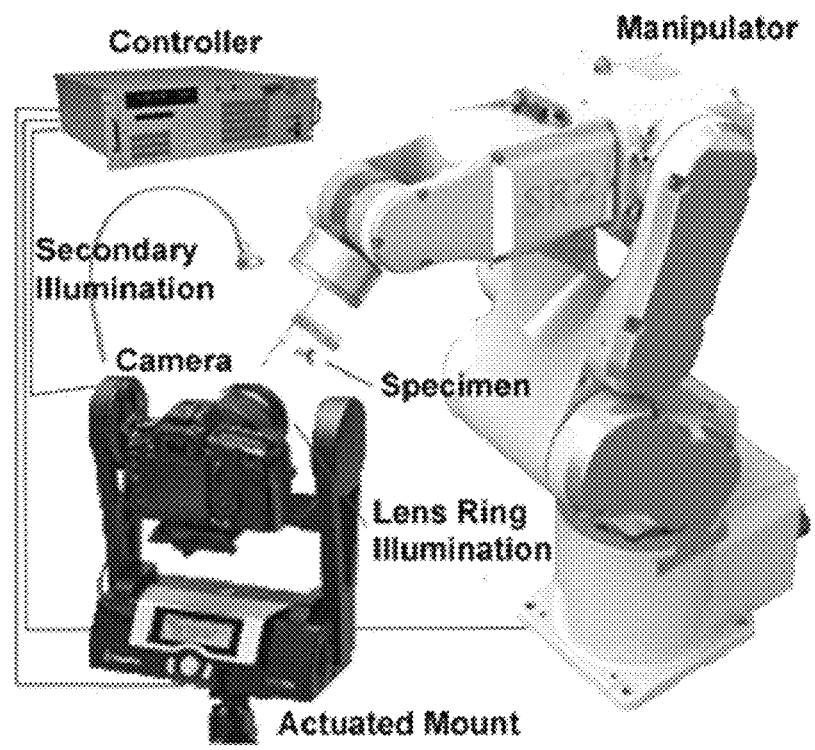
FIG. 3 are comparative schematic diagrams of a system embodiment of FIG. 2B operated in first and second configurations.
Figure 3:
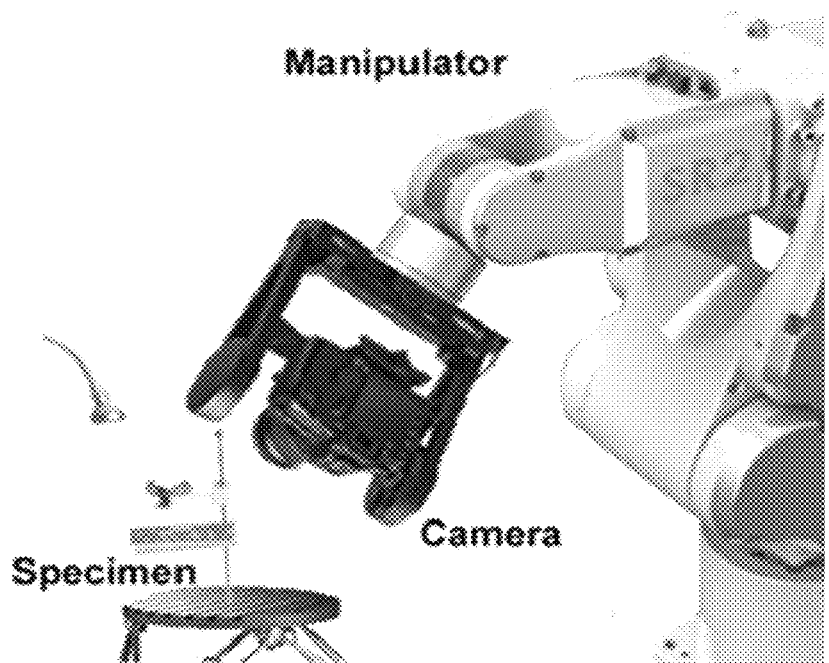

FIG. 2 illustrates other details of another specimen-in-motion configured system embodiment similar to that shown in FIG. 3(*a*). A six-axis manipulator (2B1) is mounted to a work platform (2B7) in this embodiment, which provides stability and mounting support for illumination and camera components. Such components include a digital camera (2B8), surrounded by a LED ring light (2B9), as well as a high-intensity LED background illuminator (2B6) oriented toward a work-cell photo backdrop screen (2B2). To provide background illumination when the manipulator work surface block (2B4) occludes the backdrop (2B2), an additional high-intensity LED background illuminator (2B5) is included. Optionally, other light sources (e.g. 2B11) or reflective surfaces (2B10) are used in certain embodiments to reduce shadow effects that may occur when the specimen work piece (2B3), manipulator (2B1), or holder/attachments system (2B3) and (2B4) occlude a given light source. Removing such shadows tends to measurably improve photo quality in the final acquired images, and in certain embodiments helps reduce false edge detections in the preliminary reference imagery (for scene segmentation). In other embodiments, changing colors of the lighting are used to augment the processing of reference images to distinguish and correlate features of the work piece, or additionally to illuminate the specimen work piece in different spectral lighting conditions for more advanced (e.g. multi-spectral) imaging scenarios.

The specimen work piece (2B3) is mounted in an attachment structure (2B3) for securement to the manipulator. In a first embodiment, this comprises a pin-vice type chuck which clamps the work piece when locked by a manual twist (as shown in FIGS. 19*a* and 19*d*, 25A and 26A). This chuck is held by a set screw in a receiving block (2B4) which is screwed to the manipulator head. In an alternate embodiment, this chuck may be actuated automatically (by electro-mechanical or pneumatic measures) to clamp the work piece in place. In another embodiment, the attachment structure (2B3) comprises a high density foam receiving material secured in a binding ring or bracket (as shown in FIGS. 19*b* and 19*c*, 25B and 26B), mounted to receiving block (2B4) which is screwed to the manipulator.

Figure 19A:
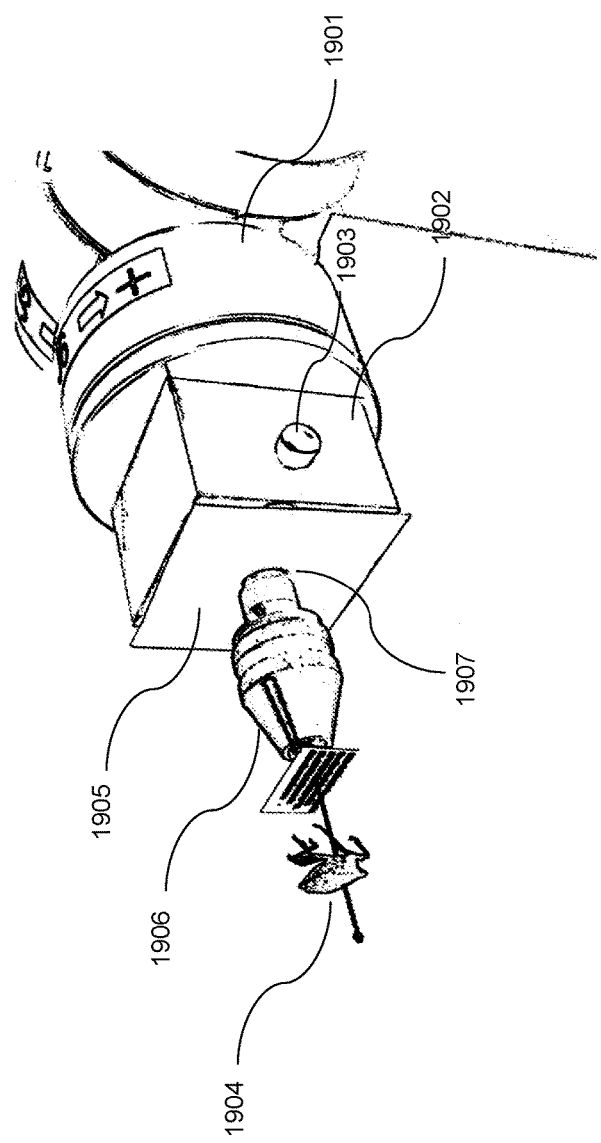
FIGS. 19a-d are a set of perspective views illustrating different types of specimen work piece holders employed in a system formed in accordance with different exemplary embodiments of the present invention.
Figure 19B:
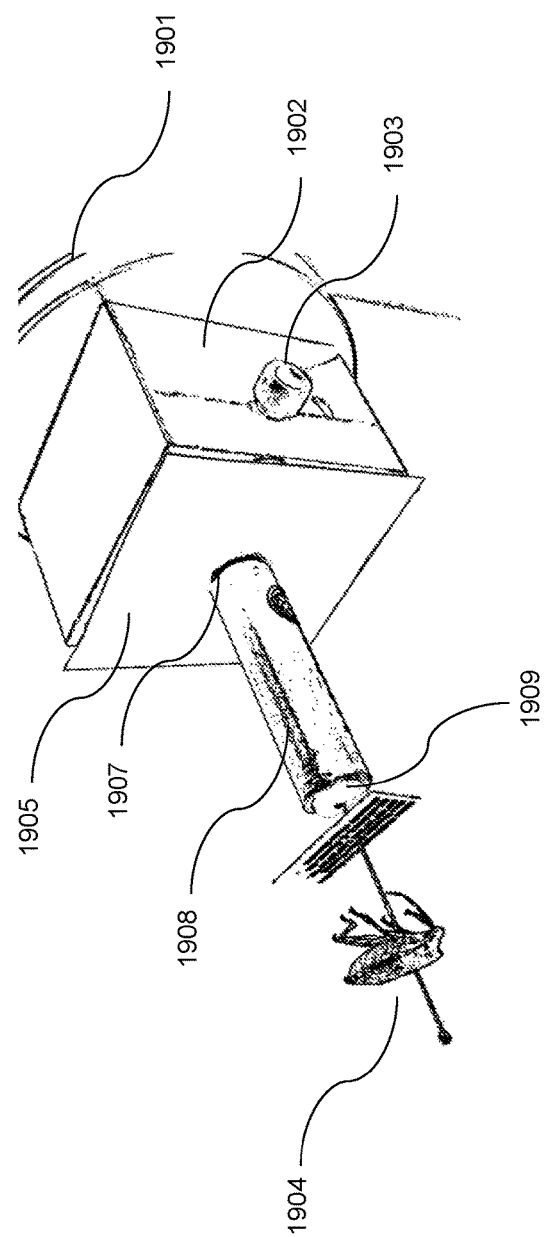

FIGS. 19*a* and 19*b* illustrate details of two alternative examples of attachment structures referenced above for securing pinned specimen work pieces to the manipulator. FIG. 19*a* shows the pin-vice type chuck embodiment secured to a manipulator head 1901 by a mounting block 1902. The mounting block holds a shaft 1907 of the chuck as releasably secured by a set screw 1903. On the shaft is a pin-vice chuck 1906, which in certain embodiments is operated manually by twist, and in other embodiments is operated automatically by an actuator. The chuck coaxially grasps the specimen work piece 1904. One advantage of this coaxially grasped arrangement is that the pin of the work piece is generally held parallel to the primary axis of the final manipulator joint (wrist-like joint). Thus calculations of pin angle need not account for major lean of a straight pin in either X or Y dimension, as the system may assume the pin to be coaxially aligned with the joint. If the pin is bent, as may sometime occur, this advantage is lessened.

A panel having a diffusing bright white surface 1905 is preferably mounted behind the base of the pin-vice chuck. This surface 1905, when illuminated by external light source(s) provides backlighting for the label and pin in the Z axis reference imagery, as discussed elsewhere. In certain embodiments, the diffusing surface 1905 may be replaced by a direct diffusing light source.

FIG. 19*b* shows an arrangement similar to that of FIG. 19*a* for attaching a specimen work piece to a manipulator head 1901, except that the chuck 1906 is replaced by a hollow metal cylinder 1908 housing a solid cylindrical insert comprising high-density foam 1909. The foam insert 1909 is bound in place by friction or any other suitable means known in the art. In this embodiment, the pinned specimen work piece 1904 is inserted by physical force to pierce into the foam insert 1909 to be held securely thereby, until removed by sufficient extraction force. The relative pressures and accelerations induced on the work piece by the robotic manipulator during handling are generally well below the extraction force required for pin removal from the foam insert 1909. The work piece pin is therefore held securely for the duration until deliberate extraction is made.

Pin extraction may be carried out manually, or automatically using a corresponding actuator device to grasp and remove the work piece pin by its head. In certain automated embodiments, the pin's head may be captured behind a lipped slot and pulled by the actuator thereby to extract the pin from the holding foam. In general, if the work piece pin is manually inserted, the pin will not be precisely aligned with the primary axis of the final manipulator joint. Consequently, lean angles of the pin in X and Y dimensions must be recovered during scene segmentation processing on the reference images and suitably accounted for in subsequent handling. Likewise, the pin's offset from the center of the final manipulator joint must be discovered and suitably accounted for. Note that the foam insert 1909 is marked in the illustrated embodiment with a dot to guide manual loading to the center of the foam insert and approximate coaxial alignment therewith. The other numbered features of FIG. 19*b* are similar to those identically numbered in FIG. 19*a*, and not separately described.

Various end-effectors may be attached to robotic manipulators known in the art. Appropriate substitutions may be made with any suitable end-effector known in the art depending on the specific requirements of the particularly intended application. This may be necessary in various other applications, for instance, where different work piece configurations or specimen support structures are to be handled.

Figure 19C:
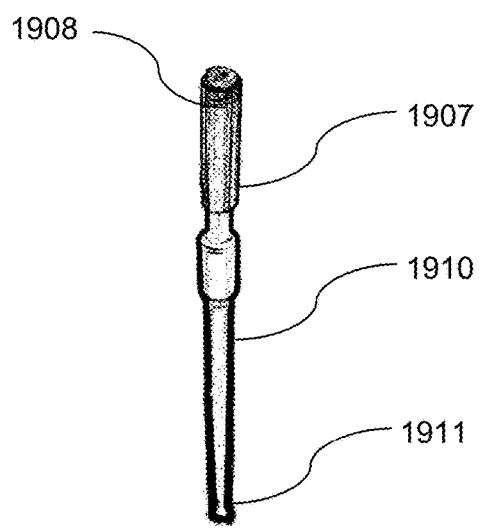
Figure 19D:
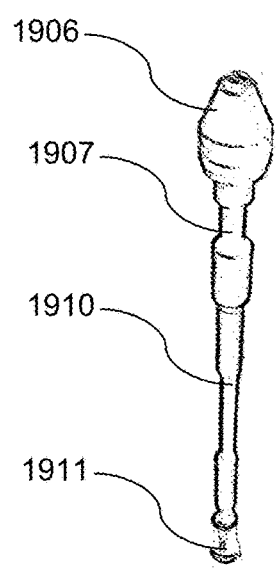

The work piece holder embodiments of FIGS. 19*a* and 19*b* are applicable to a pinned specimen work piece-in-motion configuration as shown. In configurations where the camera is in motion and thus mounted to the primary actuator (manipulator), discrete holder structures such as illustrated in FIGS. 19*c* and 19*d* may be employed in mounting work pieces to a support. In FIG. 19*c*, a hollow cylinder 1908 containing high-density foam is mounted on a shaft 1907 set into an extension shaft 1910. The holder is mounted to a fixed or actuated surface via an engagement end 1911. In FIG. 19*d*, a pin-vice chuck 1906 is similarly mounted on a shaft, extension shaft, and engagement end 1907, 1910, 1911.

In certain embodiments, the different holder structures illustrated in FIGS. 19*c* and 19*d* may be releasably mounted in an actuated holding device and used to hold and rotate a work piece about the shaft, to alleviate work angle requirements on the manipulator. Likewise, in certain other embodiments (not shown), the different holder structures may be secured by their shafts 1910 to an actuated holding device that may tilt the work piece in one or more degrees of freedom.

Use of the elongate extension shaft 1910 in the illustrated embodiments affords increased access to all surfaces of the work-piece specimen for imaging. A long thin holding shaft heightens the clearance required for close placement of the camera lens and any ring-light or other accompanying structures, thus improving the angles from which the "bottom" of the work piece may be imaged (as defined by the pin, with pin head representing the "top"). The extension shaft 1910 may likewise provide similar advantages when the holder structures are used in specimen-in-motion configurations, such as illustrated in FIGS. 19*a*, 19*b*. A tradeoff exists between improved access to the bottom of the structure and increased travel of the primary manipulator required (as a result of the shaft extension) to achieve all orientations required of the work piece.

Figure 20:
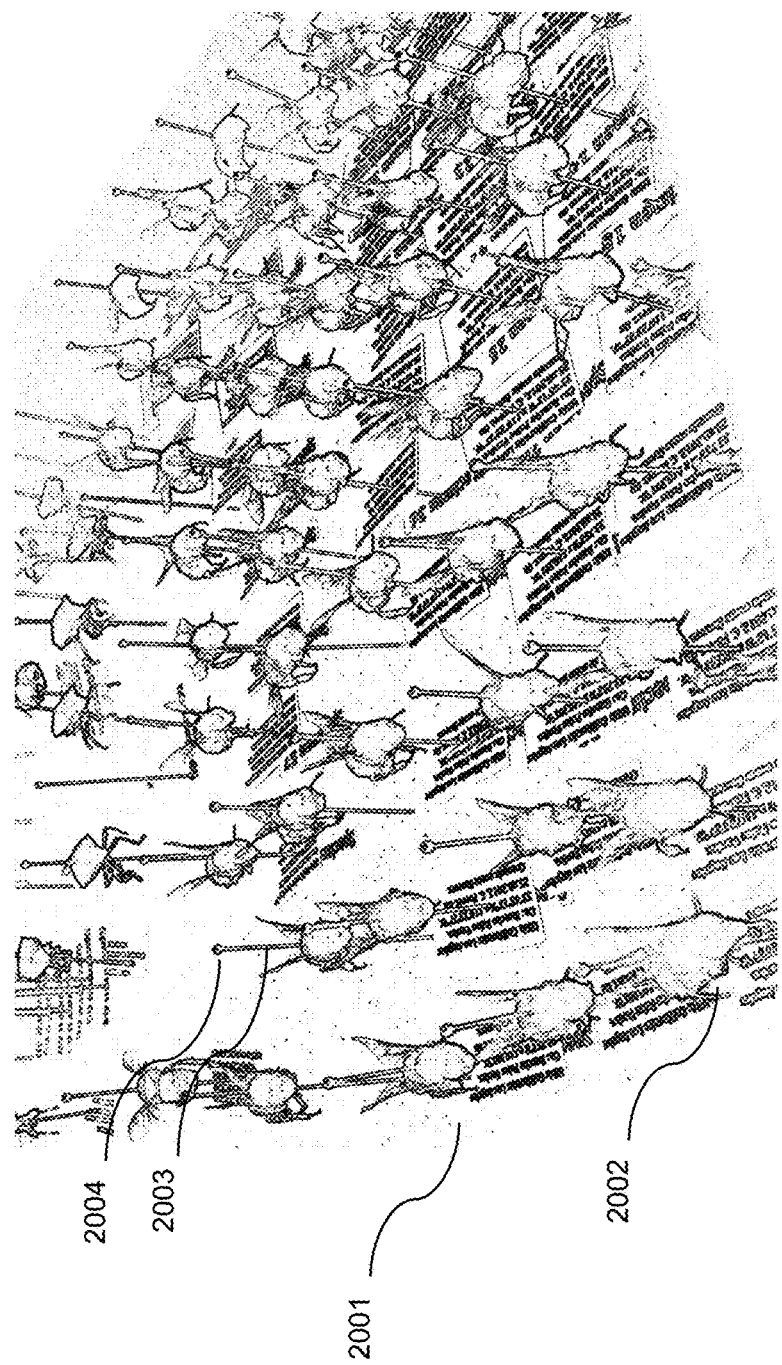
FIG. 20 is a schematic diagram illustrating a collection of insect specimen work pieces to be adaptively imaged in accordance with certain embodiments of the present invention.
Figure 21:
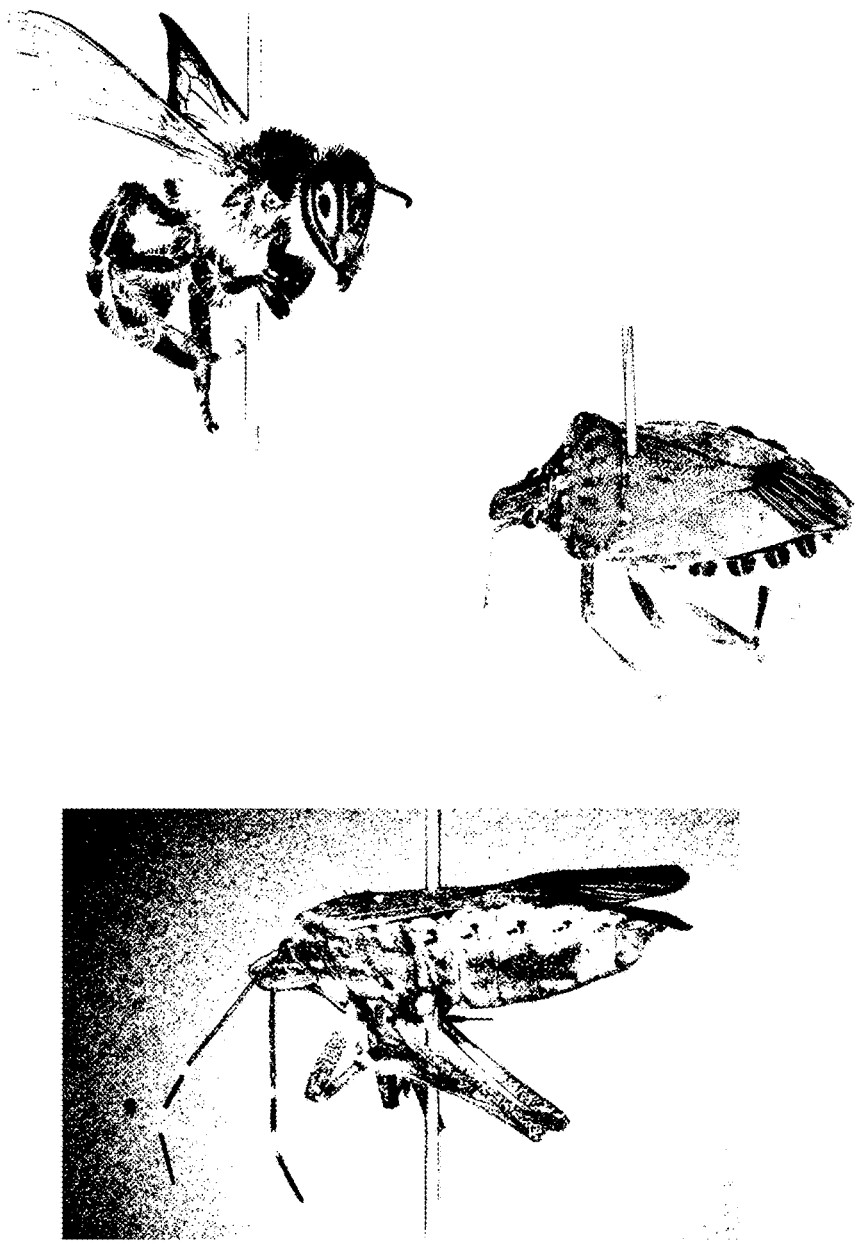
FIG. 21 is a set of photographic views illustrating insect specimen images adaptively acquired for a variety of insect specimen work pieces by a system formed in accordance with an exemplary embodiment of the present invention.

Other suitable additions may be made to the work piece handling and loading measured in certain alternate embodiments. FIG. 20 illustrates a pallet 2001 of specimen work pieces 2002, which may be placed on a work surface so that the primary manipulator may be actuated to lift one work piece at a time for processing. In this embodiment, the work piece pins 2003 are grasped by their top pin heads. In other embodiments (not shown), a secondary robot manipulator may be used to pick up and place the specimen work pieces into the grasp of the primary manipulator in the required orientations.

In still other embodiments (not shown), the primary manipulator picks up a specimen work piece by its pin head and manipulates the same for requisite imaging of a first (bottom) hemisphere of the work piece specimen from bottom-side angles. The primary manipulator then places the pin in an inverting mechanism (not shown) which holds the work-piece securely but allows the pin's point tip to protrude in a manner that it may be grasped by the primary manipulator. The manipulator then re-grasps the inverted work piece and manipulates the same for requisite imaging from the same bottom-side angles, such that a second (upper) hemisphere of the specimen work piece is accordingly imaged. The manipulator then places the work-piece back in the inverting mechanism, then re-grasps the pin by the pin head for insert back into the pallet.

Note that the work pallet may be laid out regularly so that it is straight forward to automatically locate and pick up a specimen work piece. However, since work pieces of interest may not be stored in such organized fashion it may instead be desirable to create an adaptive loader. Thus, in certain embodiments a loading manipulator (not shown) would locate the work pieces, identify and grasp their pin heads, and pass them on to the primary manipulator in direct or re-oriented manner Measures implemented during scene segmentation, as described herein, to identify a pin head in a work piece by machine vision (based on reference images), may be applied in this embodiment to carry out the search and grasp operations desired. In certain other embodiments, this search operation may augmented by marking the pin-heads or other regions of the work pieces with color tags or other readily identifiable indicia to enhance target discrimination.

In still other embodiments, a conveyer system is used to move specimens into reach for the primary manipulator to grasp and process. In addition, multiple cameras may be used to image two or more angles of the specimen at the same or at sequentially offset times. A group of cameras may also be aimed around a moving conveyer. While this may achieve rapid image capture of multiple angles, it may diminish an advantage otherwise realized by the exemplary embodiments illustrated herein of adaptively imaging individual work piece specimens at multiple angles in a manner closely conformed to the particular configuration of the given work piece specimen. A system properly implemented in accordance with the exemplary embodiment, however, enables target regions/features of the specimen to be closely imaged precisely because they have been adaptively located.

FIG. 22 illustrates a system formed in accordance with an alternate embodiment of the present invention, which incorporates purpose-built mechanical units to suit field or other more portable applications, or where mass archival specimen work pieces are not being processed. The premise of this system is that a specimen may be pin-mounted 2201 precisely for the purpose of scanned imaging. Preferably, the specimen is consistently placed in this context on the primary (and only) pin, with the pin being sized according to the specimen's type and size. The pin is held in a holding device (such as small versions of the pin-vice or foam holder structures illustrated in FIG. 19) to be rotatable about its central axis. The mount 2206 rotatably holding the pin is affixed to a semi-circular bracket 2209 to be slidable along the curved length of the bracket 2209. The bracket 2209 is in turn mounted to a rotating hub 2205, such that the entire arrangement (i.e., specimen work piece 2201, rotatable mount 2206, and slide bracket 2209) is rotatable about the hub's center axis on a manipulation base plate 2203.

The three motions combine to manipulate the specimen in three axes relative to the lens of a camera 2204. Preferably, these motions are actuated automatically by an electronic control system. In certain embodiments additional degrees of freedom may be added to further suit the intended application. For example, translational motion of the hub 2205 toward and away from the lens of camera 2204 to adaptively preserve predetermined distances from the lens for differently configured specimen work pieces. A motion to axially displace the pin of the specimen work piece 2201 relative to the mount 2206 is also potentially useful, as it would enable the specimen to be finely adjusted in positioned to remain as close to the center of the rotation frame as possible. Equivalent linear actuation of the camera lens, up/down, left/right may be substituted for either or both of these two translational hub motions. Pan and tile operations may in alternate embodiments be enabled at the camera lens.

Using this physical configuration, the specimen work piece may be selectively manipulated to achieve angles of view similar to those achievable with the multi-axis manipulator embodiments described herein. This embodiment leverages: (a) the absence of label and (b) the necessary placement of a specimen on a single pin to simplify system operation. Again, this embodiment is generally preferable only to the extent that the specimen is freely mountable (or re-mountable) specifically to suit this imaging purpose. However, with the additional degrees of freedom enabled, this embodiment of the system is suitably extensible to operate upon archival work pieces including pin-mounted specimens where the specimen is mounted on a sub-pin or tab, and inclusive of labels.

The system in this embodiment also includes an optional work cell guard box 2202. The system further includes a control unit 2207, implemented for example by a tablet computer or other computing or mobile device tethered to the system by a communications link 2208. The operational tether may be implemented by wired or wireless link (such as wi-fi, bluetooth, or the like).

Figure 30:
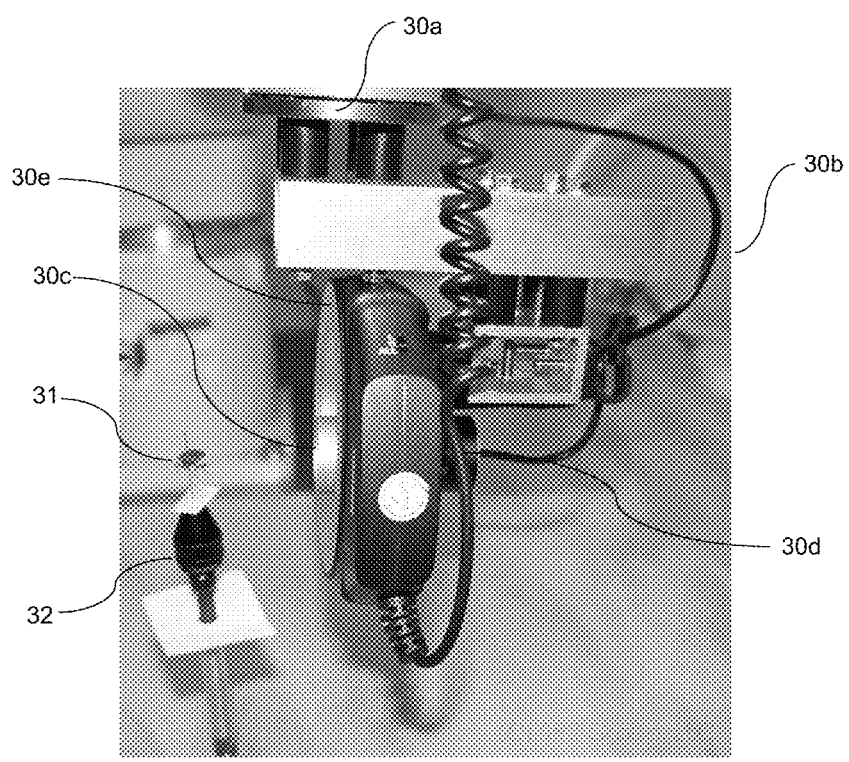
FIG. 30 is a photographic view of a portion of a system formed in accordance with an exemplary embodiment of the present invention, in a camera-in-motion configuration.

Turning to FIG. 30, there is shown one exemplary embodiment of an end-effector for alternative use with the robotic manipulator in a camera-in-motion system configuration such as shown in FIG. 3. The end-effector is shown in this embodiment attached to a wrist plate 30*a* of the given multi-axis manipulator arm by a bracket 30*b*. The bracket 30*b* serves to offsets the center of rotation of the camera 30*d* such that in this case the camera's lens 30*c* remains centered below the wrist joint's axis of rotation. This not only aids overall maneuverability of the camera about obstacles, it provides sufficient clearance for the camera to approach a work piece 31 (secured to a support table by a pin-vice holder 32) for extremely close up imaging shots.

Also included as part of the end-effector in this embodiment is a light ring 30*e*, preferably implemented as an LED ring light disposed about a reflector for heightened illumination of the work piece during image capture. The LED light ring encircling the lens offers the advantage of high brightness lighting of the specimen and label without the excessive heat, which permits uniformly illuminated imaging of work pieces from a close distance, at various aspect angles. Preferably, the light ring includes a diffusing filter to avoid point-glare reflections from the specimen surfaces.

Figure 38:
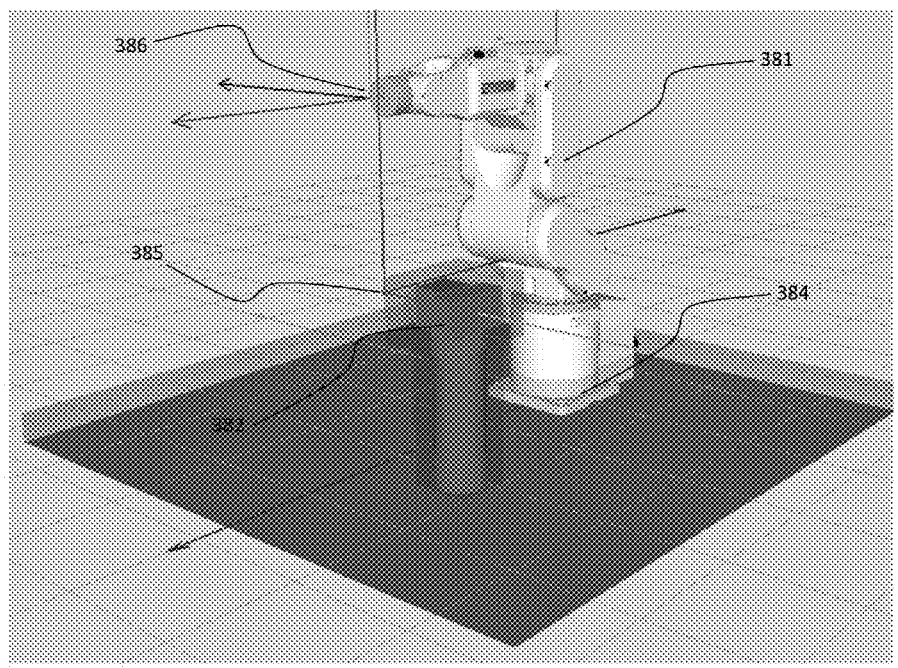
FIG. 38 is a graphic rendering schematically illustrating 6-axis manipulation system for a work-cell accommodating a specimen work piece in a system formed in accordance with an exemplary embodiment of the present invention.

FIG. 38 illustrates a schematic rendering of an exemplary embodiment of a system work cell, realized using an insect specimen work piece-in-motion configuration with a 6-axis manipulator (381) and a single fixed camera (382). Three (x,y,z) coordinate systems are illustrated by orthogonal red-green-blue axes sets. The manipulator's work-space coordinates are centered where the base of the manipulator joins a work table 384. The reference imaging coordinates (385) are centered some predetermined distance (6.5 cm, for example) in front of the camera lens. The work piece referenced coordinates (386) are centered on the discovered specimen location, for example a few centimeters in front of the manipulator wrist. The work piece is not illustrated to preserve clarity of illustration. The green-shaded regions around the camera and at the work-cell edges indicate no-go zones, established to detect and prevent potential collisions or safety hazards.

Figure 27:
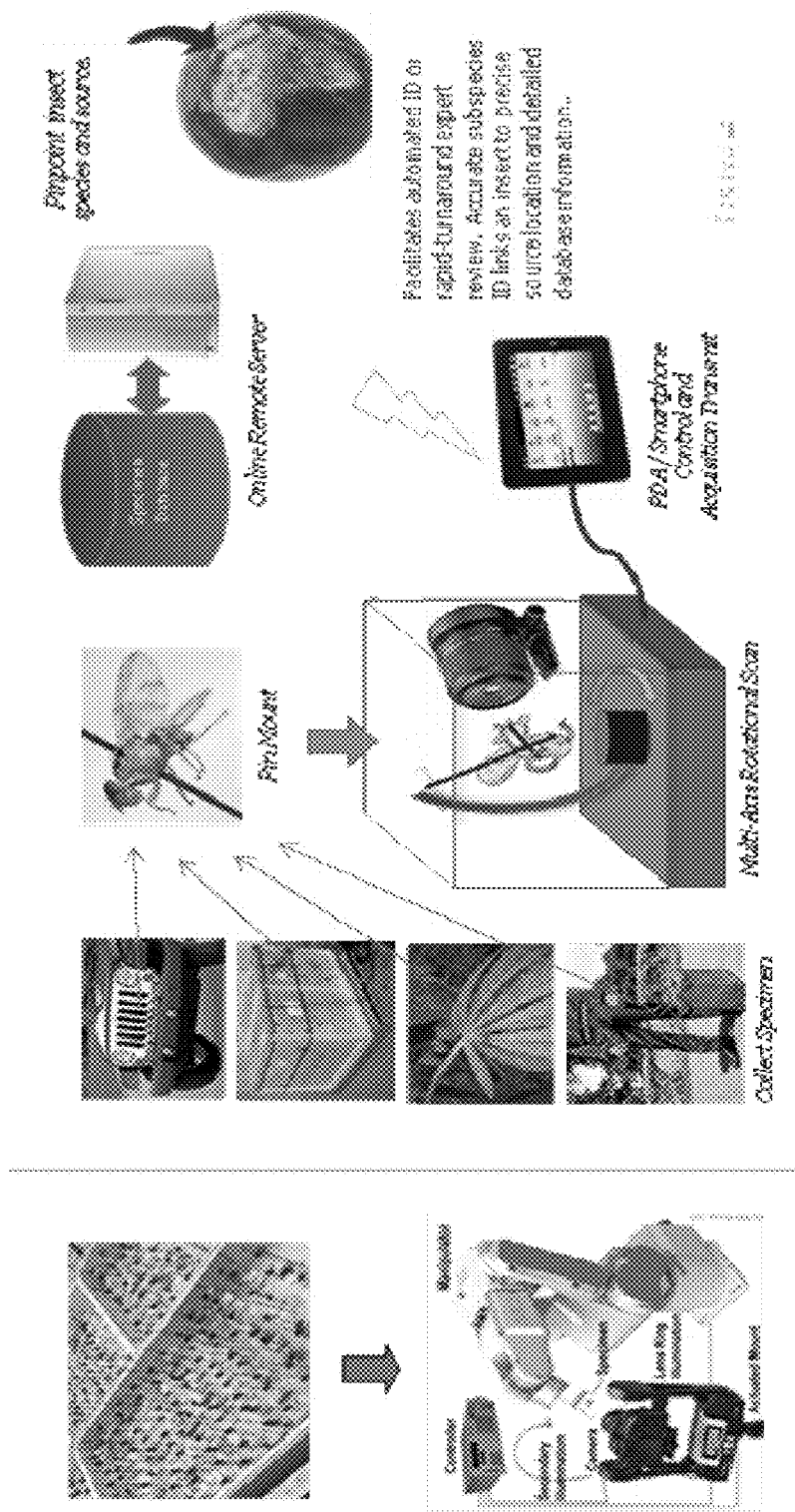
FIGS. 27-29 are schematic diagrams illustrating different broad scheme application scenarios of a system formed in accordance with an exemplary embodiment of the present invention for adaptively imaging insect specimen work pieces.

Broader Scheme System Application Example:
Large-Scale Specimen Digitization to Enable
Species Identification and Tracking Application of an imaging system formed in accordance with certain exemplary embodiments of the present invention serves to establish an overall system of image-based identification and tracking of species, such as illustrated in FIG. 27. Once a large scale digital collection of insects or other organisms has been established, specimens may be collected and digitized in the field, and the image data input to numerous ends. The elements illustrated here include:

A. Field Scanners to Carry Out Digitization of New Specimens

The field scanner/imaging system embodiments such as shown in FIG. 22 require manual placement of specimens and provide a slower, simplified scan; however, they would be significantly less expensive to acquire and operate, for instance, than those employing more substantial manipulator units. The goal is to provide smaller local centers and individual field users with automated systems for scanning/imaging an insect and transmitting the information to a more central database. While it may be possible to simply photograph insects with so called smart phones or other prevalent but non-dedicated imaging equipment, current consumer camera technology found in such equipment does not provide adequate image quality for the purposes disclosed herein. Numerous insect species of significant interest are physically too small in size to be accurately imaged using such technology, or properly handled without a support stage and macroscopic lens arrangements.

B. Online Database System Enabling Users to Search and View Scanned Specimens

This component provides expert users, researchers, students, and others quick access to detailed images of cataloged species, as well as geo-location and species-specific information. The wide availability of this data would be a game-changing event for research. Information would be available for broad review that previously had only been available to experts on specific taxonomic groups referenced by specific world regions. The dissemination of this data has significant commercial, agricultural, and security ramifications.

C. Automatic Insect Recognition and Classification

Automated identification enables applications in commercial agriculture, national security, and epidemiology without undue reliance on human experts. Decoupling these tasks from the very limited and overtaxed pool of human experts would expand the application of the technology exponentially and commercial potential. Rapid approximate classification is immediately useful, as producing a finite set of suggestions would greatly aid laypersons as well as experts in the field who can then quickly focus on finer distinctions.

This aspect of the present invention represents a breakthrough advance in the art's capacity to process and organize biological specimen data.

In support of such operations, insect digital acquisition stages preferably include in certain applications specific imaging of key features of an insect upon which such identification may rely. For example, if winged insects such as mosquitoes or aphids may be identified by the details of its wing structure, then specific images on the wings would be captured in addition to the standard hemisphere of images used in the exemplary embodiments disclosed herein. Likewise, if for example an arachnid may be best identified by its dorsal structure, then orthogonal dorsal views would be explicitly captured. Other specimens may be best identified by a particular leg or other appendage, and so forth. Identification and localization of various discrete features of interest within each target specimen are contemplated for the finding of features within a 3-D work piece scene segmentation as described herein.

Figure 28:
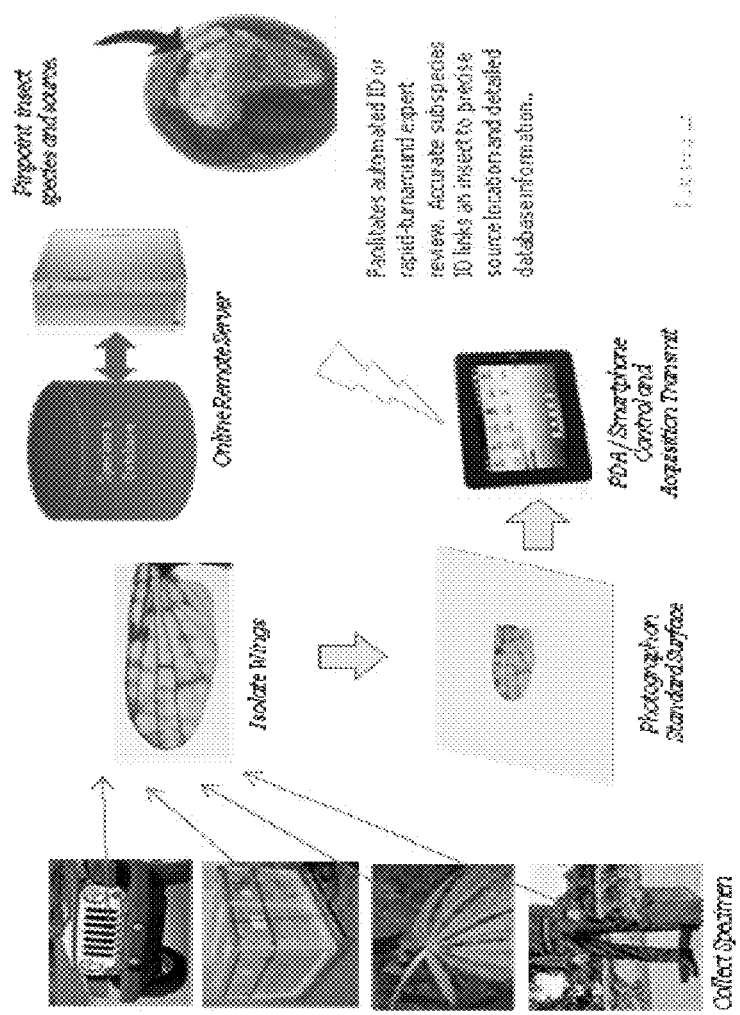
Figure 28:
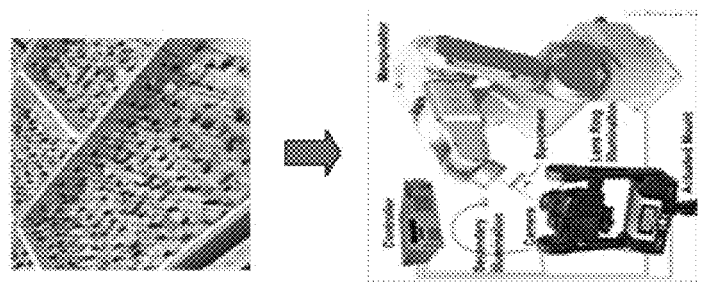
Figure 29:
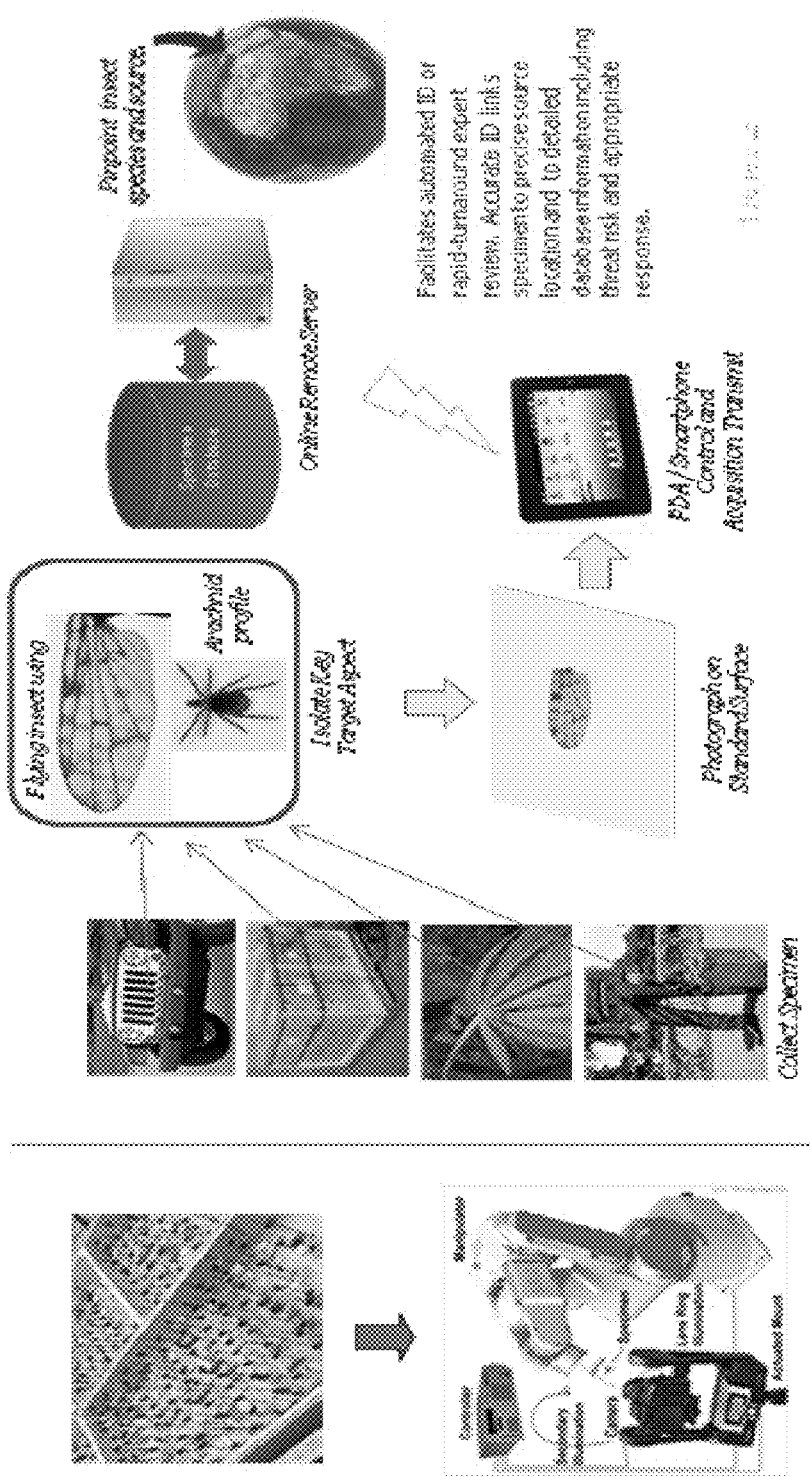

FIGS. 28-29 schematically illustrate additional variants of the broad scheme application of the disclosed system and method in various embodiments. As indicated in these views, the adaptively conformed imaging may be applied to the taxonomic identification and classification of, for instance, winged insects. The capability provided by the subject system and method would enable non-scientist field users to collect an insect or portion of an insect, photograph or otherwise image it using available tools, and transmit the image and associated collection data to an online system for rapid evaluation and screening. Actionable information would then be transmitted back to the field user. Insect-linked handling and response guidance could be defined in collaboration with appropriate government agencies, to, for example, intelligently determine whether immediate action is needed and to whom a specimen should be forwarded for any further evaluation. With sufficient reference and training data, the system would be capable of pinpointing details of any important insect's global origin.

Other potential embodiments and applications include the combined use of the imaging system with a light trap or other automated collection system for live insects. Such embodiments include a combination of:

- High-throughput robotic scanners to digitize existing collections.
- Field scanners to examine new specimens, which provide semi-automated imaging information transfer for field users.
- Automatic insect recognition and classification. Automated identification would enable applications in commercial agriculture, national security, and epidemiology without reliance on human experts. Exemplary applications include the rapid field-screening of disease vectors to protect U.S. Service personnel who may be deployed in remote parts of the world, screening of crops and agricultural imports for threat species, and forensic-evidence supporting insect identification from crime scenes.
- An online database system to search and view scanned specimens. This would give experts, researchers, students, and others quick access to detailed images, and species-specific details.
- Wing or other anatomical images such as the dorsal view of an arachnid, etc., may be extracted in bulk using the robotics-based system embodiments herein described, or using hand acquired or previously cataloged images.

Overview: Exemplary Embodiments of Functional Processes

Figure 4:
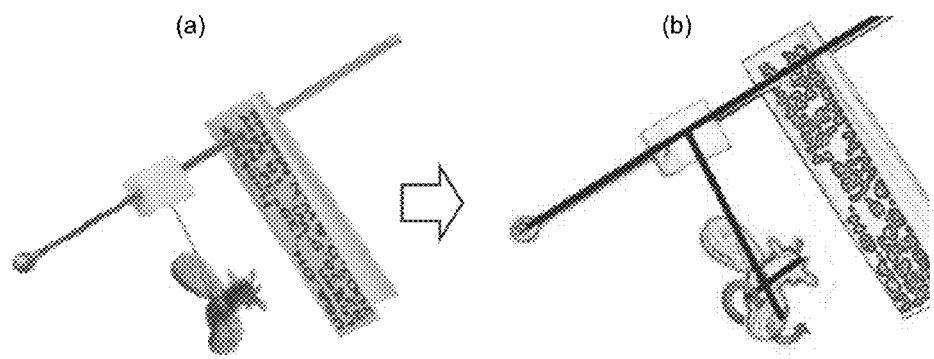
FIG. 4 is a set of schematic diagrams illustrating certain portions of a scene segmentation process carried out in accordance with an exemplary embodiment of the present invention with respect to an insect specimen work piece.
Figure 4:
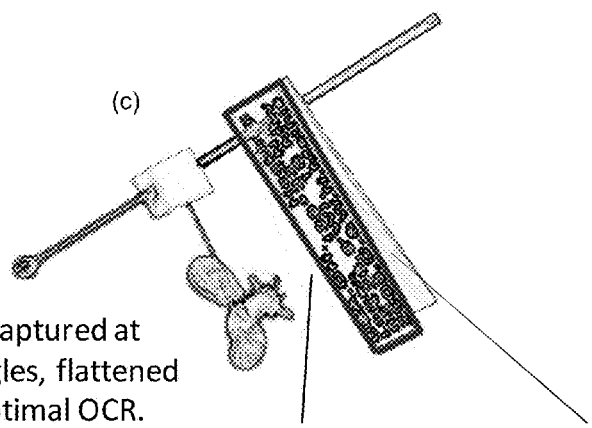
Figure 4:

FIGS. 4(a)-4(c) schematically illustrates certain of the software driven functional processes carried out on a pinned specimen work piece in accordance with certain exemplary embodiments of the present invention. In this example, the work piece includes on which a biological specimen is attached via an arm-like second pin extending transversely from the main pin. Such a pin is termed a "minutin" in the entomology field, and referred to herein variously as a "secondary" or "sub-pin." In a first stage of operation, reference image data for the specimen work piece is preliminarily acquired to construct a 3-D model of its different features. The 3-D models are used as characteristic references in planning subsequent fine resolution movements to enable the safe, consistent acquisition of imaging data for the work piece features of interest.

In the illustrated embodiment, reference image data is acquired by means of digital photographs of the specimen work piece. This is used in combination with domain knowledge relating to the work piece at hand in order to identify sub-elements, or features, of interest and construct corresponding 3-D models thereof.

In alternate embodiments, the optical imaging unit may be replaced by, or supplemented with imaging units based on other sensor modalities. For example, any suitable non-optical energy imaging process known in the art that yields spatially referenced (X,Y) data may be employed in much the manner that optical imaging processes are in the illustrated embodiments and applications. Other techniques for thus imaging 3-D structure known in the art include laser line scanning, LIDAR scanning, moray pattern imaging, and the like. They may be applicable, and even preferable, in certain embodiments with various specimen types. However, in the illustrated embodiment, domain knowledge coupled with straightforward image processing provides a fast and relatively inexpensive way to map the work piece regions of interest.

As illustrated in FIG. 4(b), the processing goal in this particular embodiment is to achieve a stick-figure (or wire-frame) model of the structure that identifies the main pin and any sub-pins. This information is used to achieve an estimate of the center points of the biological specimen, together with its primary axes. This enables the processing software to make adjustments based upon desired detailed imagery to the actual location of the target elements on the particular work-piece specimen. The label region is also identified, along with its relative position and angle on the main pin, allowing the processing software to adjust the desired imagery of the label to the label's actual location.

Equally important in the exemplary embodiment is application of the estimated 3-D models to plan each relative movement between an imaging unit and the specimen work piece, so as to avoid collisions therebetween, and with the manipulator, supporting structures, and any nearby lighting equipment. The 3-D models are also applied to adjust planned image acquisition points for both the biological specimen and the label to account for occlusions of one by the other. This is described further in other sections herein.

FIGS. 5A-5F schematically illustrate the processes carried out during scene segmentation to distinguish the targeted features of the specimen work piece—namely, the biological specimen, the pin head, main pin shafts, and the label regions—preferably using two reference images of the same work piece taken at different arbitrarily rotated viewing angles.

Figure 6:
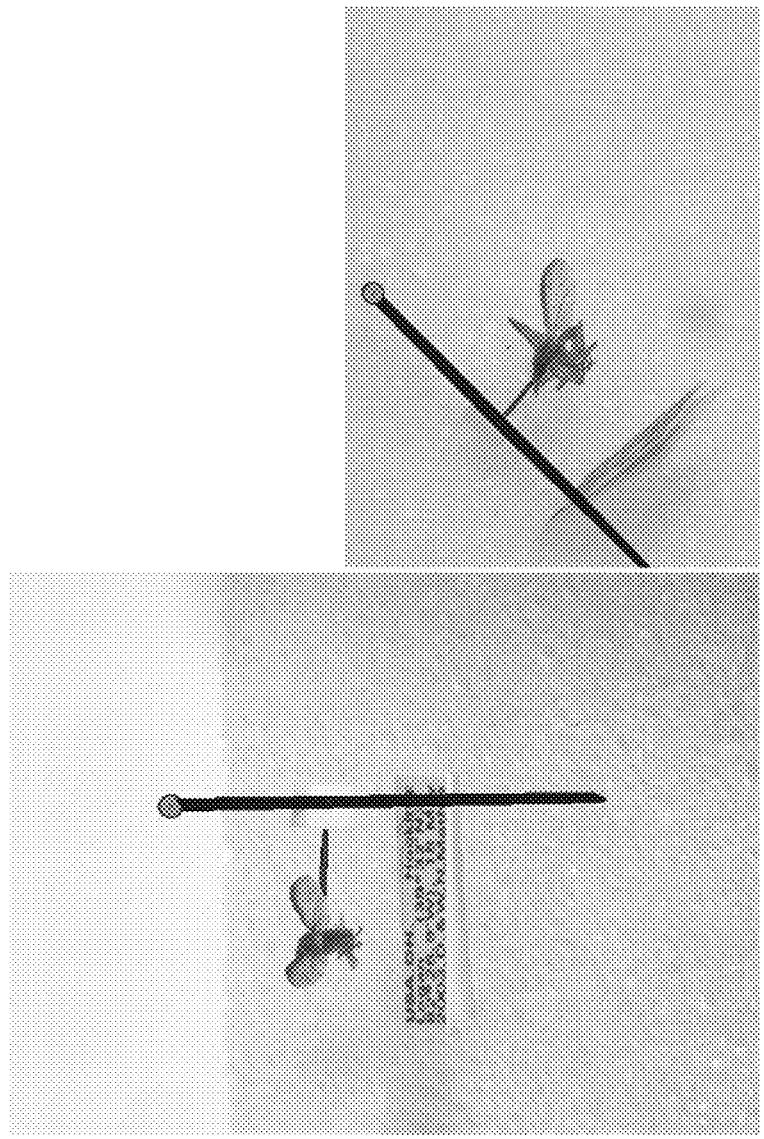
FIG. 6 is a set of schematically marked photographic views illustrating certain portions of a scene segmentation process carried out in accordance with an exemplary embodiment of the present invention with respect to an insect specimen work piece.

FIG. 6 shows that each pin, sub pin, and an estimated center point of the specimen are also discovered in each photo reference image. The image processing executed to carry out this process is described further in other sections herein.

Figure 7:
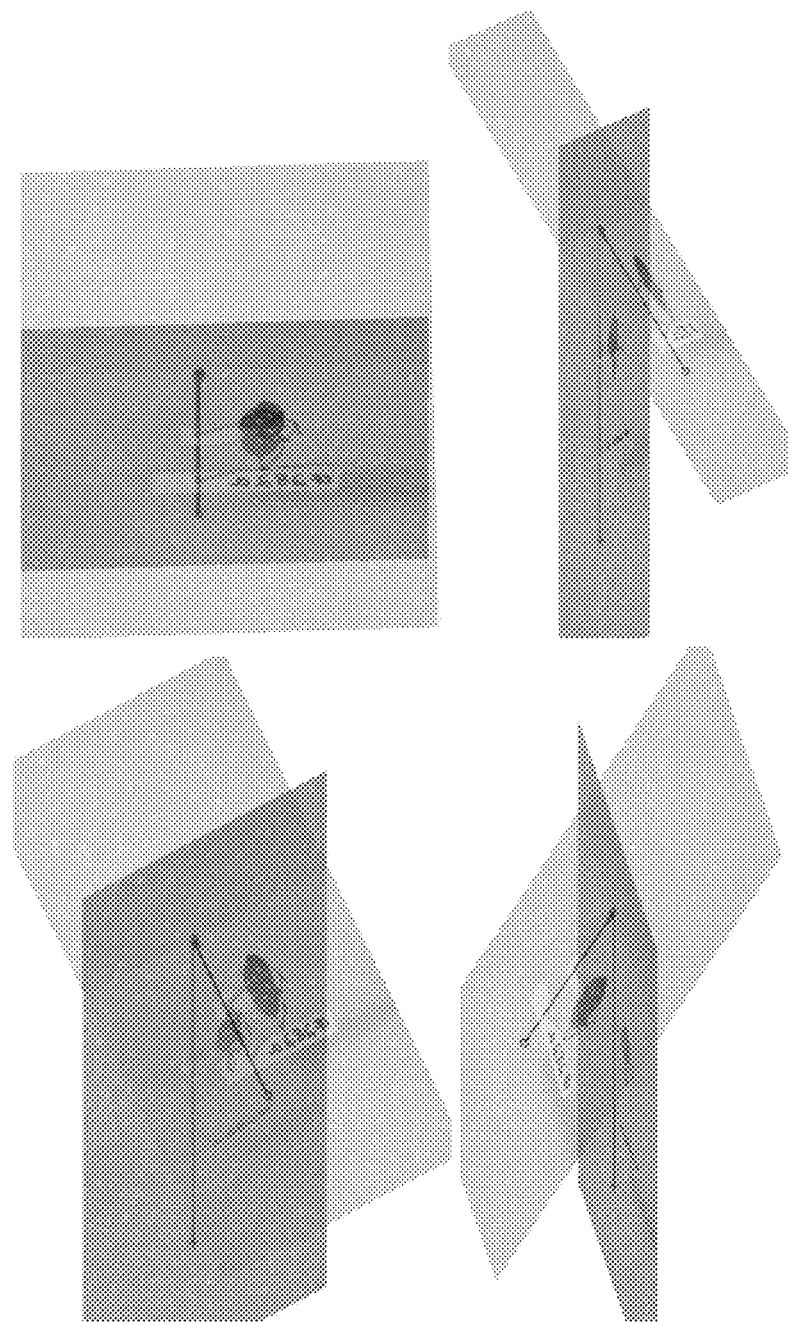
FIG. 7 is a set of photographic views and renderings illustrating a three-dimensional alignment of reference images in a scene segmentation process carried out in accordance with an exemplary embodiment of the present invention with respect to an insect specimen work piece.

FIG. 7 illustrates the combined use of acquired information about the pin shaft and domain knowledge thereof (e.g. the high-probability of the pin found in the reference images are in fact one and the same physical pin) enables matching of one image to another and estimating the likely angle of rotation of one relative to the other. Again, the image processing applied to carry out this process is described further in other sections herein. Projections may be made as to the intersections of one image on another in 3-D to estimate the relationship between their primary elements. With additional images, or given a priori knowledge of the actual rotation angles between the reference images and distance from the imaging camera, it becomes straightforward in consideration of the processes disclosed herein to create a projected 3-D model of each target region of the work piece and their relative locations. This process too is described in detail in other sections herein.

Figure 8A:
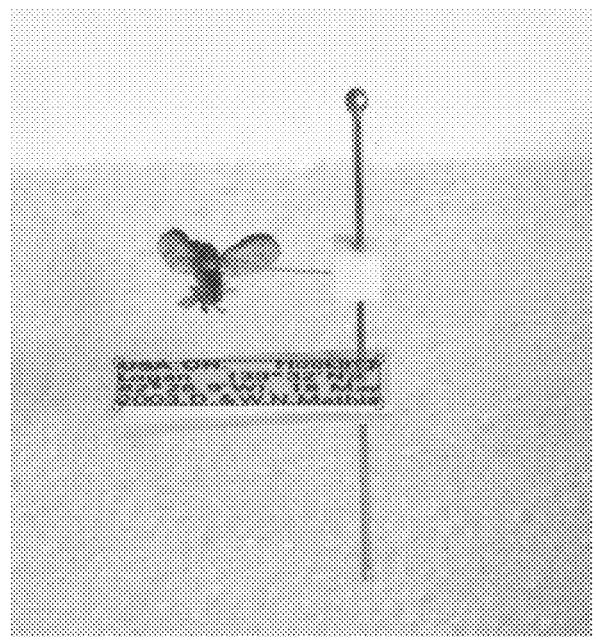
FIGS. 8A-B is a set of schematically marked photographic views illustrating label finding in a scene segmentation process carried out in accordance with an exemplary embodiment of the present invention with respect to an insect specimen work piece.
Figure 8B:
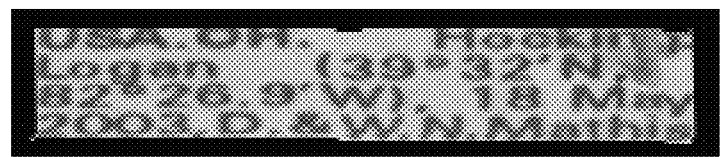

FIG. 8A schematically illustrates that in any particular image the label region may be suitably identified, and that having identified the label edges, a transform may be applied to effectively stretch and flatten (or appropriately square) the image to correct for visual distortion due to an oblique viewing perspective. This is shown via illustrative example in FIG. 8B. The process details are described in other sections herein.

FIG. 9A shows three similar images collected at known relative angles using an actuated manipulator to re-position one of the camera and work piece relative to the other. As described in following paragraphs, the reference images in this embodiment are collected in silhouette to increase contrast. In the first two images, the work piece is backlit against a work-cell backdrop, while the work piece in the last image is backlit against the manipulator mounting block. In each case, lighting is adjusted to optimize the effects. Using domain knowledge and processing as described below, the label regions, the biological specimen region and the pin structure region are identified in each image. Since the specimen work piece is positioned at a known angle and distance from a known camera lens, it is possible to convert the pixel locations of each region to millimeters of displacement from a known datum.

In the illustrated embodiment, processing executes in this regard using the first two images to locate the pin and its orientation, and the maximum possible extents of both the biological specimen and the label target regions. The third image is used to refine the resulting estimates by examining the data that falls in the projected areas in the given image. In general, the first two images provide an oversized parallelepiped model estimate of the label, which is reduced to a smaller, angularly oriented volume when the relative rotation angle between images about the z-axis is determined by additionally examining the last image. Similarly, the first two images provide an oversized ellipsoid encompassing the majority of the specimen body, which is reduced to an angularly oriented ellipsoid as determined by additionally examining the last image. This is described further in other sections herein.

FIG. 9B illustrates the projected 3-D model of the work piece structure based on the available reference images. The central pin pierces an ellipsoid that encompasses the biological specimen of interest and a rectangular parallelepiped which encompasses the given label. In the exemplary embodiment, the reference images are acquired at a known safe distance from all equipment in the work cell, and the peripheral extents of the pin, label region, and specimen region are referenced (with an additional clearance/buffer) in imaging acquisition path planning to ensure that no collisions occur in subsequent manipulation of the work piece or camera one with respect to the other. This is particularly important where close-up imagery is desired, under which circumstances the work-pieces may at times be within millimeters of the camera lens or nearby lighting equipment.

As illustrated in FIGS. 10A-10B, this 3-D structure model information may also be used to find lines of sight. The "*" characters in the spatial cube indicate desired points (or angles) of high-resolution image acquisition. The desired acquisition angle may be viewed as the line from the "*" to a centroid of the target of interest. In FIG. 10A, these acquisition points are shown for safely and clearly imaging the biological specimen. A planar surface is estimated that passes through the far edge label and is tangent to the near side of the ellipsoid surface. Each acquisition point must be above this plane in order for the label to avoid occluding the biological specimen. In the present example, the points all pass this test. This is because each of the illustrated points is disposed in the accessible hemisphere of the work piece space, on the biological specimen side of the label. Points in the other hemisphere would need to be adjusted if they were on the wrong side of the illustrated planes. In contrast, FIG. 10B illustrates the same construction where the label is the target. In this case the acquisition points "*" must be adjusted as shown by the lines and boxes to points on the plane in order to avoid occluding a portion of the label with the biological specimen. This processing is discussed further in other sections.

The desired acquisition points shown are merely examples of numerous possibilities appropriate for particularly intended applications. A user may pre-define any number of desired acquisition viewpoints relative to the general work piece configuration. These may include the acquisition only one or two images, or hundreds of images at any available angle. These pre-defined viewpoints are adaptively adjusted at run-time where necessary to actual work-piece features dynamically located within the 3-D scene. Thus, the label, for example, is preferably imaged from points established at an angle "above" and centered on each of its long edges—wherever those may lie in a given work piece that may be loaded. The specimen, in the illustrated examples, is preferably imaged from a set of points evenly spaced around a sphere (minus the label-occluded underside), where this spherical constellation of acquisition points is adaptively translated to center on the target insect specimen and is adaptively rotated so that these points align with the major axis of the insect specimen. This facilitates views that are directly head-on, top-down, side-on, and so forth among the collected images. In alternate applications of the subject system, a user may simply pre-define a single side view and a single top-view of the insect specimen work piece for purposes of cataloging. Alternatively, a user may define specific views of interest—such as a close up of an eye, wing, or limb—which again will be adapted to the specific work piece to establish actual physical angles for imaging responsive to features located during scene segmentation. Finally, the features of the insect specimen (its body center points and major axes) described herein are provided as examples, without limitation. In alternate embodiments of the subject system and method, additional image processing may be instantiated which identifies specific features within an insect (such as a wing, eye, leg, etc.) by their visual signature, thus permitting adaptive imaging relative to such features of interest.

Figure 11:
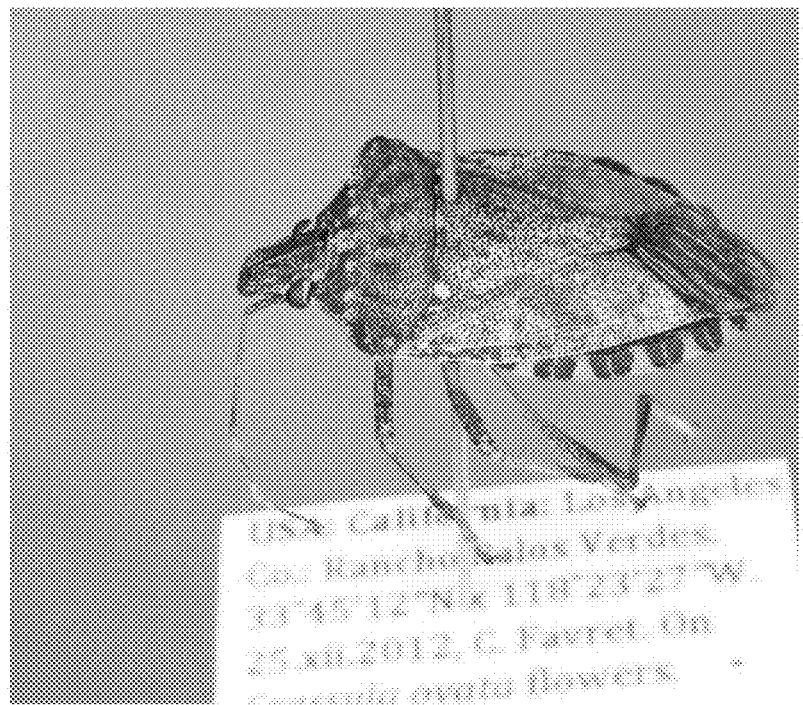
FIG. 11 is a set of photographic views illustrating sample images adaptively acquired for an insect specimen work pieces in accordance with an exemplary embodiment of the present invention.
Figure 11:
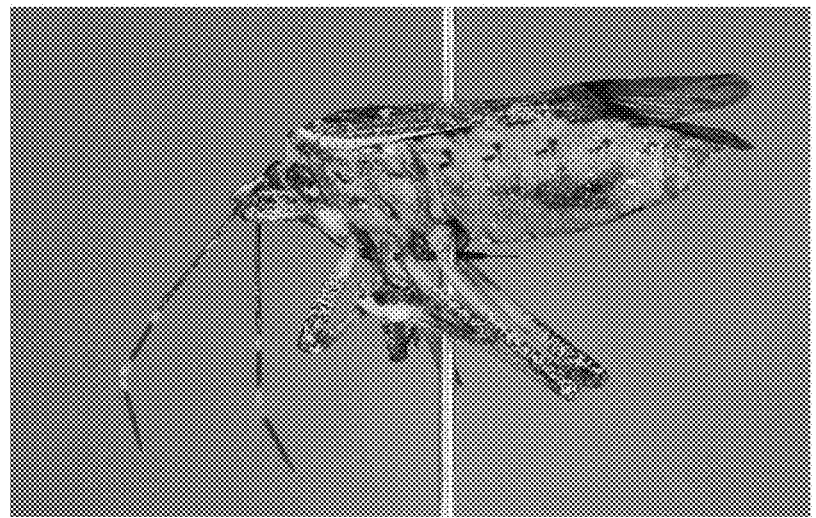
Figure 12A:
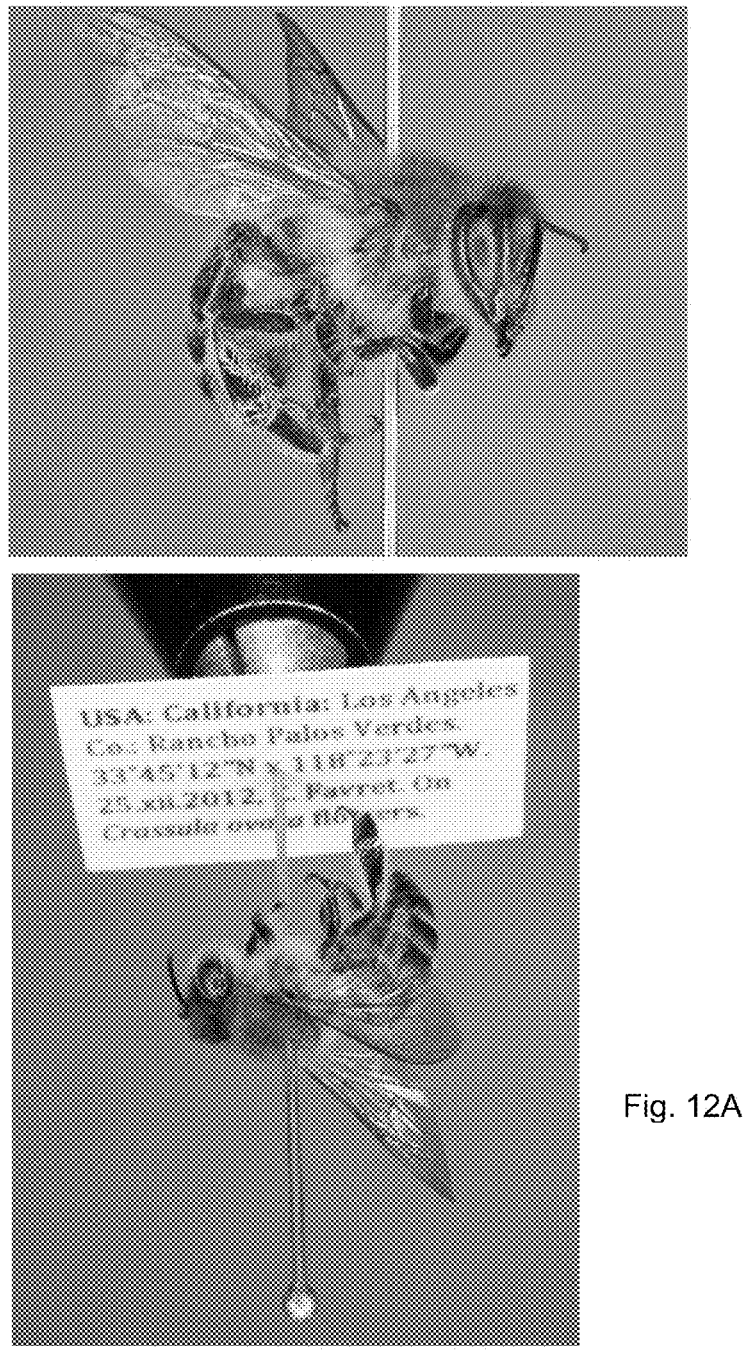
FIGS. 12A-12B is a set of photographic views illustrating sample images adaptively acquired for different features distinguished for an insect specimen work pieces in accordance with an exemplary embodiment of the present invention.
Figure 12B:
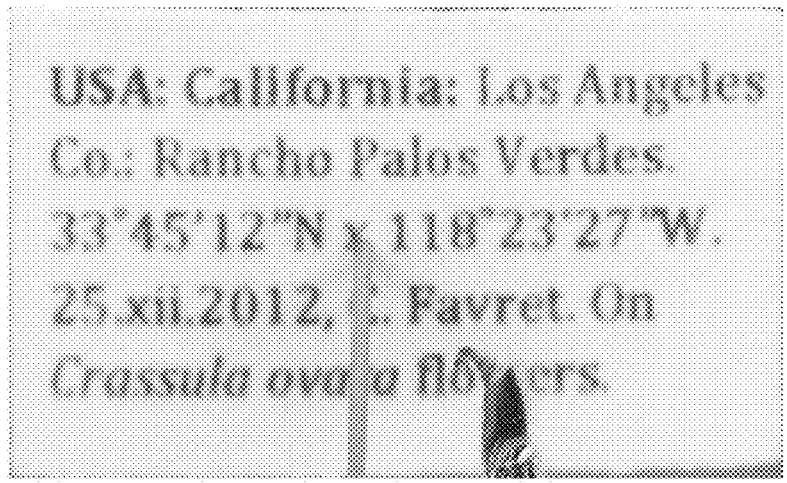

FIG. 11 shows demonstrative images of a sample specimen which illustrate that, using these corrections, the system may safely acquire extremely close-in images of the specimen at high-resolution, aiming accurately at the specimen and moving quite close to it if necessary. FIG. 12A shows demonstrative images which illustrate that the system may likewise obtain close in, high resolution images accurately aimed at the label and at the label side of the specimen to obtain images of the same at an angle with little or no occlusion. FIG. 12B shows a demonstrative image of the same label image (of FIG. 12A) cropped and flattened (or squared) using processes described herein. Generally in accordance with the illustrative embodiment, at least two images of the label will be obtained, one from each side of the pin, such that information is available to combine and to fill-in any text that is missing in one or the other image due to occlusion by the pin.

Figure 13:
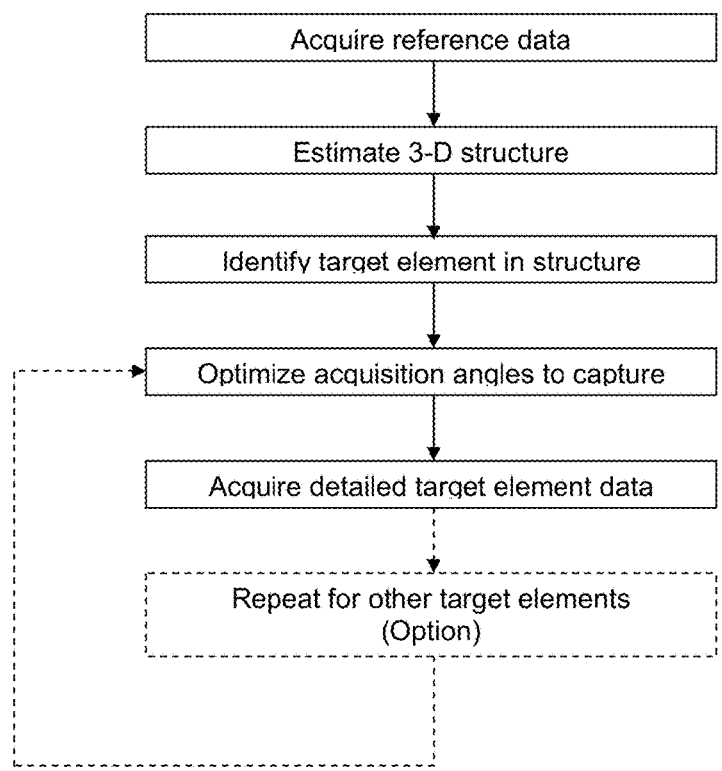
FIG. 13 is a flow chart illustrating a flow of processes for an adaptive imaging operation generally carried out on a work piece by a system formed in accordance with an exemplary embodiment of the present invention.

Turning to FIG. 13, there is shown a flow chart illustrating an exemplary flow of processes in accordance with an exemplary embodiment of the present invention for substantially standardized imaging of variously configured specimen work pieces in adaptively conformed manner. The flow of processes begins by acquiring reference data, such as in the preliminary capture of two or more reference images as described herein. From this data a 3-D structure is estimated for the given specimen work piece. This may involve only the data at hand, or may incorporate domain knowledge of the specimen type. Using the estimated 3-D structure model, the flow next proceeds to a process of identify target elements of interest in the work piece, either by their signatures or by physical reference to other identifiable structures on the specimen work piece. Then, an acquisition angle is optimized, and the specimen work piece is positioned at such angle, orientation, and distance relative to the camera or other imaging unit as is appropriate to obtain a detailed scan, image, or other data while avoiding visual occlusions and physical collisions. Next, the detailed scan, image, or other data is acquired for a target element of interest in the work piece. This process is repeated for other target elements of interest, if any, that have been identified.

Figure 14:
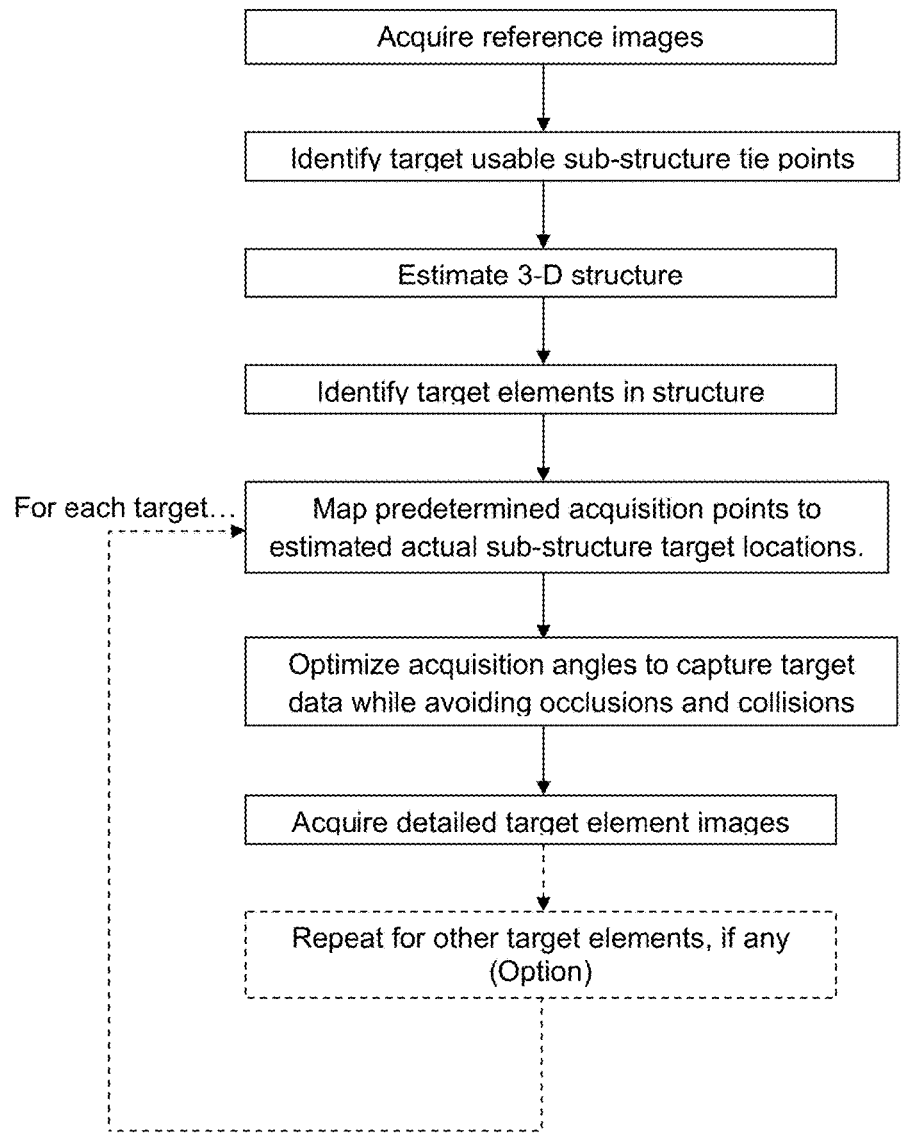
FIG. 14 is a flow chart illustrating a more detailed flow of processes for an adaptive imaging operation generally carried out on a specimen work piece by a system formed in accordance with an exemplary embodiment of the present invention.

FIG. 14 shows a flow chart that illustrates an exemplary flow of processes in accordance with certain embodiments of the present invention using only imagery. Reference images are acquired, preferably but not necessarily, at known angles, distances, and orientations relative to some predetermined fixed datum. Targets are identified within the work piece structure that are usable as tie points common to multiple reference images. From the projected intersection of the tie points in space, a 3-D structure is estimated which is sufficient to guide path planning Target elements are identified by their location and orientation in the 3-D structure. For each such target, a set of predetermined acquisition points are mapped to the actual estimated target locations in the given work piece. Acquisition angles are optimized to capture target data from points at or near these desired points while avoiding occlusions and collisions. Detailed target element images are acquired from each viable point, with the process repeated for other targets, if any.

Figure 15:
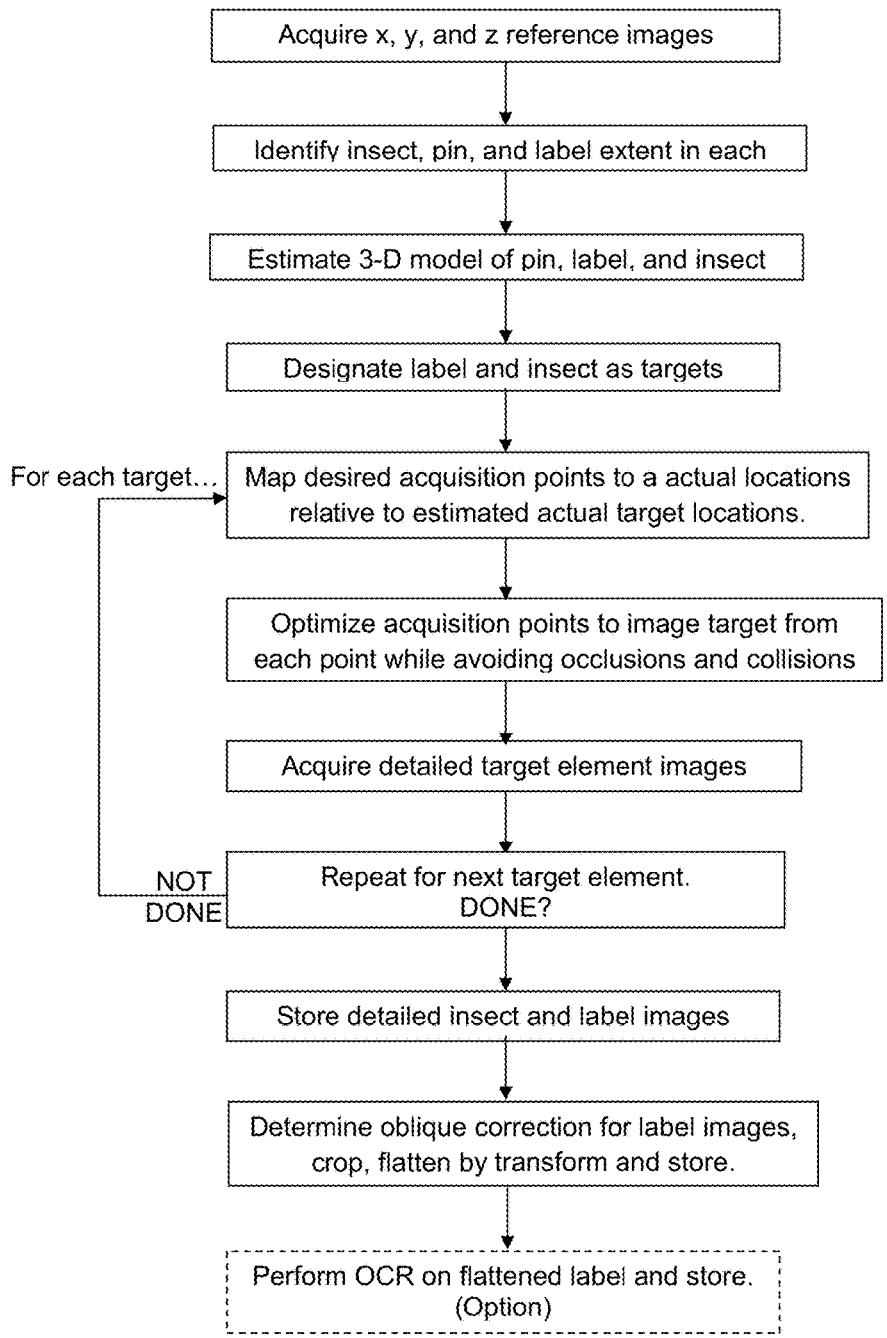
FIG. 15 is a flow chart illustrating a flow of processes for an adaptive imaging operation carried out on a pinned insect specimen work piece by a system formed in accordance with an exemplary embodiment of the present invention.

FIG. 15 shows a flow chart that illustrates an exemplary flow of processes in accordance with certain embodiments of the present invention using orthogonal guide imagery of a pinned insect target of the work piece. Reference images are acquired at known orthogonal orientations and known distances relative to some fixed datum. The insect, pin, and label within each image are identified. Then, a user finds and projects the slopes of the pin structures to estimate a 3-D wire-frame structure of pin orientations relative to the datum. The intersection of the label and insect specimen edges are projected onto corresponding planes to place these two volumetric targets on a wire-frame-abstracted structure. The label and insect specimen are designated as acquisition targets, each with their own set of desired relative imaging angles. For each of these targets, a set of predetermined desired acquisition points to the actual estimated target locations in the instant work piece is mapped. Acquisition angles are optimized to capture target data from points at or near these desired points while avoiding occlusions and collisions. Target element images are acquired from each viable point, and the process is repeated for other targets, if any. Detailed insect and label images taken from each acquisition point are stored. Further processes include determining oblique correction for the label images, cropping, flattening by transform, and storing an orthogonally projected image of the label (thereby made to appear as if it had been imaged from a straight top down vantage point). In certain embodiments, OCR (optical character recognition) is subsequently performed on the labels and the recovered textual data is stored.

Figure 16:
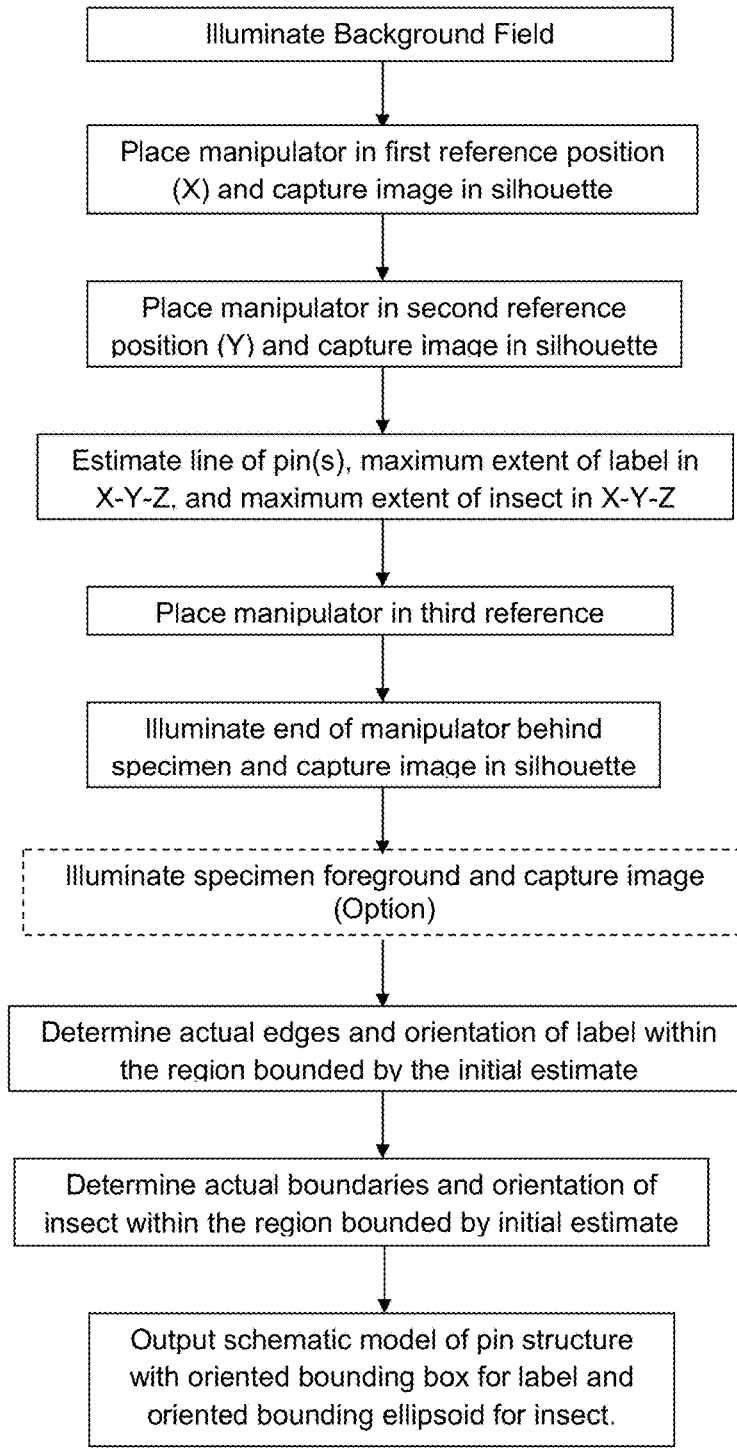
FIG. 16 is a flow chart illustrating a flow of processes for an adaptive imaging operation carried out on a pinned insect specimen work piece by a multi-axis manipulator-based system formed in accordance with an exemplary embodiment of the present invention.

FIG. 16 shows a flow chart that illustrates an exemplary flow of processes in accordance with certain embodiments of the present invention relating to the preliminary acquisition of reference images for scene segmentation purposes, as indicated in FIG. 15. The acquisition proceeds as follows. First, the background field is illuminated, then the manipulator is placed at a first reference position (X) and a first reference image of the work piece is captured in silhouette. With the same illumination, the manipulator rotates the work piece, preferably by approximately 90 degrees, to a second reference position (Y), and a second reference image of the work piece is captured in silhouette. The lines of the pin and any sub-pins in the work piece are estimated to provide a 3-D wire-frame model of the pin structure, and the maximum extent of the label and of the insect specimen are determined by projected intersections of the two reference images. Next, the manipulator is placed in a third reference position (Z), and the effector end of the manipulator is illuminated, preferably so that the mounting block there reflects to effectively backlight the label and insect from underneath. (Note that this may be achieved by direct light sources or by placing an illumination panel directly on the manipulator-head mounting block.) A third reference image is thereby captured in silhouette.

In accordance with certain embodiments, the illumination is such that the label is silhouetted at one level of darkness while the insect is silhouetted at a more intense level of darkness, thus allowing discrimination to be made between one another. In certain cases, the insect may fully occlude the label, thus, in certain embodiments, the orientation of the insect may be used to guide the estimated orientation of the label. In certain cases, the insect may not be fully visible, thus the orientation of the label may be used to guide the estimated orientation of the insect. In certain cases, contrast will not permit identification of either structure, thus the system may then discard the third reference image and generate the maximum extent estimates based only on the first two reference images, X and Y, to guide estimation of all aspects of the model.

As indicated by the "optional" block of the flowchart in FIG. 16, in some embodiments a fourth reference image is collected in the final (Z) orientation with the foreground illuminated. This may be used in combination with the previous silhouetted image to improve identification of relevant label and insect edge extents by approaches described in other sections herein.

Pursuant to the flow chart in FIG. 16, using one or more of the techniques herein described, the system determines a final working estimate of the actual edges and orientation of the label within the region initially estimated based on the X and Y images. Likewise, using one or more of the techniques herein described, the system determines a final working estimate of the actual edges and orientation of the insect within the region bounded by the region initially estimated based on the X and Y images.

The result of this process is a schematic model including a wire-frame representation of the pin structure, with an angularly oriented, bounding rectangular parallelepiped box about the label and an angularly oriented, bounding ellipsoid about the insect.

Automated Processes to Feed Specimen Work Pieces

The system as implemented in the exemplary embodiment illustrated operates upon a single specimen work piece at a time. Such a work piece may be loaded by hand, very quickly by a human operator. To further speed operation, a pick-and-place operation provided by either a second robot manipulator or the same robot manipulator may serve to load each work piece automatically, as described in preceding paragraphs. Thus, a collection of specimen work pieces may be laid out in a pallet (a two dimensional work space) or placed in series on a moving belt which brings each specimen work piece (or set thereof) within working reach of the robotic system sequentially.

Where the camera or other imaging unit is in motion, sequences of work pieces will, in certain embodiments, be left on the feed pallet or feed belt while actual image collection is undertaken. However, in the illustrated embodiment, placing each work piece specimen sequentially into a work zone will facilitate additional flexibility in imaging the work piece from all directions without interference from either the feed mechanism or other neighboring work piece specimens.

Example: Image Finding Software for Scene Segmentation

Images preliminary captured and collected for adaptive work piece referencing purpose may be processed directly, or may be pre-processed by several measures in order to reduce the problem space. Since the manipulator is able to place the work piece precisely (calibration issues are addressed in another section), and since the given manipulator hardware is known, one useful step is pre-cropping the image. For example, in the X and Y reference images, the degree to which the gripping device (pin-vice chuck, etc.) is visible in the image is established by the image acquisition point positions relative to the work piece from which the camera acquires the images. Thus, in certain embodiments, the subject system is able to crop out visible portions of the overall imaged structure before processing. Likewise, in reference image Z, known aspects of the manipulator are visible, and these are likewise cropped in certain embodiments. Capture of a fourth, foreground illuminated version of the Z reference image is also made, where appropriate for a particular application, to aid in ascertaining which aspects of the manipulator and gripping structure are occluded by the work piece itself. Also, in certain embodiments, the known angles of capture for the images relative to the camera may be used to aid in both finding label edges and in flattening these edges with a precise oblique correction.

Pin Finding Example

To find the pin in a reference image, the system preferably calculates a Hough Transform of the image and finds the largest line based thereon. The Hough Transform preferably requires that an image be binary, black and white valued. To accomplish this, a local standard deviation filter of the image about each pixel is calculated. Both the standard deviation image and the input image are then converted to black and white by applying a threshold, and any small holes in these images are filled. The system then performs a logical AND operation between the binary images to achieve operative source data for the Hough Transform. A gap filling process is then executed to generate the longest possible lines in each case, and from these linked segments "top" and "bottom" endpoints are discovered for the primary pin. Additional sub-pins are extracted iteratively in similar manner. It is notable that if a pin is bent, then estimates of the pin endpoints may not be accurately indicative of where the pin is actually located. Thus, in certain embodiments, additional filters may be applied to determine such deviations and define buffer zones about a wire-frame model of the given pin.

Specimen Finding Example

To locate the insect in an image, in accordance with an exemplary embodiment, the image is convolved with a small kernel of predetermined values to find matched dark regions that are locally contiguous. The system then determines where the insect specimen ends and where background begins (boundary detection). Next, the system eliminates multiple region hits to obtain a single high-confidence location estimate for the specimen in a given image. To do so, a dynamic threshold is applied to the convolution. The threshold value is determined from the range of the convolution values, using a formula that has been heuristically adjusted to the work piece type. Applying a threshold to the data provides a binary image mask, in which the specimen is defined as the particular sub-region that contains the peak values of the original convolution. Finally, this region is buffered by a predetermined number of pixels to ensure that the majority of the specimen is captured. This approach has limitations in that lighter regions of the specimen (e.g. wings of the insect specimen) may not be fully contained in the estimated specimen region. This can be addressed by other suitable techniques known in the art but not herein described. However, this is not generally a problem with regard to the reference acquisition techniques disclosed, since a primary goal in this regard is to enclose the major portion of the specimen in an ellipsoid for fine image targeting and for collision avoidance.

Label Finding Example

To find the label in an image in accordance with an exemplary embodiment, the system first finds both the pin and the specimen as described above. By subtraction, the system eliminates the pin and specimen, along with the background, leaving only the labels. To eliminate the background, a grayscale image is calculated according to the equation: $I=(r+g)/2-b$ (where r, g, and b denote the red, green, and blue pixel values of the input image). A threshold is then established using a mean value that is offset by a predetermined portion of the standard deviation, keeping all pixels below this value. The illustrated example is tuned for a yellow background, and different background colors require adjustment to the threshold formula. Thereafter, a binary mask image of the pin is created by estimating that all points within a predetermined number of pixels of the pin line are on the pin. The pin and the specimen (whose black and white image has already been obtained) are additionally removed from the background-eliminated image by subtraction. This leaves only the label and any missed pieces of specimen or pin.

In certain embodiments, the remainder of the specimen is eliminated using domain knowledge. For example, imposing the domain knowledge that a label necessarily resides physically beneath a specimen on a pin means that the label pixels must lie correspondingly below the lowest pixel of the specimen. Filtering the image then eliminates areas that have too few pixels, using a test that compares the density of pixels of the input image. Finally, label pieces that were separated during prior elimination of the pin are rejoined. To do this, the system first finds label pixels on one side that are within a predetermined number of pixels from any label bit on the other side, and joins the two closest label pieces. Note that the system does not assume that only one label is present. Consequently, multiple stacked labels may be successfully detected in this manner.

Other Processing Techniques:

The above descriptions disclose exemplary embodiments for finding certain target/feature types. Other suitable techniques known in the image processing art may be employed in alternate embodiments to find other target and feature types. For example, color or texture filtering may be used to aid in finding a pin-head or pin. Entropy filters may be used to aid in finding a specimen and to help differentiate between a label and background. FIGS. 5 and 6 illustrate application of such techniques in conjunction with those described above for processing two images. FIG. 7 illustrates the use of domain knowledge coupled with these point extractions to determine the arbitrary relative angle at which two images of the same specimen were acquired.

Example: 3-D Specimen Model Estimation Software for Scene Segmentation

Stick Figure Creation:

To create a stick figure model of the specimen, label, and pin, in an exemplary embodiment, the system processes at least two images preferably in substantially perpendicular directions (but at least from two independent view angles) at approximately the height of the specimen work piece. While the specimen work piece does not have to be oriented in a specific manner, in the initial reference images, they should be substantially at the same height. In accordance with certain aspects of the illustrated process, if there are multiple labels in a stack, the system deals namely with the top label. This allows the system to perform all three of the previous procedures on both images and then cross reference them with one another to create 3-D structures for each of the three objects. The primary pin is preferably defined as simply a line segment. The specimen is preferably defined by an enveloping ellipsoid with a radius in each dimension large enough to reach all endpoints of the insect (and a center at the center point). The label is defined by an enveloping box that encompasses all points associated with the label in both images.

Figure 17A:
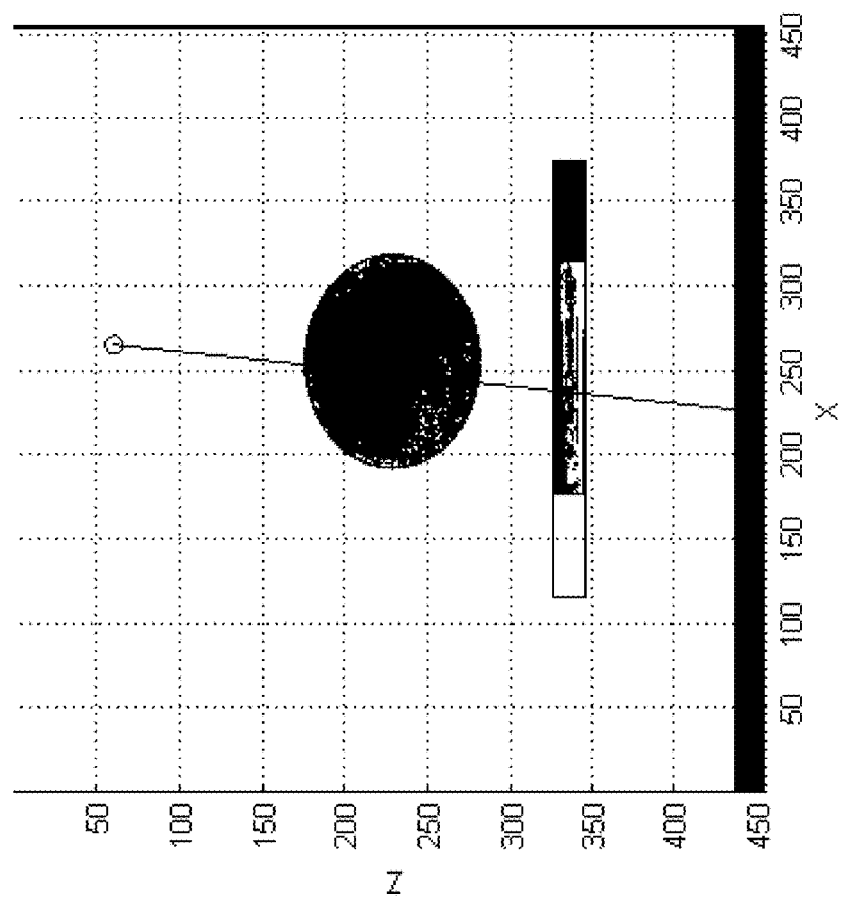
FIGS. 17a-d is a set of graphic renderings illustrating the use of three orthogonal images to accumulate a 3-D estimate of a work-piece structure marked in a scene segmentation process carried out in accordance with an exemplary embodiment of the present invention with respect to an insect specimen work piece.
Figure 17B:
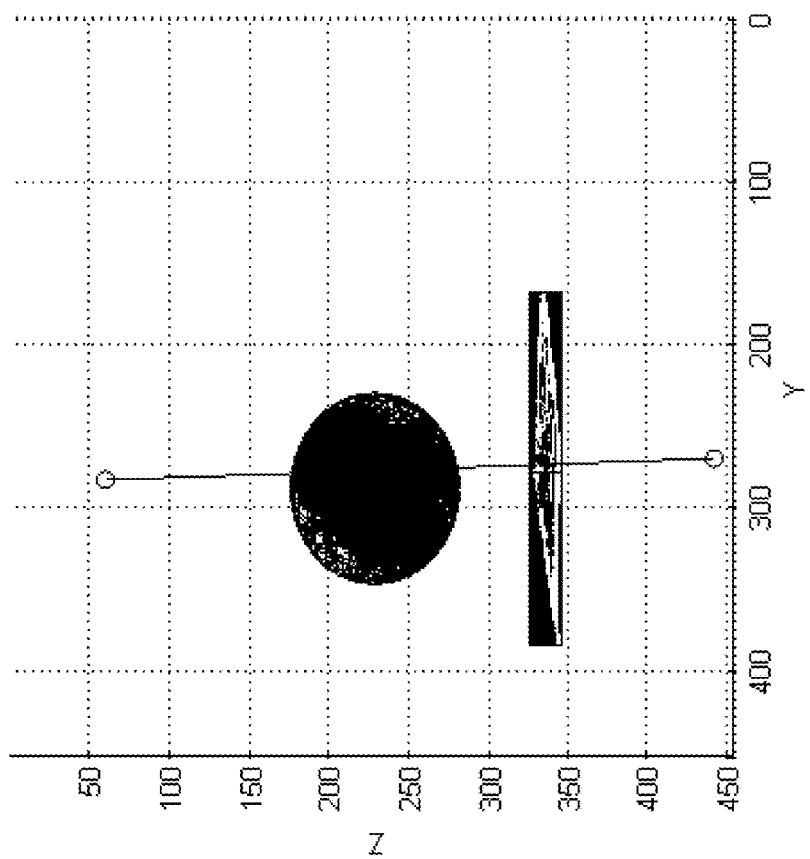

FIGS. 17a and 17b illustrate the ellipsoid and box projected respectively in the x-z and y-z planes. Assuming that the reference images were mutually orthogonal, the projected ellipse is sized to cover the specimen region in each view, and the projected box is sized to cover the label region in each view. The pin is projected in each view, and is fully defined, since both (x,z) and (y,z) endpoints are ascertained, which taken together provide (x,y,z). The label box and the specimen ellipsoid comprise maximal spaces since their orientation with respect to the z axis has not been measured. It will be apparent to those skilled in the art that generalized (non-orthogonal) rotations may be projected onto the x,y,z space in a similar fashion.

Orientation Calculation:

The preceding processes do not provide orientation information about the specimen (or the label) with respect to the z axis. Such information is obtained, in accordance with certain exemplary embodiments, by acquiring a third image. With respect to the previous two images, this third image is preferably taken looking down on the work piece from above. For purposes of the illustrative embodiment, it is assumed that the third image is strictly orthogonal to the other two, but such relative orientation is not required and may vary depending on the particular application. To determine the orientation of the target features, the system performs the specimen finding (as described in preceding paragraphs), and the label finding (in this case, without the need for cross-pin reconstruction). Then, all small holes in the black and white label image are filled in, and those pixels not within the rectangular box defined by the two previous images are eliminated. Then the edges of this binary image are found, and the Hough Transform of the resulting binary image is calculated. In the illustrated process, the four largest peaks in the Hough Transform are found next, and the line segments associated with them are calculated, filling in all gaps. The intersection points of these four lines are determined by extending them to the edge of the image. Thus, the four corners of the label may be estimated.

To calculate the rotation angle of the label, the system preferably takes all eight corners of the 3-D label model (the four corners at each of the min and max height of the previous label box) and calculates the mean position to obtain a center point. The center point defined by all eight points is then subtracted and converted from Cartesian coordinates to cylindrical coordinates. Next, the average angle of all points is calculated, and this calculation yields the estimated orientation angle of the label.

Figure 17C:
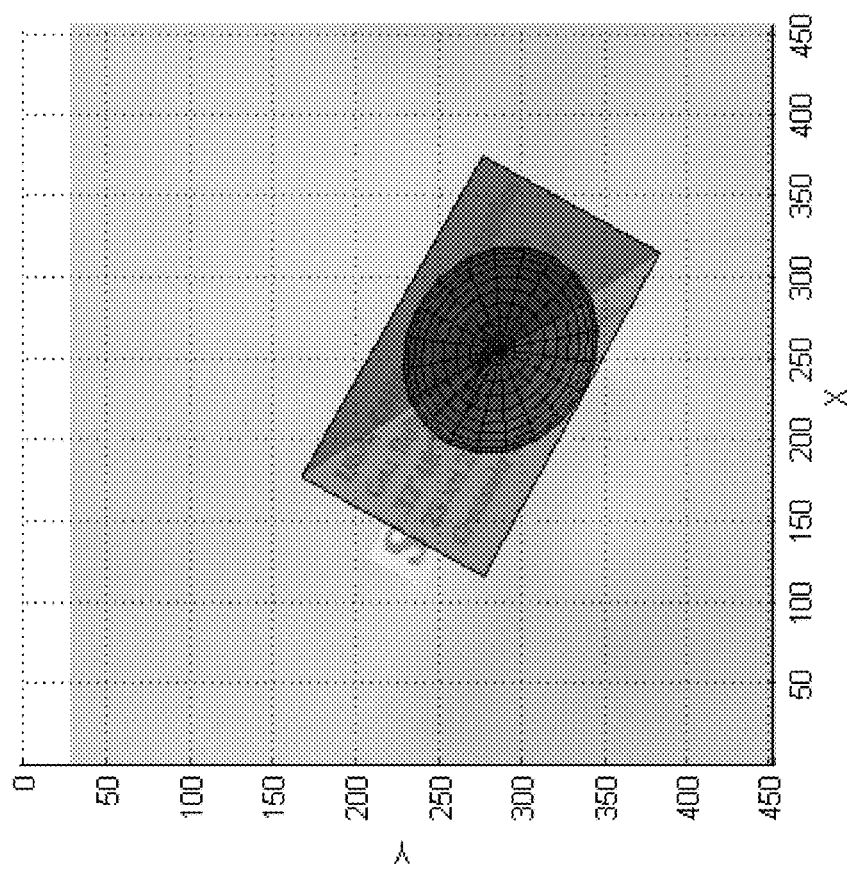
Figure 17D:
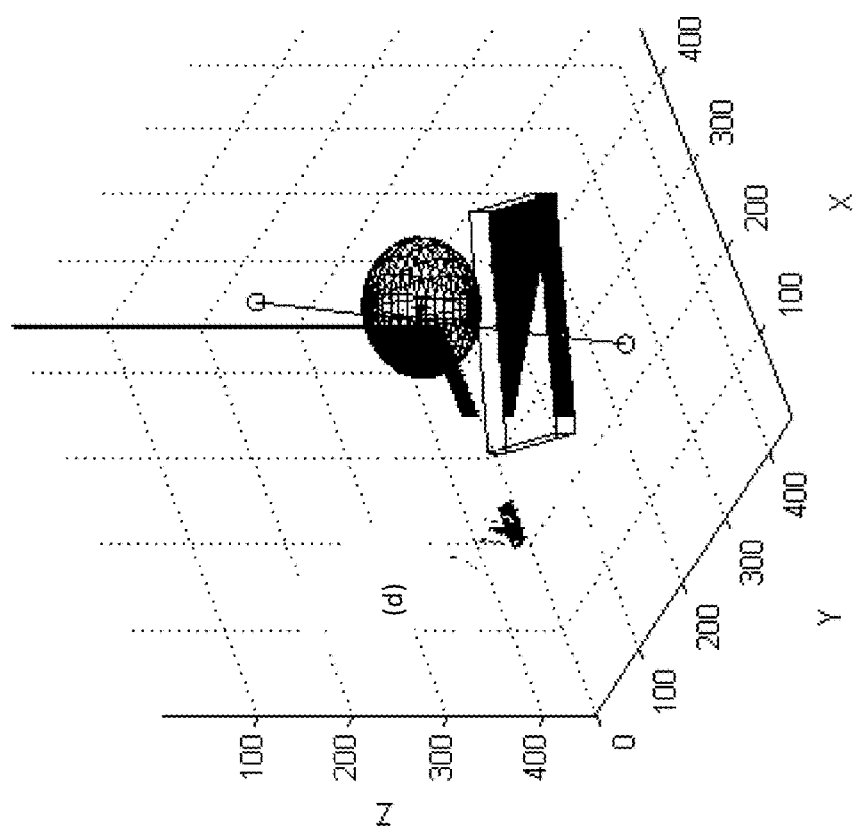

In certain embodiments, the specimen ellipsoid is refined by taking the binary image of the third reference image and rotating it by the orientation angle, and then re-calculating the x and y radii as before to obtain the radii of the rotated ellipsoid. (See FIG. 17c.) In other embodiments, treating the specimen as before, a bounding ellipsoid is calculated in the projected x-y plane, selecting an orientation defined by the maximum semi-axis of this bounding ellipsoid. The system is able to thus project the final stick-figure into 3-D space, as shown in FIG. 17d.

In the exemplary embodiment, the assumption is made that the third image is positioned above the insect specimen and at the same zoom/resolution with respect to the camera as for the previous images. To compensate in this regard, adjustments may be made in the scale or orientation of the reference images relative to each other. In certain embodiments, domain knowledge may be used to determine the likelihood of the insect specimen being aligned with the label.

Example: Specimen and Label Viewing Angle Verification Software for Adaptively Conformed Image Acquisition Using the 3-D model and orientation information computed from the reference images captured for scene segmentation, the system preferably defines the limit of the viewing angle for optimally viewing the information-bearing face of label clear of the specimen. The system also defines the limit of the viewing angle for viewing the specimen clear of the label. Referring back to FIG. 18, the angle limits are found to be essentially the same, just defined at different sides of the limit planes 1803 and 1804. To compute the limit plane angles, a line intersecting the edge of the label 1802 and the opposite side tangent of the specimen ellipsoid 1801 is defined, and the angle of this line is calculated. The line is then extended into a plane in the depth dimension of the plot (see the angled planes illustrated in FIGS. 10A-B). For simplicity, it is assumed that in the plotted lines of FIG. 18, within the two dimensions being considered, the specimen is enveloped by a circle 1805 (not an ellipse 1801). This is a simplifying assumption used in certain embodiments; however, the corresponding equation may also be solved using an ellipse 1803 resulting in slightly modified limit planes (not shown), and such is implemented in preferred embodiments.

To calculate achievable acquisition points, the system in an exemplary embodiment takes a set of desired acquisition points (predefined or input) in spherical coordinates and determines if they are achievable. By computing the normal vectors of each plane (forcing them all to be pointed away from the specimen), the directionally signed distance of each input point to each of the planes is calculated (the sign determining if the line is in the same direction as the plane's normal vector). If an input point is not achievable, it is moved to an approximated point on the nearest plane. In certain embodiments, the point is maintained at a fixed azimuth angle relative to the specimen but moved along the plane to keep the radius to the specimen at a certain constant value suited to the particular application intended. The point is checked to make sure that it is closer to its original location than any other point, and ensure that it has not entered the box defined by extending the x-y points of the label from the minimum label height to the top of the specimen's ellipsoid. This last step ensures that image acquisition is not attempted from a point between the label and insect specimen, which would undoubtedly prompt a collision between the work piece and the camera lens.

Referring back to FIG. 10A, examples of acquisition points for imaging the specimen are illustrated. The blue ellipsoid 90 represents the peripheral extent of the specimen, while the darker red box 95 represents the peripheral extent of the label. The lighter red box represents the exclusion box that extends from the bottom of the label to the top of the specimen. The cyan and magenta planes indicate the maximum viewing angles from which the camera or other imaging unit maintains a non-occluded, unshielded view of the specimen (magenta is in the long direction of the specimen and label, cyan in the short direction). The cyan and magenta lines indicate the normal vectors to the planes. The stars indicate the input insect specimen acquisition (or imaging) points, while the green circles indicate accepted input acquisition points. The green squares indicate adjusted point locations for input acquisition points which required adjusting movement to an acceptable location. The red squares indicate that their corresponding input points were found unachievable.

Referring back to FIG. 10B, examples of acquisition points for imaging the label are illustrate. In this example, eight acquisition points are shown. The other graphic elements schematically shown are much the same as shown in FIG. 10A; however, in this example all of the initially desired 45 degree acquisition points are rejected and moved outward to the nearest plane. Acquiring images from the green squares ensures that the entire label is visible and not occluded by the specimen.

Camera to Actuator/Manipulator Calibration

As mentioned in preceding paragraphs, the relationship between image pixels and spatial points is a notable factor. Calibration is important in order to coordinate an imaging unit's views with the physical environment so that the scene features imaged thereby may be accurately tied to a physical point. FIG. 23 illustrates exemplary measures taken for proper coordination of the imaging and manipulator units. In FIG. 23(b), a camera or other imaging unit 2301 is assumed to be approximately aligned and placed with respect to a set of absolute coordinates in space 2302, denoted by (X,Y,Z). The coordinate space 2302 is preferably defined such that the manipulator unit (implemented in the illustrated application as a multi-axis robotic manipulator arm 2307) is able to reproducibly locate itself therein with high precision. In order to acquire reference images as described herein (for scene segmentation) that may be subsequently used to accurately place a work piece, the optical axis of the camera lens 2301 must be referenced within coordinate space 2302. In particular, it is often difficult to precisely align a physical camera within a fixed space since small offsets of the lens optical axis relative to the outer container and minute residual offsets of the CCD (or other imaging plate) in the camera relative to the lens are ordinary and common in manufacture. Thus, mere physical alignment of the housing for camera lens 2301 with the axis is generally not sufficient for proper optical alignment. Even with sufficient compensation could be made with physical alignment, extremely precise and delicate set screw adjustments would be required.

The system in the illustrated embodiment carries out quick determination of the actual optical axis of alignment and enables subsequent adjustment of manipulator motions to compensate for any shift in rotation relative to the absolute reference frame 2302. This obviates the need for high-precision mechanical pre-alignment of the camera imaging unit. Toward that end, it is assumed in the illustrated case that the target 2306 is under precise control of the manipulator 2307 with regard to its placement and orientation in space. The optical axis of the camera 2303 is defined by a ray extending to the center pixel of the CCD through the center of the lens, oriented so that any motion therealong would place a subject precisely over the same center pixel of the CCD no matter the distance therefrom.

Figure 23A:
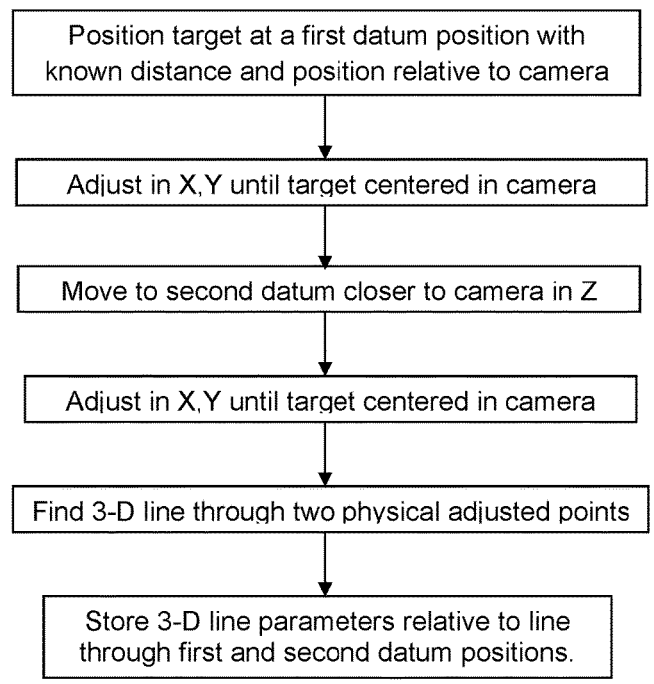
FIGS. 23(a)-(b) are a flow chart and schematic diagram directed to a calibration process carried out by a multi-axis manipulator based system formed in accordance with an exemplary embodiment of the present invention for adaptively imaging a specimen work piece.
Figure 23B:
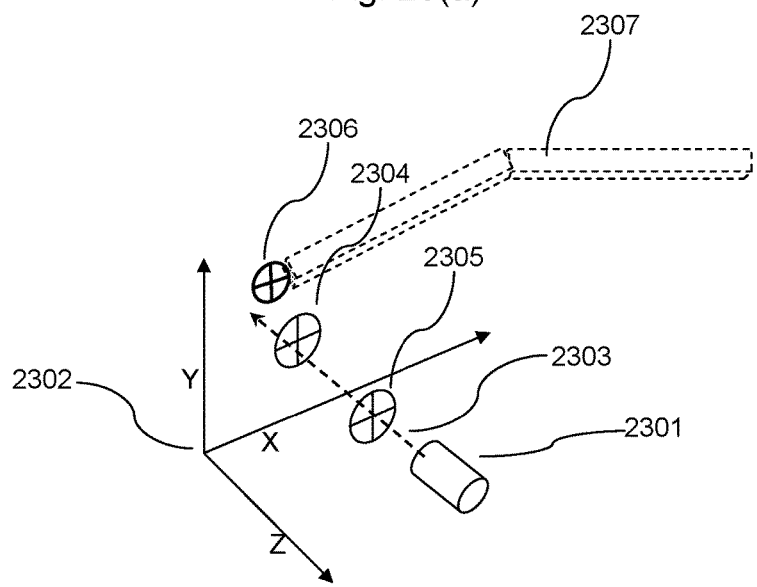

As illustrated in the flow chart of FIG. 23(a), calibration is preferably carried out by first positioning a target 2306 at a known first datum 2304 disposed at fixed distance/point in the absolute coordinate system 2302. The manipulator 2307 is adjusted in (X,Y) dimensions in small motion increments until the target appears centered in the camera 2301. This may be achieved by automatic processing or by manual adjustments to center the target in the cross hairs of the camera's view finder. The X, Y deltas from the first datum are noted and stored. The target is then moved to a second datum 2305. (This second datum is shown closer to the camera 2301, but the order of datum points may be reversed in other applications.) Again, the manipulator 2307 is adjusted in small motion increments in (X,Y) until the target appears centered in the camera's view finder. The X,Y deltas from the second datum are noted and stored. The line in 3-D which passes through the offset points may be then be found, and the datum points used to translate the line for placement in absolute space 2302.

By defining a second coordinate system such that the z axis is parallel to the found camera center ray, and noting the location of the closest center point to the camera, translation from one coordinate system to another may be effected by suitable change of basis operations.

The calibration may be carried in an exemplary embodiment according to the following illustrative steps:

1. Move the robot to the estimated location putting the end of the chuck in the center of the field of view of the camera at a fixed distance (e.g. 65 mm) away—this is the location where the insect is intended to be positioned later.
2. Jog the robot to put the center of the chuck in the center of the image.
3. Save the current location of the tool point (caliPt) and move the robot to the second fixed datum with less distance (e.g. 20 mm) between the camera and the tip of the chuck.
4. Jog the robot to place the center of the chuck in the center of the image.
5. Saved current location of the tool point (cal2Pt).
6a. Camera on arm:

Coordinates are for the tool point, (X,Y,Z) are in mm, and (U,V,W) are in degrees $$X = (0 - cal1Pt_z) \cdot \frac{cal2Pt_y - cal1Pt_y}{cal2Pt_z - cal1Pt_z} + cal1Pt_y$$

$$Y = 0$$

$$Z = (0 - cal1Pt_z) \cdot \frac{cal2Pt_x - cal1Pt_x}{cal2Pt_z - cal1Pt_z} + cal1Pt_x + \text{baseline } Z \text{ value}$$

$$U = 90 + \operatorname{atan2}(cal1Pt_y - cal2Pt_y, cal1Pt_z - cal2Pt_z) \cdot \frac{180}{\pi}$$

$$Y = 90 - \operatorname{atan2}(cal1Pt_x - cal2Pt_x, cal1Pt_z - cal2Pt_z) \cdot \frac{180}{\pi}$$

$$W = 0$$

6b. Specimen work piece on arm:

Coordinates are for the Local 1 (Reference) and Local 2 (Acquisition) Points: (X,Y,Z) are same as calibration point.

$$U = 90 + \operatorname{atan2}(cal2Pt_y - cal1Pt_y, cal2Pt_x - cal1Pt_x) \cdot \frac{180}{\pi}$$

$$Y = 90 - \operatorname{atan2}(cal2Pt_z - cal1Pt_z, cal2Pt_x - cal1Pt_x) \cdot \frac{180}{\pi} - 180$$

$$W = 0$$

The size of each camera pixel is preferably also determined relative to its physical location. This can, in certain embodiments be determined indirectly from known field of view/focal distance of the lenses and the size of the image sensor. Pixel size may be directly measured in simpler applications according to the following illustrative steps:

1. Calibrate the robot to the camera axis as above and save the calibration.
2. Move to datum point 1.
3. Place a ruler at the tip of the chuck so that it spans one of the dimensions of the image.
4. Take a picture of the ruler.
5. Count the number of mm in any dimension of the image, and note the number of pixels in that dimension.
6. Compute pixel size by dividing the number of mm in a dimension by the number pixels in that dimension.

In order to fully map between the pixel space of the camera and the absolute frame, pixels must be translated to physical distance (e g, mm) and vice versa. This may be calculated if the field of view (FOV) angle of the camera and lens is known. It may also be measured by counting visible distance across the frame at one or both of the datum points. If a reference image is obtained at one distance from a camera, pixels of offset in the camera may be translated to millimeters (or other distance units) of offset in the work piece. A target element of the work piece may then be placed at any desired distance from the camera with assurance that it is suitably centered in the frame.

Label Imaging and OCR

Using one or more techniques described herein, the disclosed system may obtain from an acquired image of a label the boundary edges and corners of that label. In certain embodiments, the label region may be cropped from the rest of the image. Then, referencing domain knowledge such as the label's geometric configuration (typically rectangular), a suitable flattening transform may be applied to effectively remove the distortive effects of oblique perspective from the label image (within certain aspect ratio limits). That is, a distal edge of the label (farther in the background)—which appears shorter in an acquired image than a proximate edge (in the foreground) due to isometric viewing angles—may be visually 'stretched' out to match the proximate edge in length (along the width dimension). Any text that had been visually compressed due to the perspective view distortion is correspondingly 'stretched' back out to a width consistent with the text near the proximate edge by the same transform, so that the resulting text becomes more legible overall.

In this regard, computing an affine or projective transform projects the known corners of the label in the source image onto rectangular points with square corners and equal top-bottom edge, left-right side lengths. In certain embodiments, the aspect ratio of the rectangular target is constrained by domain knowledge. In certain other embodiments, foreshortening of perspective is directly estimated using domain knowledge of the camera lens position/orientation and physical distance of the label. The affine transform is then applied to the entirety of the cropped label, mapping a perspective-distorted quadrilateral to a flat rectangle. This is stored as an improved image for further review or processing.

Certain embodiments of the invention incorporate an OCR step in addition to capturing an image of the label. As described in preceding paragraphs, visual filters and segmentation techniques may be applied to isolate the label text portion of a label image. An oblique correction of the label text portion is calculated and applied, after which the resulting image may be processed using any suitable OCR processing known in the art to acquire the textual content. For redundancy, multiple angle images are preferably acquired for such processing. The OCR text content acquired from these redundant images are cross-compared to better resolve any occluded or faint text that may be more visible from a different angle. In general, specimen labels use nomenclature that is defined according to the field for which they were collected. Thus in certain embodiments, specialized OCR dictionaries are developed to help guide the OCR processing's recognition of key symbols, words, and abbreviations.

Example: Work Piece Feature Detection for Scene Segmentation Independent of Manipulation Referring back to FIGS. 5A-F and 6, the features of a pinned specimen work piece may be detected in accordance with certain aspects of the present invention even without reference to a reproducible coordinate system such as provided by a robotic manipulator. In the example illustrated in these FIGS., image data is captured in the form of photographs taken of an insect specimen pinned along with descriptive labels onto a support base (of foam material in the example shown). To detect and segment these discrete features of the work piece, the processing is carried out in parallel for separate photographs taken of the work piece from two significantly different view angles.

Figure 5A:
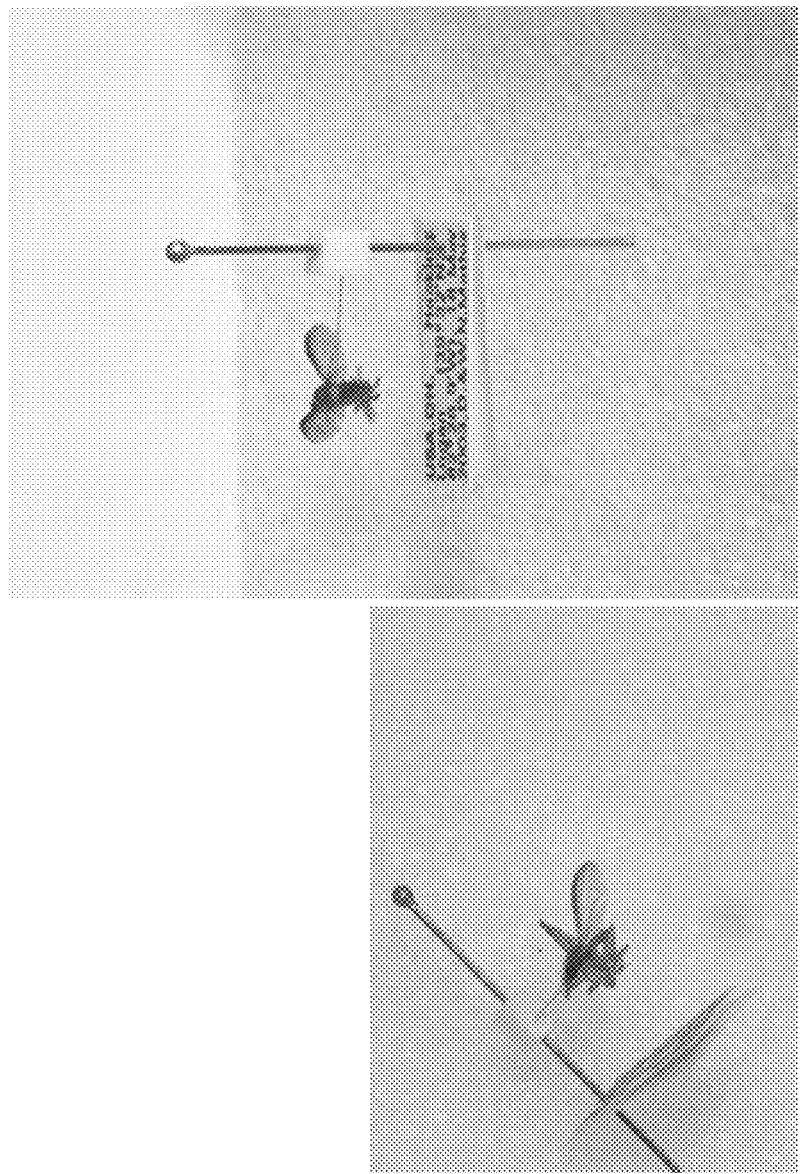
FIGS. 5A-F is a set of photographic views and renderings illustrating feature finding in a scene segmentation process carried out in accordance with an exemplary embodiment of the present invention with respect to an insect specimen work piece.
Figure 5B:
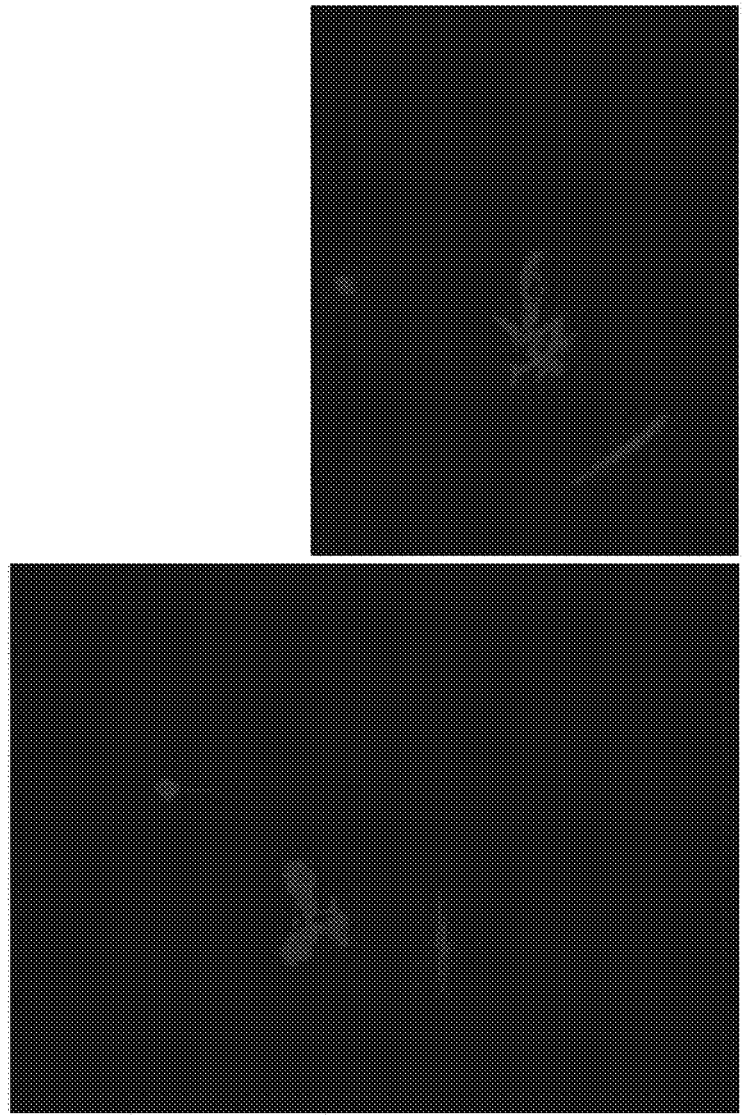
Figure 5C:
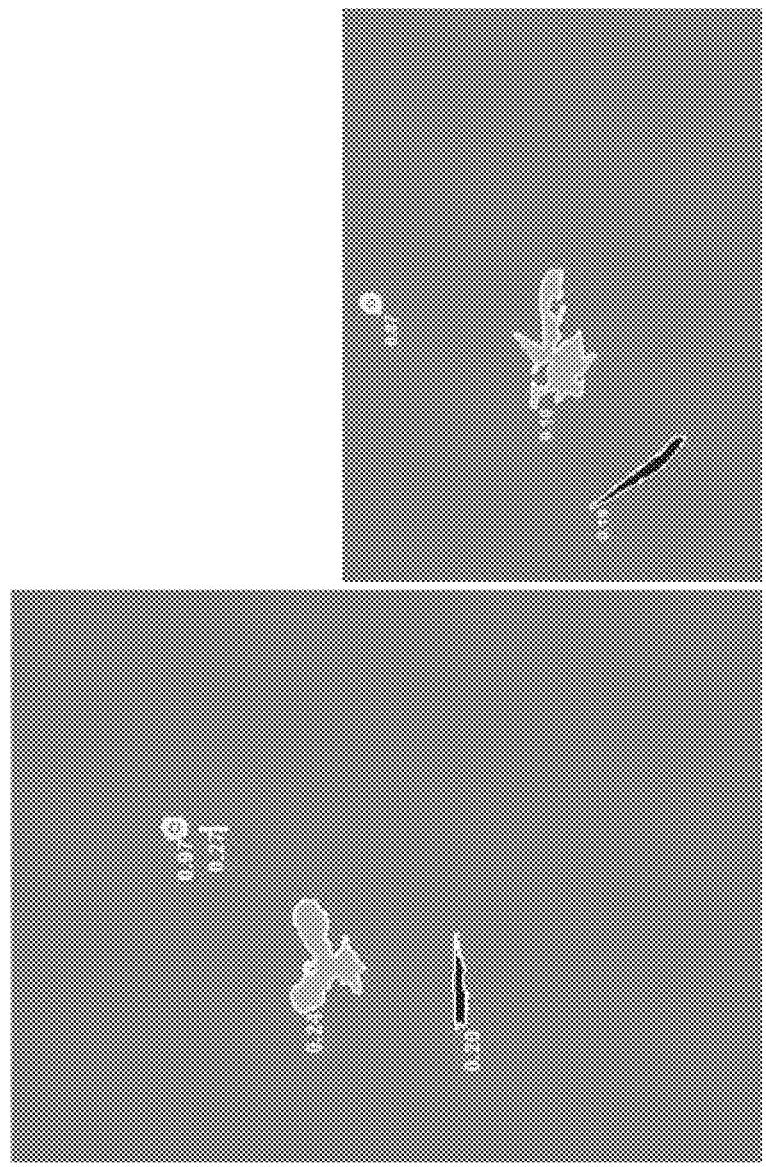
Figure 5D:
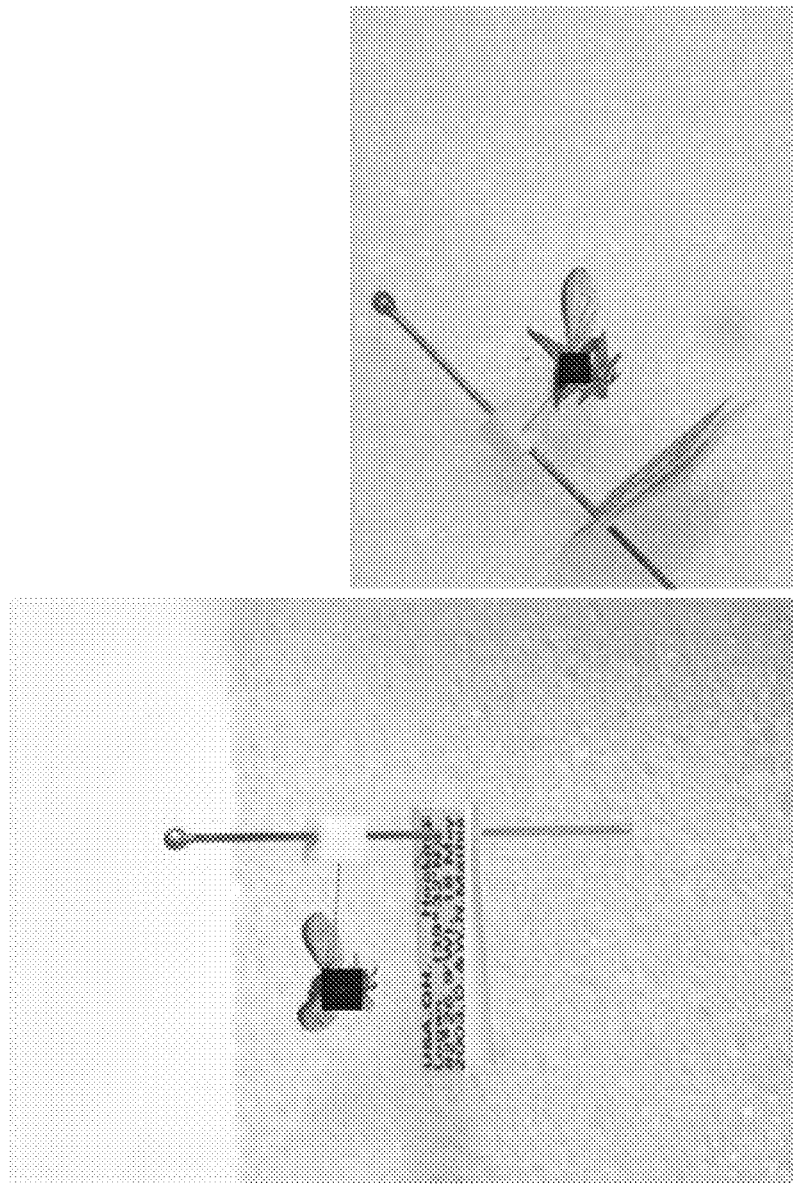

The pin head is detected by first separating the same from the body and the surrounding support base surface by filtering out regions that are saturated significantly more by one primary color than another. This produces a pixel mask such as illustrated in FIG. 5B. After merging connected (or nearly connected) pixel regions into connected sets, regions of small area may be eliminated to reduce clutter. The system may thereby identify discrete segmented objects as shown in FIG. 5C. The "roundest" of the objects is preferably found by comparing total area to average radius, keeping the object most consistent with a circle, where for instance the object seeming to have an area a and radius r most closely satisfying the relationship $$\frac{a}{\pi r^2} \sim 1.$$

Thus, in FIG. 5C, the topmost object is found to have a circle-consistency ranking computed according to this relationship of approximately 0.97. This object is selected as the pin-head (in view of the domain knowledge that the work piece does in fact include a pin topped by a round head).

Figure 43:
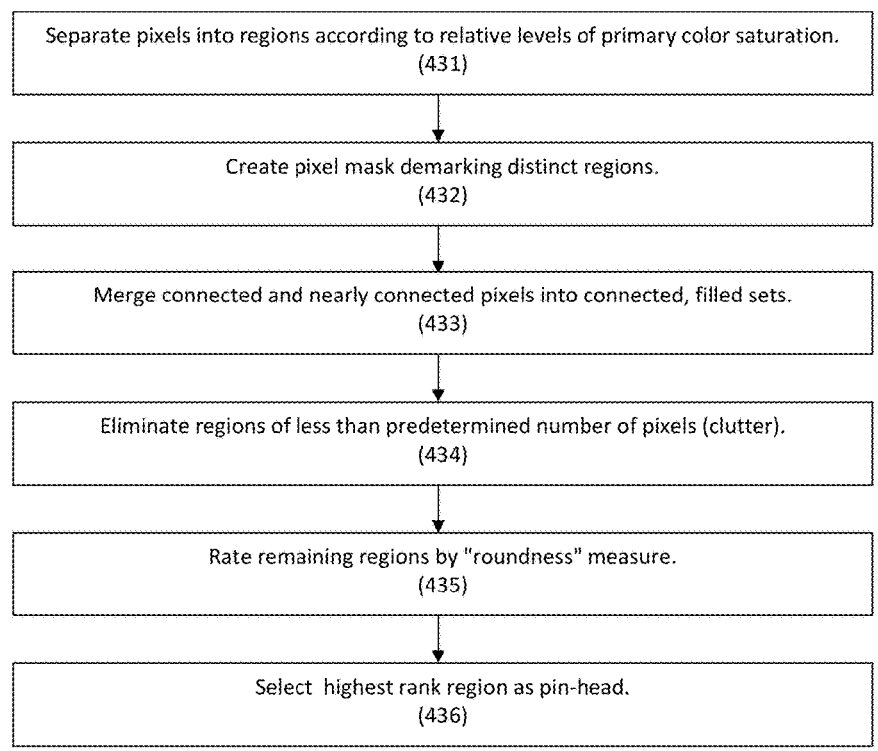

The flow chart shown in FIG. 43 illustrates a flow of processes in accordance with an exemplary embodiment of the present invention to carry out pin-head finding incorporating these techniques. At block 431, the pixels of the given image are separated according to their relative levels of primary color saturation. A pixel mask is then created at block 432 demarking distinct regions of primary color saturation. At block 433, filling is applied to merge connected and nearly connected pixels into filled sets. Regions having less than a predetermined number of pixels are then eliminated at block 434 as clutter. The flow then proceeds to block 435 where the remaining regions are rated according to their roundness measure (ranking) The highest ranking region is selected as pin-head at block 436.

As for finding the insect specimen in the imaged work piece, the image portion corresponding to the insect specimen typically tends to form the darkest contiguous region (since the foam support base and label contribute a mostly light background, and the pin head is of relatively slight and narrow width). By converting the image to grayscale and segmenting it into a grid (not shown), the average intensity value of each square may be determined. The center of the darkest square (see block indicated in FIG. 5D) is taken to lie somewhere in the body of the insect specimen. For each image (showing top and bottom views) of FIG. 5D, the region encompassing the body of the insect specimen may be determined thereby.

Figure 44:
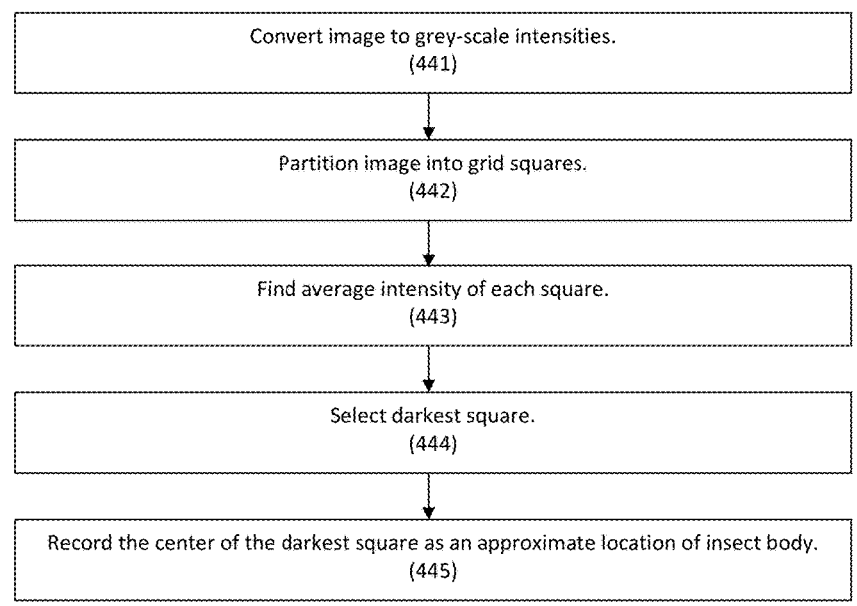

The flow chart shown in FIG. 44 illustrates a flow of processes in accordance with an exemplary embodiment of the present invention to carry out insect specimen finding. At block 441, the given image is converted to grayscale intensities, and at block 442 partitioned into grid squares. At block 443, the average intensity of each grid square of the image is computed. The darkest of the squares is then selected at block 444, and its center is recorded as an approximate location for the body of the pinned insect specimen.

The partitioning of the image into squares at block 442 may be replaced in certain embodiments with a sliding window of any shape if such would tend to more accurately estimate the center point of the darkest region for specimens imaged in a particularly intended application. This higher resolution approach is consistent with cross-correlation or convolution with a weighted 2-D prototype function. This improved approach is further detailed herein with reference to FIG. 48.

Turning to detection of the pin(s) itself, edges of the images are preferably detected in any suitable manner known in the art (e.g., Canny edge detection is one well-known method), from which "walls" may be computed. "Walls" as used in this instance denote finite length line-segment structures that correlate with linear segments of the Canny edge pixels. In the illustrated embodiment, information is exploited from a second processing technique based on a Harris corner measure, where a Harris matrix H of the image pixels is computed using any suitable measures known in the art. In this instance, however, points are found with eigenvalues consistent with "line-like" behavior rather than "corner-like" behavior. These may be determined indirectly via the Harris R response function, from the determinant and trace of the Harris matrix MH.

Taking a logical "AND" of a mask of Canny edges and the set of points that are "line-like" (i.e., $R<\varepsilon<0$, for a threshold c) yields a set of linear edges. Thereafter, the sets are preferably extended and merged by a "marching" technique of suitable type known in the art. Generally, marching continues a group of sets in a determined direction (ie., along the line-like segments' orientation) to find additional points or line segments that appear to be part of the same imaged structure. The degree to which points or line segments appear to belong to the same structure may be measured by: (a) aligning with the original structure and (b) having a gap of less than a predetermined number of pixels between the two points/line segments in question. Each longest possible merged line-segment determined consistent with the Canny, Harris, and marching processes is identified as a wall. The resulting set of walls corresponds to the set of straight line-segments within the image. Note in this regard that a wall may be recorded in an absolute continuous sense, as an equation of a line, rather than as a list of pixels.

This approach to finding for finding straight-line edge regions by identifying "walls" is but one of numerous other techniques may be suitably applied. Such other techniques include, for example, the use of Hough transform in certain other embodiments.

To establish the full extent of the pin within the image, the set of walls are reduced by retaining only those that are longer than average (many apparent short walls may result from texture of back drop material), and lighting shadows are thus eliminated. Walls exhibiting high error when their linear equations are compared with corresponding pixels are also eliminated—such high variance is generally not expected since pins are smooth, straight manufactured items. Next, the remaining set of walls is separated into two angular modes, by for instance taking a histogram of the angles formed by their slopes and finding its two primary modal peaks. Walls are then grouped within each mode by their near co-linear alignment; this is accomplished through ranking the subsets of the walls by a parametric indication of their similarity in slope and their proximity. The subset group within each mode having the greatest pixel count is extracted as a pin. Convex hulls are found for the modal pin sets thus extracted, with the largest recorded as the primary pin and the other recorded as the secondary pin. A threshold of pixel count is applied in certain embodiments to determine the presence or absence of another pin; while in alternate embodiments, the system may be instead preconfigured with domain knowledge of the type of specimen work pieces being loaded.

Figure 5E:
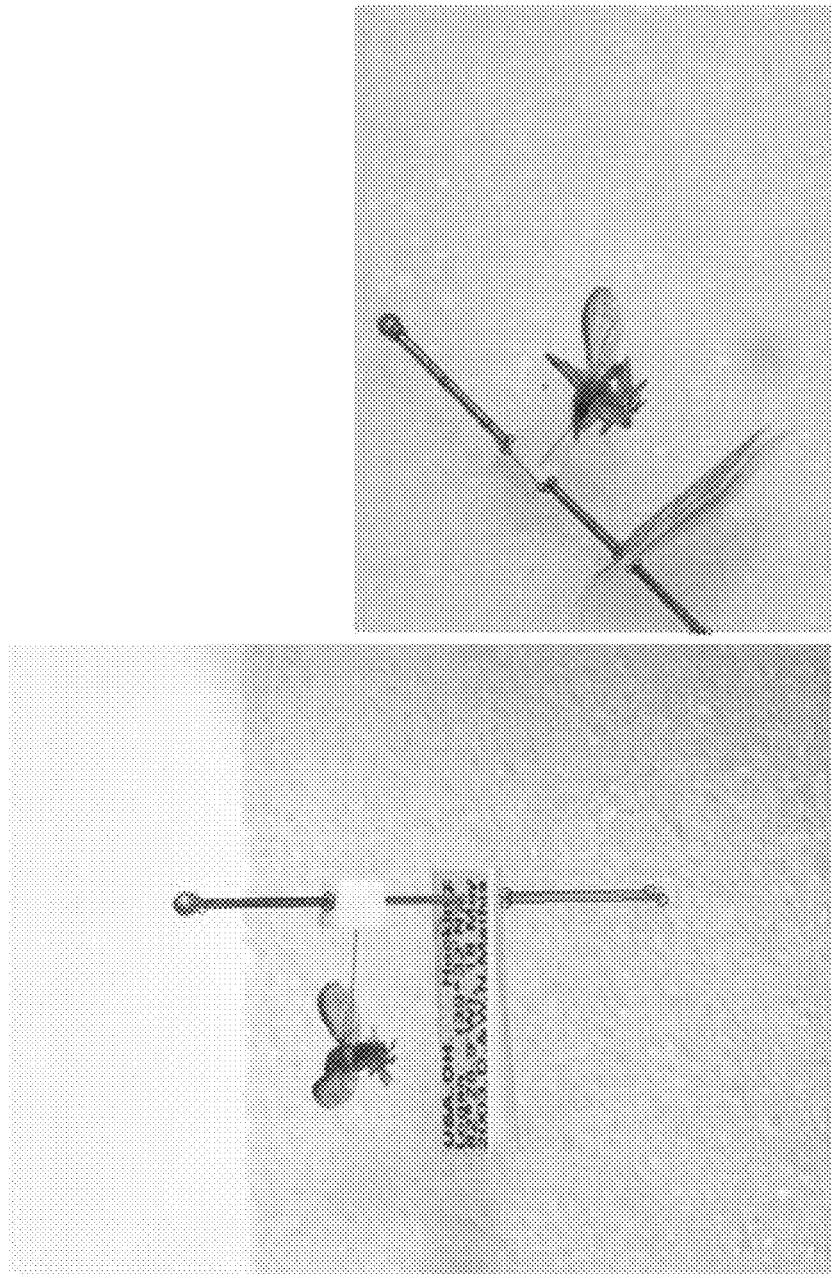
Figure 5F:
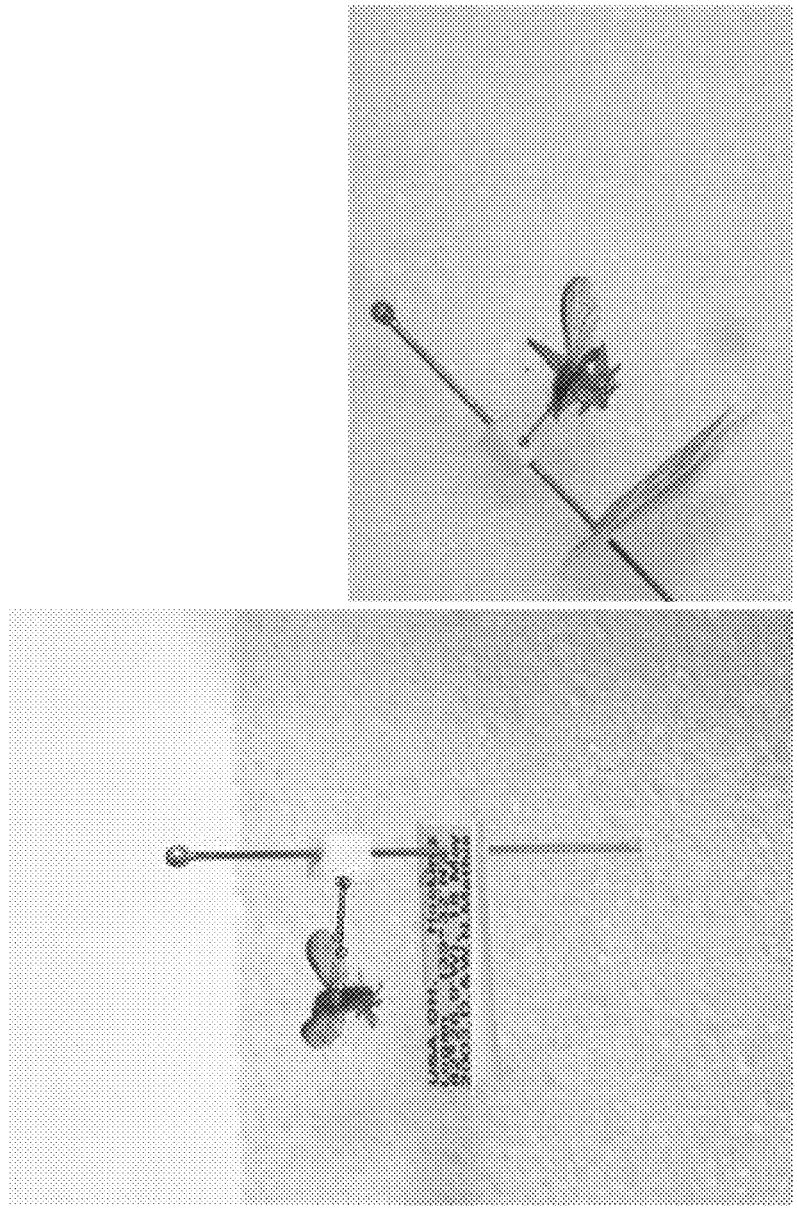

FIGS. 5E and 5F illustrate line segments found in the image remaining by execution of these processes, where the side edges of the pins in the image are approximately outlined by two parallel line segments. In FIG. 5E, the parallel line segments of the first modal group outline the majority of the primary pin. In FIG. 5F, the parallel line segments of the second modal group outline the secondary pin extending laterally from the primary pin.

Figure 45:
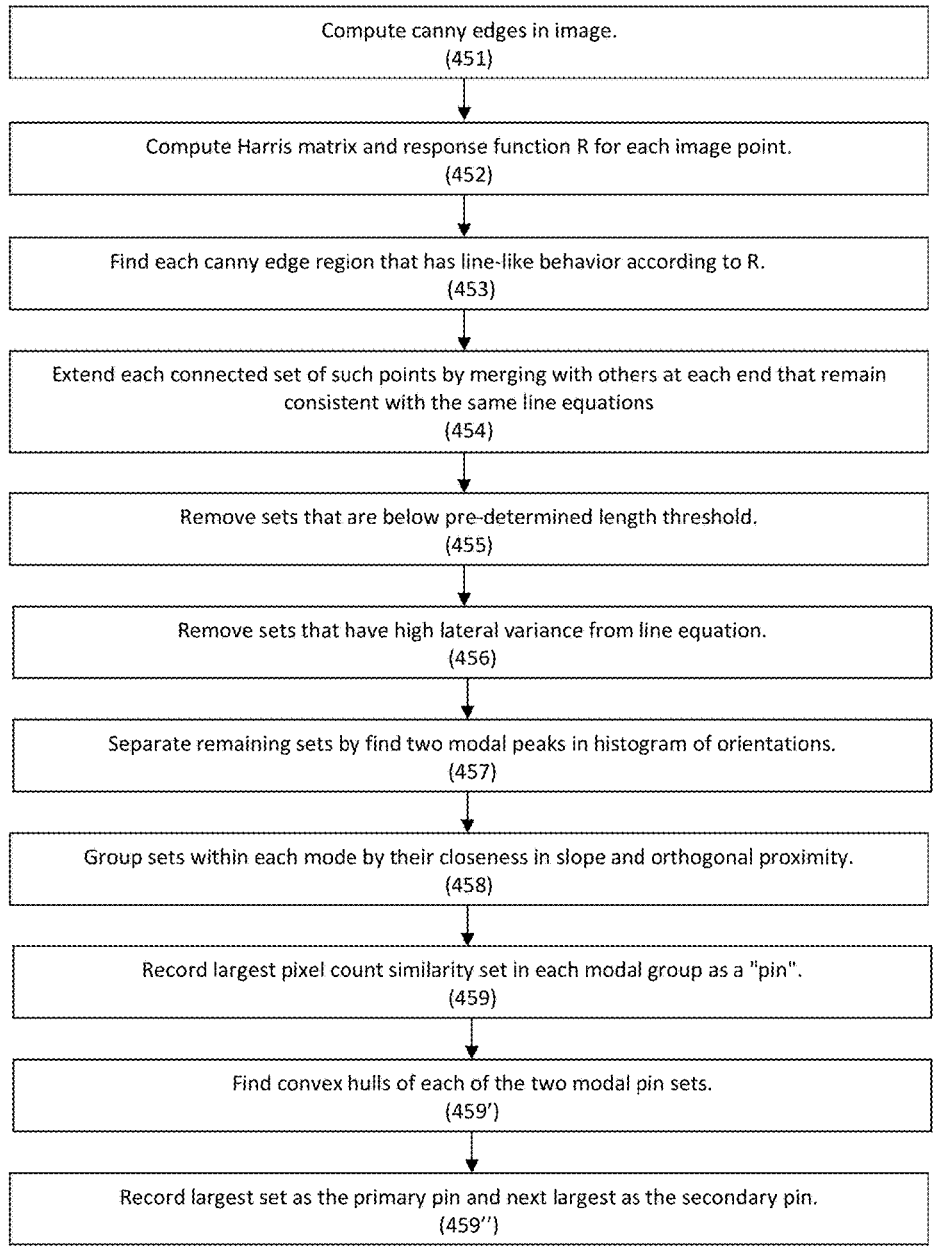

The flow chart shown in FIG. 45 illustrates a flow of processes in accordance with an exemplary embodiment of the present invention implementing this pin finding technique. At block 451, Canny edges in the image are computed. At block 452, a Harris matrix and response function R is computed for each image point. Each Canny edge region exhibiting line-like behavior according to the response function R is then found at block 453. Connected sets of such points are extended at block 454 by merging with others consistent with the same line equations. The sets are reduced at block 455 by removing those that are below a predetermined length threshold. At block 456, the sets are further reduced by removing sets having high lateral variance from the corresponding line equation. Thereafter, at block 457, the remaining sets are separated by find two modal peaks in a histogram of orientations. The sets in each mode are then grouped into similarity sets at block 458 by their closeness in slope and orthogonal (i.e., closest member point) proximity, and the similarity set having the largest pixel count in each mode is recorded as a "pin" at block 459. At block 459', convex hulls are found for these modal group pin sets, and the largest is recorded as the primary pin at block 459" while the smaller is recorded as the secondary pin (if present).

FIG. 6 illustrates the combined results of the processing to find the pin head, specimen, and pins. The primary pin, taken as the convex hull of the outlining line segments, is shown in blue, and the secondary pin is shown in red. The pin head is represented by a green circle centered on a point x, the circle being determined as the best fit circle to the shape found The insect specimen marker point is indicated by a red +, based upon the center of the corresponding intensity grid box. Although not necessarily the insect specimen's center of mass as might be judged by human eye, the marker point is sufficiently central to the specimen body for scene segmentation purposes. Further improvements are described herein with reference FIG. 48.

This illustrates but one exemplary embodiment of feature finding measures employed in scene segmentation process. Other suitable measures and techniques known in the art for finding and discriminating the discrete features of a given work piece may be employed to carry out scene segmentation in alternate embodiments.

Figure 24A:
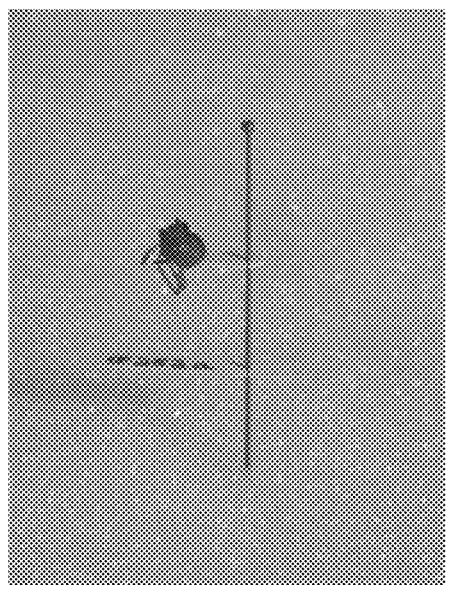
FIGS. 24a-b is a set of schematically marked photographic views illustrating certain portions of a scene segmentation process carried out in accordance with an exemplary embodiment of the present invention with respect to an insect specimen work piece.
Figure 24B:
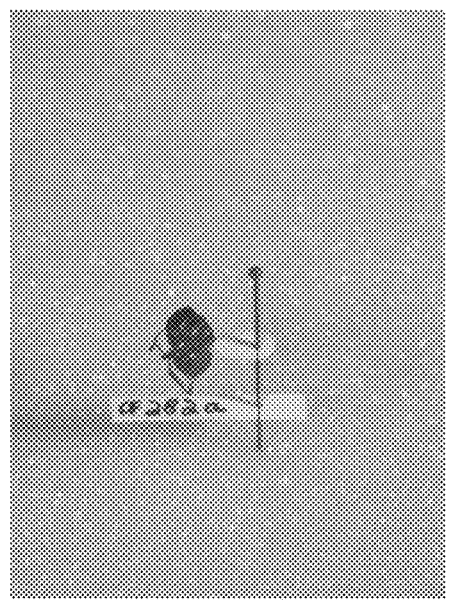
Figure 25A:
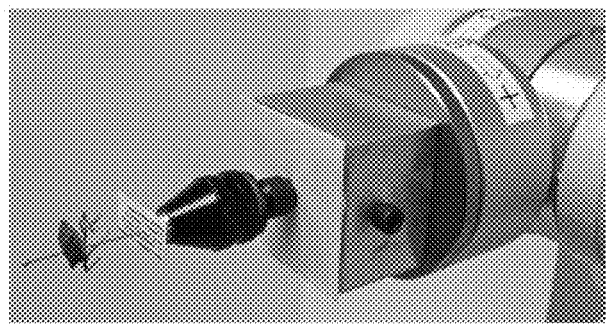
FIGS. 25A-B are a set of photographic views respectively corresponding to the perspective views of FIGS. 19a-b illustrating different types of specimen work piece holders employed in a system formed in accordance with different exemplary embodiments of the present invention.
Figure 25B:
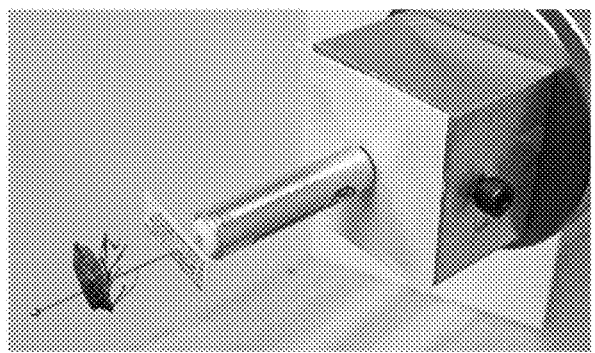
Figure 26A:
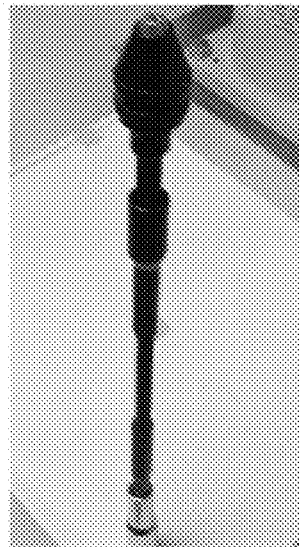
FIGS. 26A-B are a set of photographic views respectively corresponding to the perspective views of FIGS. 19d-c illustrating different types of specimen work piece holders employed in a system formed in accordance with different exemplary embodiments of the present invention.
Figure 26B:
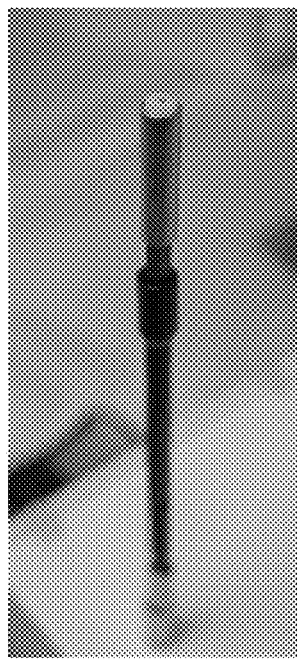

3D Alignment:

FIGS. 24A-B show examples of work piece reference images whose pin center lines have been estimated via Hough transform peaks and whose insect specimen locations have also been estimated as described in preceding paragraphs. The insect specimen and pin end points provide three non-collinear tie points between the reference images. Other tie points may be found (not shown) as intersections between feature, label corners, additional pins etc. More generally, tie points may also be generated using other suitable image processing techniques known in the art, such as SIFT and SURF; however, geometric end points and intersections are preferred as they generally provide the highest spatial resolution in a 3D, multi-angle imaging setting.

The relative displacements between tie points may be used to determine the rotations of the imaged work piece in 3-D. For example, if the pin is only being rotated toward or away from the screen, then the ratio of the shorter photo-length of the pin to the longer photo-length of the pin may be expressed as the cosine of the rotation angle between one reference image and the other. Namely, assuming that the reference image with the longer length feature is imaging the pin substantially perpendicularly, the length of the pin in the other image will be the longer length times the cosine of the angle relating the two images.

Each pair of tie points may be treated similarly, and the mathematics of estimating the rotation transform are known in the art, and therefore not further detailed here. Suitable computations enable visual alignment of the reference images. FIG. 7 shows the reference images aligned via a 3-D rotational transform—the top left view illustrating one image clearly overlapping the other when viewed correctly, thus confirming the correctness of the alignment angles. The remaining views of FIG. 7 illustrate rotations of the overlay so that their relative positions are more discernible in 3-D. Thus, rotations of the specimen work piece relative to the imaging plane may be determined from arbitrary images without relying upon a physical mechanism for measuring the relative rotations.

3D Scene Modeling:

In FIG. 7, the images are placed with the tops of the reference images' pin heads aligned. In practice, the imaging/photographic plane is offset by a certain distance from the work piece. By placing these images at the proper distance with the same rotated alignment, the intersections of lines through each tie point orthogonal to the image planes becomes more apparent. These (not shown) serve to define a single point in 3-D consistent with both images. The collection of tie points, mapped to their 3-D intersections is sufficient to produce a frame model of the work piece's structure in 3D. This is described in more detail herein, in the context of a robot-manipulated system embodiment's scene segmentation processing; however, FIGS. 5A-F, 6, 7, and 24A-B reflect the fact that while a reproducible physical coordinate system such as that provided by a robotic manipulator is convenient, it is not strictly required to implement the segmentation and scene modeling techniques disclosed herein. Thus, they may be considered to stand independently from the fully mechanized adaptively conformed imaging system herein disclosed.

Example: Adaptively Conformed Imaging of Pinned Specimen Work Piece

Before beginning to take images of insects, the camera imaging unit is calibrated as described in preceding paragraphs. The calibration corrects the camera's location and orientation, while the image processing routines will determine the location and orientation of the insect/label/pin structure (based on assumptions about the camera's location and orientation). Once calibrated, an insect specimen work piece is loaded, reference images are taken, and any insect or label acquisition images are taken as needed thereafter.

Figure 46:
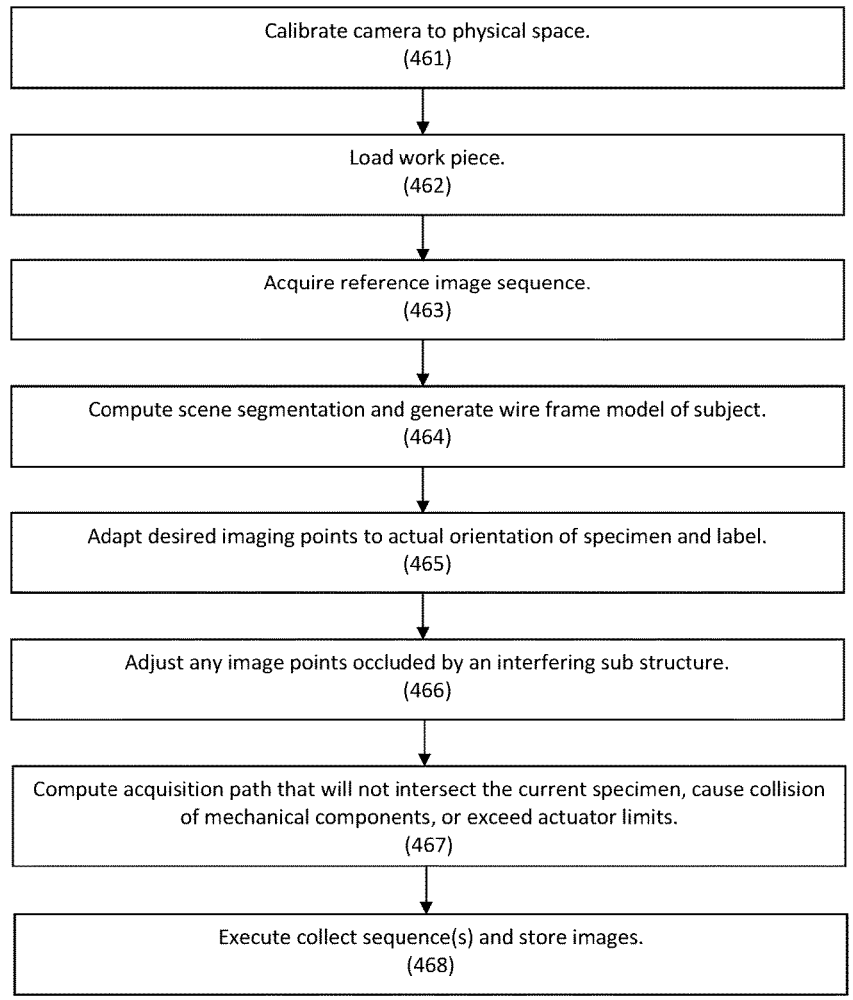

The flow chart FIG. 46 illustrates a flow of processes in accordance with an exemplary embodiment of the present invention to carry out adaptively conformed imaging of pinned insect specimen work pieces which are not necessarily of precise uniform configuration work piece-to-work piece. At block 461, the camera is calibrated to physical space, and at block 462 the given specimen work piece loaded (either on the robotic manipulator or on an imaging platform apart from the manipulator, depending on the operational configuration). The camera and robotic manipulator are actuated in coordinated manner to take a sequence of reference images of the work piece at block 463. At block 464, scene segmentation is executed by the controlling processor(s) to generate wire frame model abstractions of the work piece features. At block 465, desired imaging points are automatically adapted to actual orientations of the insect specimen and label features of the work piece based on the abstracted wire frame models. Any image points occluded by an interfering sub structure are adjusted at block 466, and an acquisition path is thereafter computed at block 467 which does not intersect the subject work piece or cause the robotic manipulator to collide with itself or with other physical elements of the work piece. At block 468, the imaging is executed along the acquisition path to collect a sequence(s) of images and store the same.

Insect Specimen Work Piece in Motion Configured Example

As described in preceding paragraphs, the Insect Specimen Work Piece in Motion setup has the camera on a fixed mount and uses an end effector to hold the insect on the robot manipulator. The end effector is essentially a block that attaches to the robot arm, and a rod that secures the work piece pin via one of the selected mechanical mounting measures disclosed herein. The robot will have one local coordinate system for the reference images, and one for the acquisition images, both with the same orientation, but with different locations: for example, the reference coordinates may be centered approximately 6.5 cm from the lens of the camera while the acquisition coordinates are centered approximately 2 cm from the lens of the camera. The coordinates may be such, for example, that x axis points directly toward the camera, y points to the robot, and z points up. In calibration mode, the robot maneuvers itself so the chuck that holds the pin is pointed at the center of the camera. If it is not in the center, the robot may be manually jogged until it is sufficiently centered. This is done during the calibration phase (see block 461, FIG. 46) at both the reference and insect specimen acquisition distances. When complete, the location of the tip of the chuck serves as the origin of the two coordinate systems, and the orientation is calculated such that the x axis points from the reference to the acquisition origin. Once the camera has been calibrated, reference images followed by acquisition images may be taken. When analyzing the reference images, the system uses the offset of where a point is known to be in the images to obtain the location of the specimen work piece in terms of the physical tool coordinate system the robot already has in place. In the exemplary embodiment, when taking pictures at different locations around the insect, a new set of local coordinate systems are defined corresponding to each elevation angle. These local coordinate systems differ only in a rotation about the y axis (which would be the elevation angle in this example). With this approach, a change in azimuth is merely a rotation about the new local coordinate system's z axis.

Camera in Motion Configured Example

As described in preceding paragraphs, the Camera in Motion setup has the camera attached to the robot arm and the insect specimen work piece attached to a mount/table. The camera has cords running to it from the manipulator arm, which, in some cases, complicates maneuverability of the robot around the insect specimen work piece. The camera end effector (see FIG. 30) also has physical features that must be kept from collision with the manipulator, and which may require exaggerated motion paths to avoid collisions with the work piece. Additionally, as the camera has more mass offset from the end of the robot arm, inertia and eccentricity must be set to the proper values so that the robot does not overstrain its motors. In this setup, the robot has a single tool coordinate system defining the orientation of the lens and a single local coordinate system defines the insect. The calibration routine again is a calibration for the camera. The robot maneuvers the camera so that the chuck holding the work piece pin points at the center of the camera. The tool coordinate system is oriented in this example such that the z axis connects the two calibration points, the y axis points to the robot arm, and the x axis spans the camera. Once the camera has been calibrated, the robot may be actuated to take the reference images, then the acquisition images.

Figure 31A:
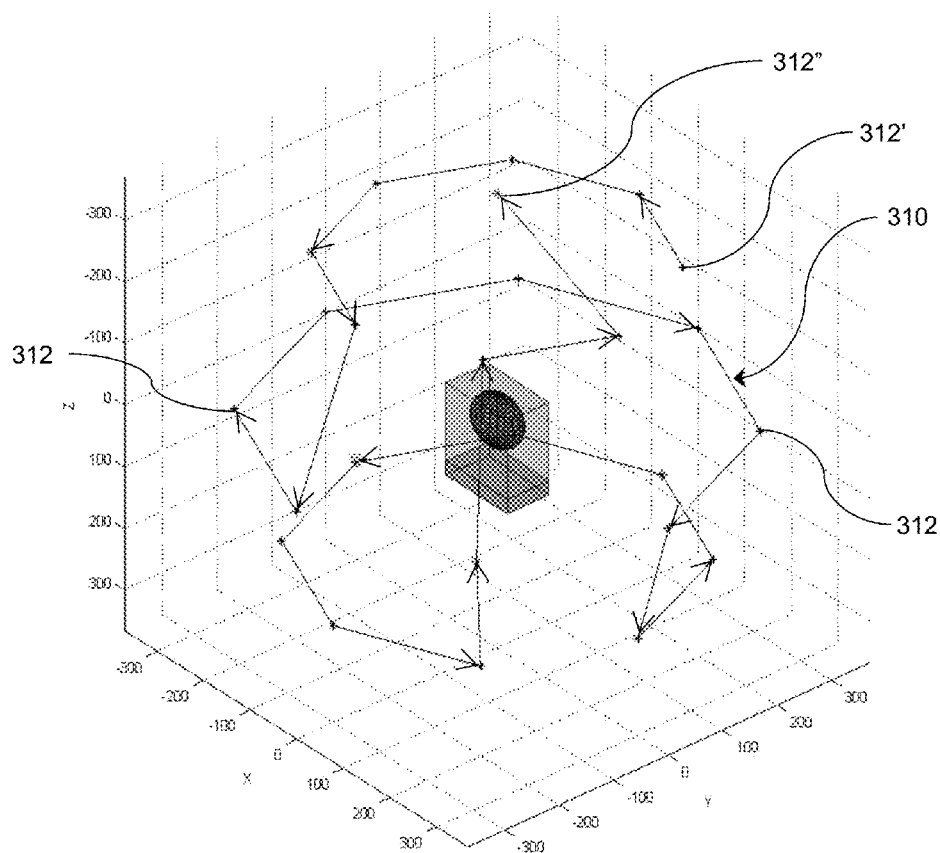
FIGS. 31A-B are graphic renderings illustrating examples of acquisition paths adaptively generated of different angular increments by an acquisition point planning process carried out in accordance with an exemplary embodiment of the present invention to image different features distinguished for an insect specimen work piece.
Figure 31B:
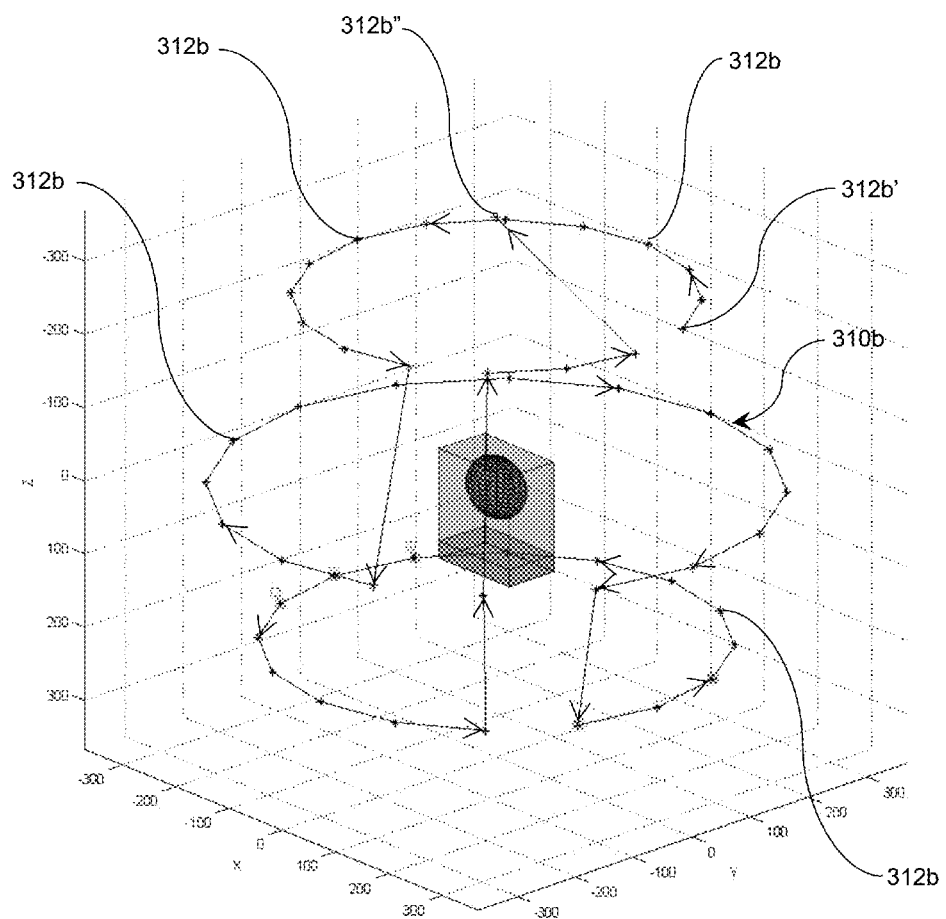

When imaging from different locations around the specimen work piece, the system constructs a path that avoids tangling of the cords for the camera, avoids hitting the camera against the robot arm, and avoids sequences that will run any servo joints past their limit so that joint configurations need not be flipped mid sequence. (Flipping joint configurations is both time consuming and magnifies the opportunities for collision.) In an illustrative case, imaging may be desired at azimuth angle ($\theta$) increments such that $\theta=0°-\theta_{res}-(360-\theta_{res})$ where $\theta_{res}$ is the azimuthal resolution (typically 45° or 22.5°), and at certain elevation angles ($\phi$), say of 45°, −35°, and 0°. A single overhead image ($\theta=0°$, $\phi=\pi°$) may also be desired. The path to obtain these images would be set to start at $\theta=-(360-\theta_{res},\phi=45°$. The acquisition path would then proceed around at the same elevation increasing $\theta$ by $\theta_{res}$ for every image, stopping at $\theta=-(45+\theta_{res})$, after which the path drops to the next elevation of $\phi=0°$ and the azimuth angle incremented between points by subtracting $\theta_{res}$ from each point position before stopping at $\theta=-(45-\theta_{res})$. The path then drops elevation to $\phi=-35°$ and the azimuth angle incremented between points by adding $\theta_{res}$ to each point position before all the way around (stopping at $\theta=-45°$). Once the acquisition path is fully defined, photographs of the work piece are acquired from the incrementally defined points as the camera follows the acquisition path about the work piece, preferably ending at the overhead point for a top-down photograph. This path is shown in FIG. 31A using $\theta_{res}=45°$ (and a radius of 45 mm for all images). FIG. 31B shows the same path using $\theta_{res}=22.5°$. Note that neither of the paths duplicates any images.

FIG. 31A illustrates an acquisition path for the robot—namely, the path to move the camera about the work piece using $\theta_{res}$=45° in such a way that camera flips are avoided. The black lines collectively indicate the path 310 (formed by acquisition points 312) that the robot end effector will trace to acquire images, starting at the acquisition point 312' and ending at the center top point 312". The black stars indicate the desired acquisition points 312 which are input to the system. A determination is made as to whether any locations would preclude sight of the insect around the label. The green square(s) connected an input point represents the adaptively adjusted location of the input point that, moved to avoid obscuration. As in other figures, the dark red box represents the estimated location and peripheral extent of the label and the blue ellipsoid represents the estimated location and peripheral extent of the insect specimen. The light red box defines where not to place the camera. (Note: axis units are in pixels from the reference images.)

FIG. 31B illustrates a second acquisition path 310*b* to move the camera using $\theta_{res}$=22.5° to avoid camera flips. As in FIG. 31A, the black lines collectively indicate the path 310*b* (formed by acquisition points 312*b*) that the robot end effector will trace to acquire images, starting at the acquisition point 312*b*' and ending at the center top point 312*b*".

Similar paths are calculated for motion of the insect in the insect in motion case. The relative geometries are similar in that case, except that the insect specimen work piece is physically moved through the acquisition path rather than the camera.

As mentioned, the path plan examples shown in FIGS. 31A-B for the camera-in-motion imaging configuration must avoid interference with specimen work piece structures. The path plan must also avoid joint-angle self-collisions by the manipulator with itself. To enable safe and effective acquisition at each of these points, system software evaluates and adjusts travel paths that connect the points. Paths cannot intersect the camera with the specimen, or its support structure, nor progress in such a way that the manipulator may be directed in a collision path with its own structural members. Approach angle flipping of the manipulator during the course of operation—for changing its elbow and wrist left-right handedness in order to reach all prescribed points—poses particular challenges, especially with the camera-in-motion design. The system is preferably configured to preemptively test for and limit such approach angle flips. In some cases this requires introduction of radial escape excursions between the acquisition points, contributing to the typically slower operation of camera-in-motion configurations than specimen work piece-in-motion configurations.

Additional Notes on Image Scene Segmentation Processing in Robot-Manipulated System Example During reference image acquisition, the illustrated system preferably takes several reference images of the insect specimen work piece while it is backlit. Appropriate backlight is applied automatically by the system as the camera or insect is moved. The first two images (the X and Y images) span the YZ planes and the XZ planes, respectively. If the insect specimen's rotation about the pin is not of material concern in a given application, the reference acquisition may be stopped at this point. Otherwise, an additional reference image is taken from above (the Z image because this spans the XY plane). Finally, if the insect specimen is large enough to occlude the label as viewed from above, two images are preferably taken at a suitable offset angle, for instance, at an offset angle of 22.5° above each of the previous two images. Then, suitable image processing routines are executed on the various images to identify the insect specimen, pin, label, and orientation of the system. The reference images are, in one exemplary embodiment of the system, acquired with a dedicated camera having resolution sufficient for the accuracies required. In another exemplary embodiment, the reference images are acquired with the same high-resolution camera as used for final image acquisitions, thus reducing equipment; images are then typically re-sized by down-sampling to speed up processing when using the high-resolution camera also for reference image capture.

Figure 32A:
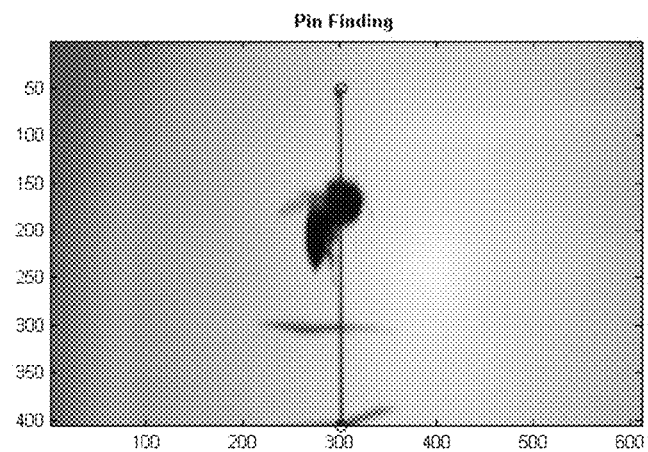
FIGS. 32A-C is a set of photographic views illustrating the masking of certain features in a scene segmentation process carried out in accordance with an exemplary embodiment of the present invention with respect to an insect specimen work piece.

Pin Finding in Robot-Manipulated System Example:

FIG. 32A illustrates the line that has been identified as the pin in the first reference image of a specimen work piece. The first step is to find the pin in the X and Y images. The basic process is to create a binary mask that includes the pin and perform a Hough Transform to identify the strongest line. To do this, the RGB image is first converted to a grayscale intensity image and a threshold is calculated. Next, a mask is created that has more valid pixels than masked pixels. Thereafter, the standard deviation of every local region of the grayscale intensity image is computed, and the threshold of the resulting standard-deviation "filtered" image is determined keeping every pixel above the threshold. Then, using operations that are sensitive to small pixel gaps in solid fields, holes in the mask are filled in. Next, the binary mask is convolved with a diffusing function, keeping all pixels above 0, to marginally increase the size of the mask. A logical AND operation is performed between this mask and the original threshold mask to achieve a binary mask that is input into the Hough Transform. The Hough Transform is, in general, limited to only consider lines that are within a predetermined range of vertical. Peaks of the transform are used to find all pieces of the associated pint line, and these are gathered to find the maximum possible extent of the visible pin. Further criteria including distance from the mid-point may be applied to find the strongest pin-line candidate. It is noted that if the pin is known to be crooked, the angle and distance from the center may be adjusted accordingly. The bottom of the pin (at the work piece holder mechanism) will generally be centered in the image if the robot has been properly pre-calibrated.

Figure 47:
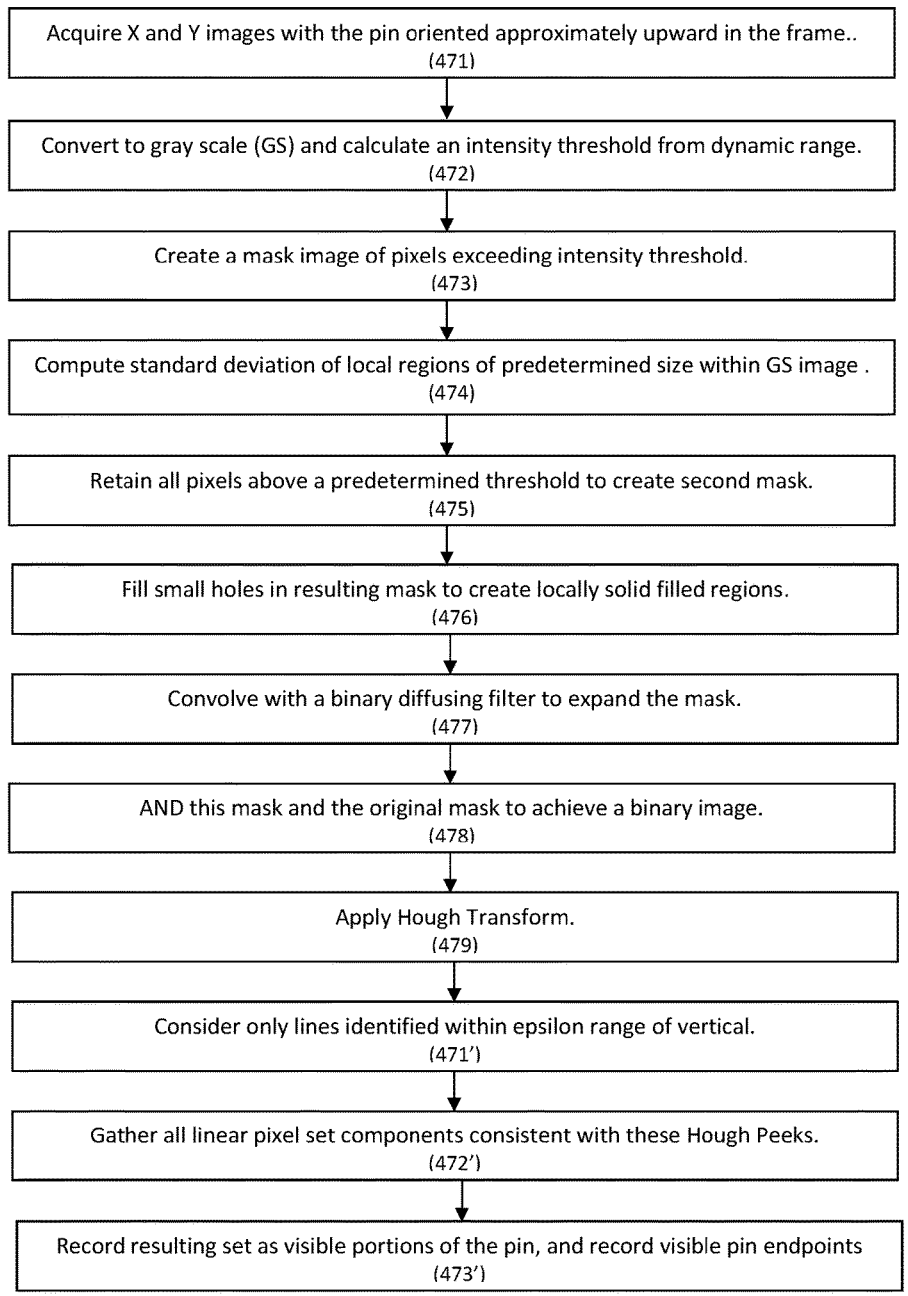

The flow chart FIG. 47 illustrates a flow of processes in accordance with an exemplary embodiment of the present invention to implement this pin finding. At block 471, X and Y reference images are acquired with the pin oriented approximately upward in the frame. The reference images are converted to grayscale GS at block 472, and an intensity threshold calculated for distinguishing between black and white. At block 473, a mask image is created using the threshold, and a standard deviation is computed at block 474 for local regions of predetermined size within the GS image. At block 475, a second mask image is created using pixels above a second predetermined intensity threshold. Any small holes in the second mask image are filled to generate locally solid regions. The second mask is expanded at block 476 by convolving with a binary diffusing filter. The expanded second mask is logically AND'd with the original mask image to obtain a binary image at block 478, to which a Hough Transform is applied at block 479. As indicated at block 471', only lines identified in the transformed results within an epsilon range of vertical are further considered. At block 472', all pixel set components consistent with the corresponding Hough Peeks are gathered, and the resulting set taken to define the visible portions of the pin, as indicated at block 473'. These are preferably reduced to a line segment stick-figure model, where the pin feature is denoted parametrically by the top and bottom endpoints of the pin.

Figure 32B:
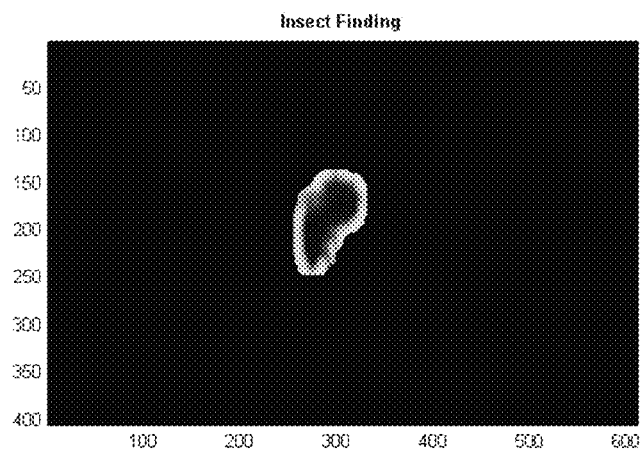

Insect Specimen Finding in Robot-Manipulated System Example:

The next step is to find the insect in the XY images. The basic approach involves finding the darkest region and identifying such as the insect specimen. Toward that end, the RGB image is first converted to a grayscale intensity image. Then, a diffusing filter is constructed which is slightly larger than the intensity image times the larger dimension of the image. This may form a constant value square or circle, or a Gaussian curve depending on the particular application, whose scale is preferably adjusted in proportion to the relative size of the insect specimen to be detected. This diffusing filter is then convolved with one minus the grayscale intensity image to find darker regions. A threshold is then calculated using a value that is a predetermined proportion of the range between the average and the maximum pixel values of the convolution. This threshold parameter essentially draws the line separating the insect specimen from background, thus a smaller value may be more likely to grab legs or wings, but would also be more likely to include more background bordering the insect. Conversely, a larger value would be less likely to capture the entire insect. The convolution is then masked, keeping only the pixels above the threshold to find the region that contains the maximal convolution value. FIG. 32B illustrates the mask of the insect in the first reference image. The system preferably recognizes when the mask has been buffered to be larger than the insect, via the diffusion.

Figure 48:
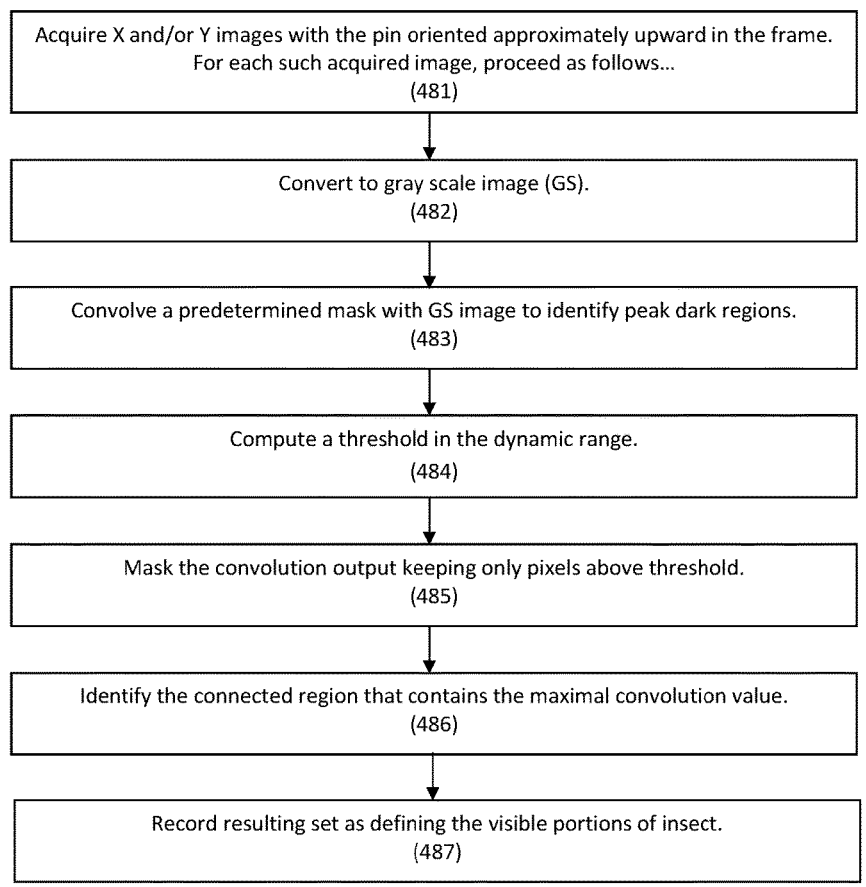

The flow chart FIG. 48 illustrates a flow of processes in accordance with an exemplary embodiment of the present invention to implement this insect specimen finding. At block 481, X and Y reference images are acquired with the pin oriented approximately upward in the frame. The reference images are converted to grayscale GS at block 482, and a predetermined mask is convolved at block 483 with the GS image to identify peak dark regions. At block 484, a threshold within the dynamic range is computed, as described in preceding paragraphs, in proportion to predetermined ratios that may be adjusted to control sensitivity, and at block 485 the convolution output is masked to keep only pixels above the threshold. Connected region that contain the maximal convolution value are then identified at block 486. The resulting set is taken to define the visible portions of insect specimen, as indicated at block 487.

Label Finding in Robot-Manipulated System Example:

Finding the label in the X and Y reference images involves finding dark regions disposed below the insect specimen, crossing the pin. To do this, first, the RGB image is converted to a grayscale intensity image. Then, the entropy of each pixel sub-region of predetermined size of the grayscale image is computed, and a threshold for the entropy filtered image is adaptively computed. A binary mask is generated on the threshold. Any holes in the mask are filled, and only pixels with local entropy above the threshold are kept. The resulting mask contains the label, pin, insect, and possibly background noise. As a binary mask of the insect specimen would have been created as described in preceding paragraphs, the insect specimen may simply be removed from the given mask, preferably after convolving to peripherally buffer (expand) the insect specimen mask by a predetermined number of pixels in every direction. Next, the pin endpoints are used to construct a mask of the line connecting the two points by identifying all pixels within a second predetermined value of the line as part of the pin. The pin is then removed from the mask, leaving just the label (actually, portions thereof broken apart by the pin's removal) and any background noise. Pixels from this mask disposed above a predetermined point below the insect specimen center are then eliminated. This helps to guard against false detection in those cases where, for example, appendages of the insect specimen missed when finding that insect specimen, extend down far enough for potential confusion with the label. Next, pixels close to the edge of the image and regions that are not within a fixed limit distance of any point on the mask of the pin are eliminated. Thereafter, regions across the pin are joined by checking if the pixels of each region that touch the pin are disposed within the masked distance. Finally, a determination is made to ensure that each label region crosses the pin, and that it spans a number of pixels exceeding a minimum predetermined threshold.

Figure 32C:
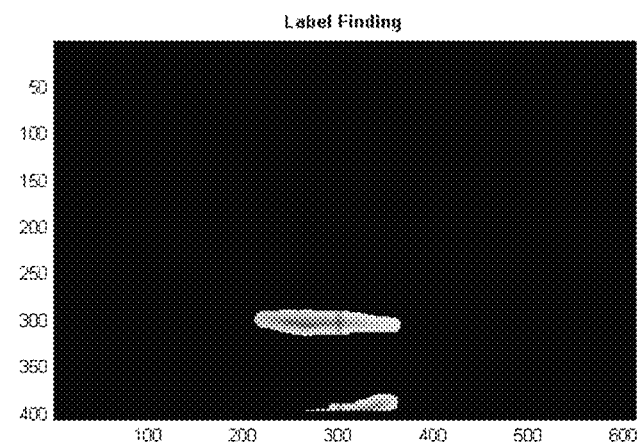

FIG. 32C shows the mask of the labels in the first reference image. Note that both portions of multiple labels in this particular specimen work piece are found, even though only one may be acted on in certain exemplary applications.

Figure 49A:
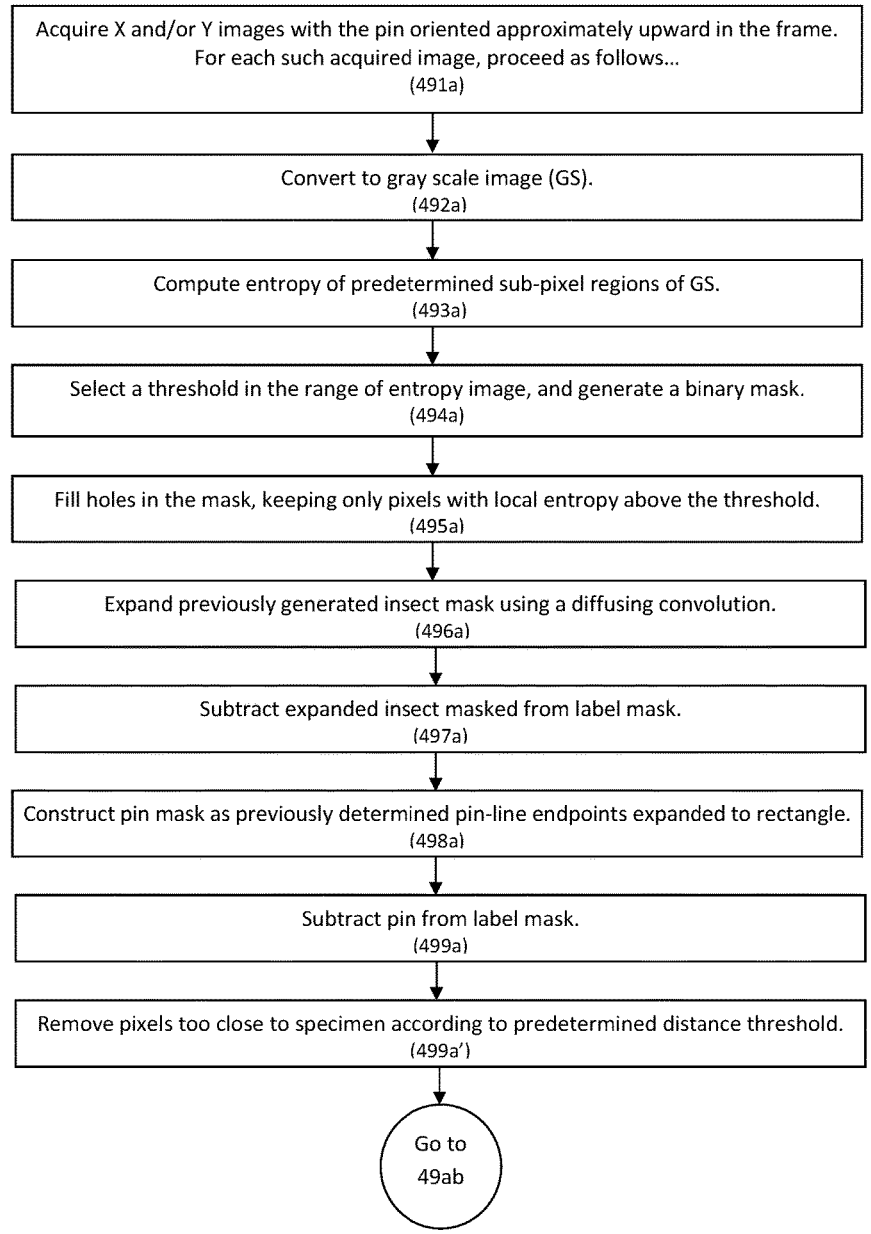
Figure 49B:
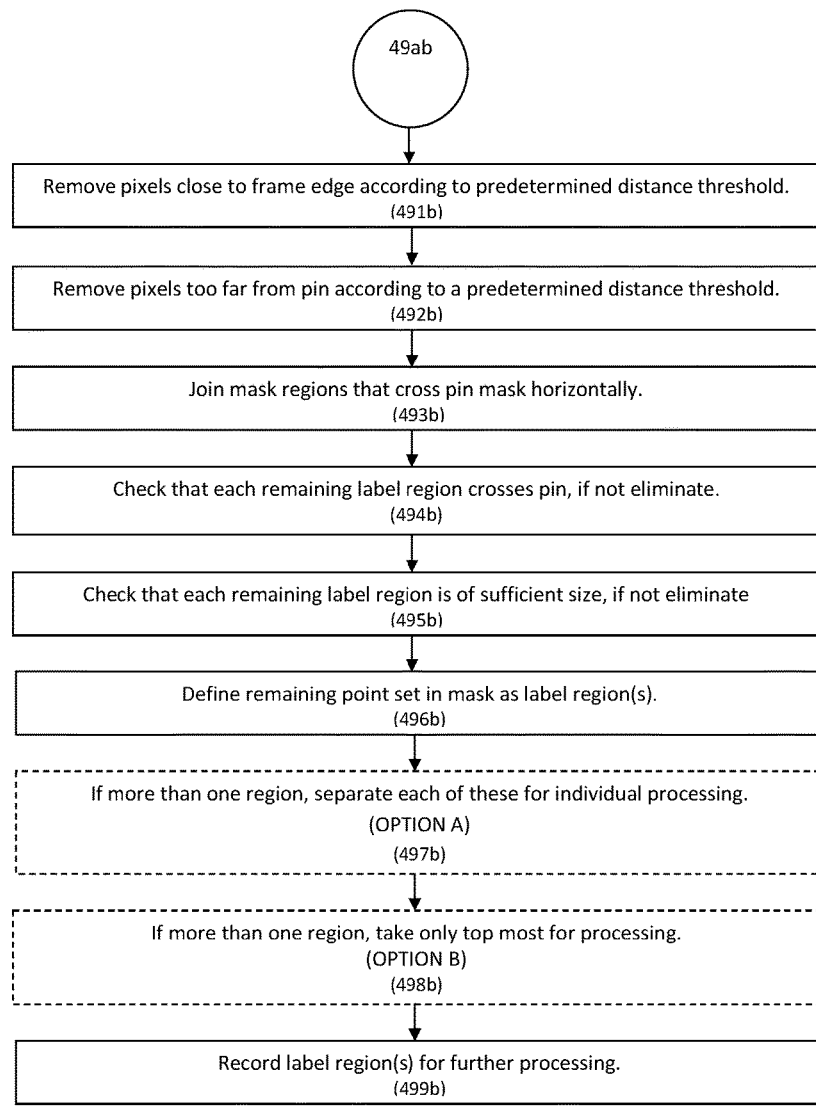

The flow chart collectively shown in FIGS. 49A-B illustrates a flow of processes in accordance with an exemplary embodiment of the present invention to implement this label finding. At block 491a, X and Y reference images are acquired with the pin oriented approximately upward in the frame. The reference images are acquired with the pin oriented approximately upward in the frame. The reference images are converted to grayscale GS at block 492a, and the entropy of predetermined sub-pixel regions of GS is computed at block 493a. At block 494a, a threshold is selected in the range of this entropy image to generate a binary mask. Any holes in the mask are filled in at block 495a, keeping only pixels with local entropy above the threshold. At block 496a, the previously generated insect specimen mask is peripherally expanded using a diffusing convolution. The expanded insect specimen mask is subtracted from label mask at block 497a. A pin mask is constructed at block 498a using endpoints of previously determined pin-indicating line and expanded to define a rectangle delineating the pin. The pin is subtracted from label mask at block 499a, and the pixels determined to be located too close to the insect specimen according to a predetermined distance threshold, are removed at block 499a'.

The flow then proceeds to block 491b of FIG. 49B, where pixels determined to be located too close to edge of the given image according to predetermined distance threshold are removed. At block 492b, pixels determined to be located too far from pin according to a predetermined distance threshold are removed. The residual mask regions which laterally cross pin mask are then joined at block 493b. Thereafter, a check is made at block 494b that each remaining label region extends across the pin, eliminating any that do not. A check is also made at block 495b that each remaining label region meets a predetermined minimum size requirement, eliminating any that do not. The remaining point set in the mask is taken to define the label region(s), as indicated at block 496b.

Prior to recording the label region(s) at block 499b, alternative options are indicated at blocks 497b and 498b. At block 497b, if more than one label region is found, the regions are separated for individual processing; and, the system may proceed to locate, image, and record multiple labels stacked on a single work piece. Alternatively, for purposes of speed, within certain embodiments block 498b may be employed, such that if more than one label region is found, only the topmost label region is kept for further processing.

Stick-Figure Creation in Robot-Manipulated System Example:

After calculating the location of the pin, insect specimen, and label in each of the X and Y images, the information is combined to obtain a 3-D representation of the specimen work piece. First, the pin is defined as a line segment connecting the two endpoints that were found. The x and y coordinate values may be taken to represent columns in the X and Y images, and the z coordinate value as the average of the rows in the two images. The insect specimen is defined as an ellipsoid with a different radius in each of the x, y, z directions. The center of the insect specimen is set as the point halfway between the minimum and maximum x, y, and z coordinate values obtained from the masks of the insects in the two X and Y images. The radii of the ellipsoid are calculated as the distance from the center to the minimum (or maximum) x, y, z coordinate values. The label is defined as a box with a minimum and maximum value in x, y, and z. Defining the label in this manner, image acquisition is limited the case of just one label (as multiple labels would reside at multiple heights resulting in a very thick representation of a label). In the example illustrated, only the top label in each image is considered, however additional labels may be considered in sequence. Accounting for just one label in each of the X and Y images, it is simple to determine the collective minimum and maximum x, y, and z values of the specimen work piece. With the X and Y images fully processed, the rotation of the work piece structure around the Z axis remains to be determined.

Figure 33A:
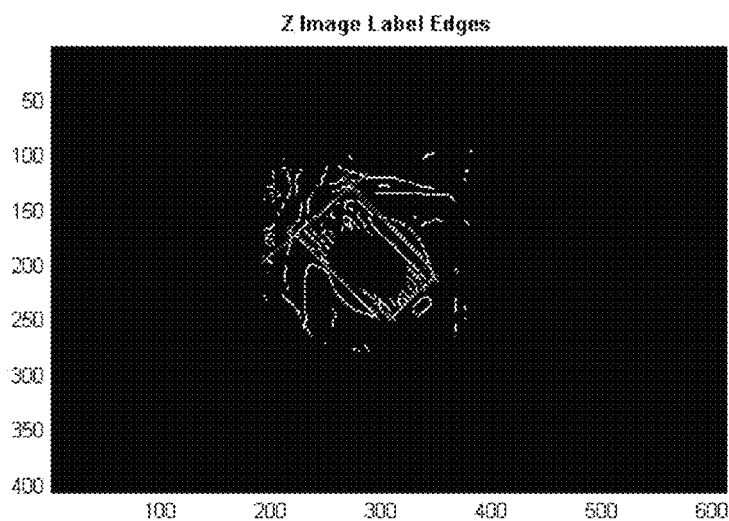
FIGS. 33A-E is a set of graphic renderings illustrating different aspects of a scene segmentation process carried out without feature orientation discovery in accordance with an exemplary embodiment of the present invention with respect to an insect specimen work piece.
Figure 33B:
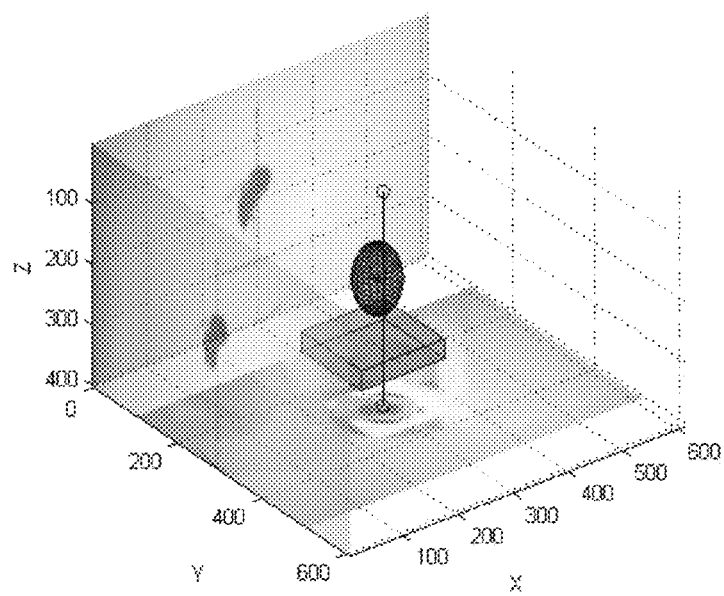
Figure 33C:
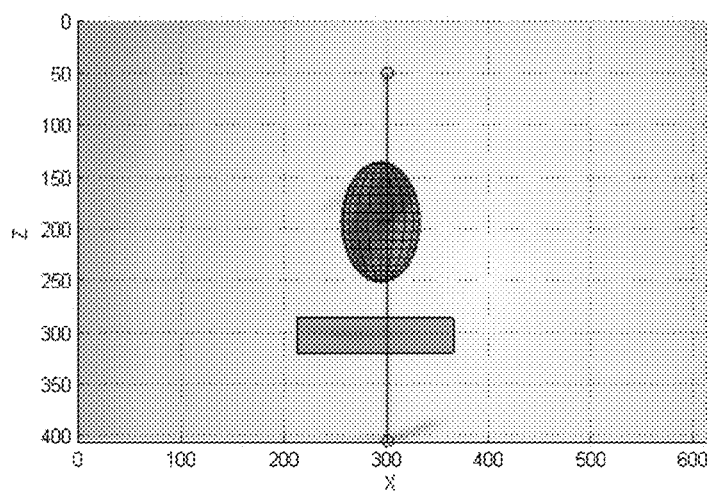
Figure 33D:
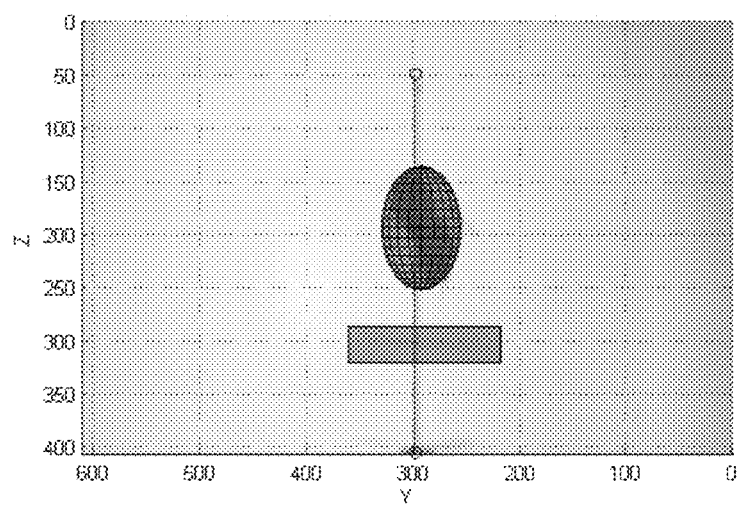

FIGS. 33A-D illustrate the generation of a stick figure from the X and Y images only. As shown, the specimen ellipsoid fully encloses the insect specimen (aside from wings), and the label is found correctly beneath the ellipsoid, even before its orientation within the bounding rectangular region has been determined. FIG. 33B shows the 3-D projection, while FIGS. 33C-E show the stick figure projected into each of the image planes to enable visual verification of its overlap.

Figure 33E:
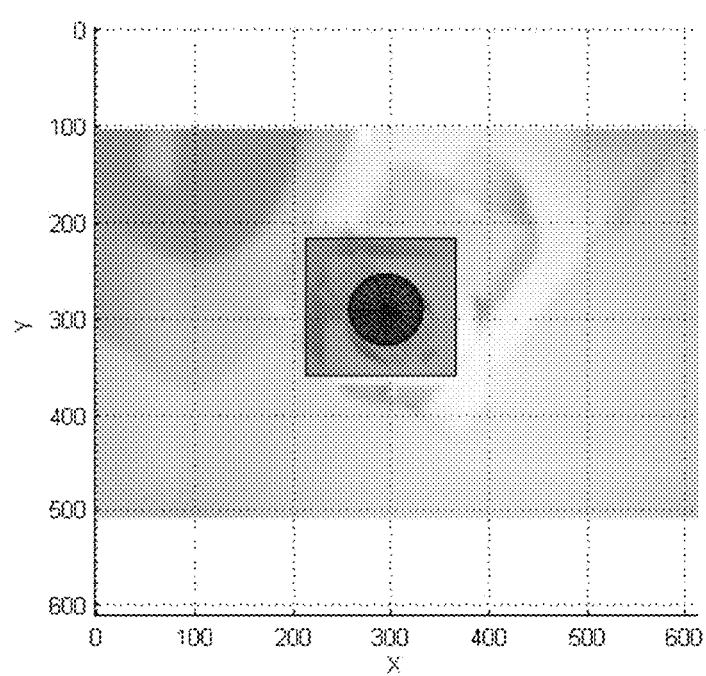
Figure 34A:
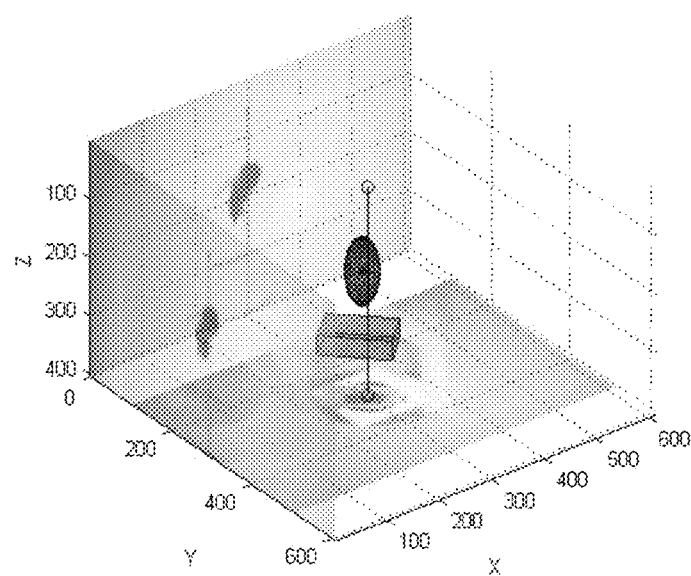
FIGS. 34A-D is a set of graphic renderings illustrating different aspects of a scene segmentation process carried out with feature orientation discovery in accordance with an exemplary embodiment of the present invention with respect to an insect specimen work piece.
Figure 34B:
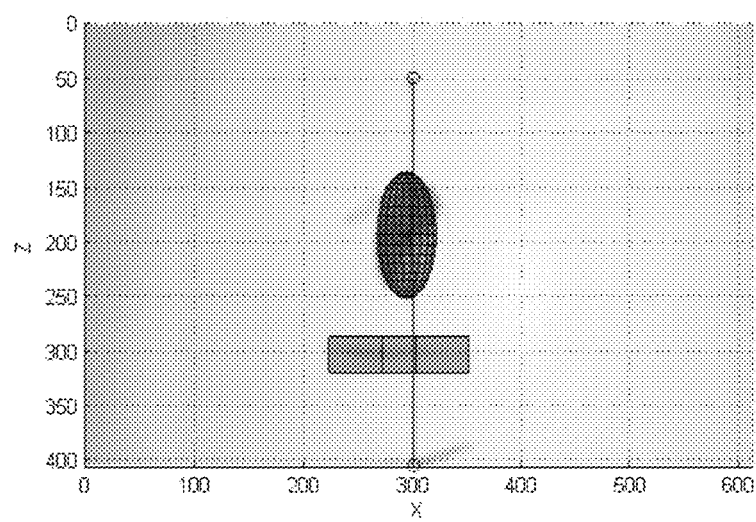
Figure 34C:
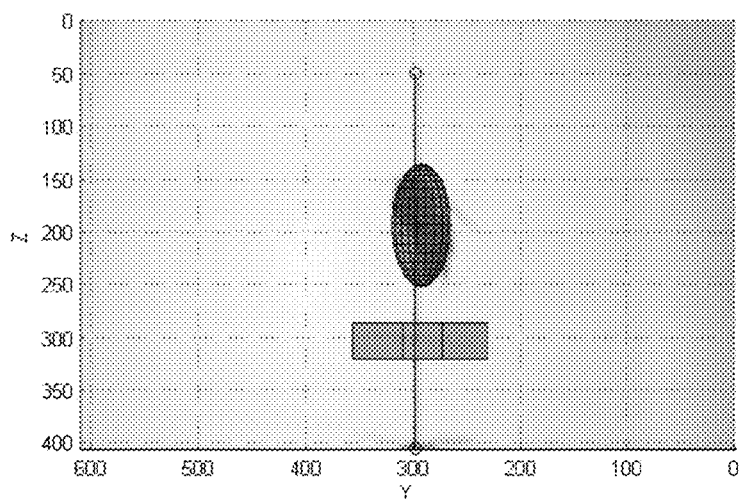
Figure 34D:
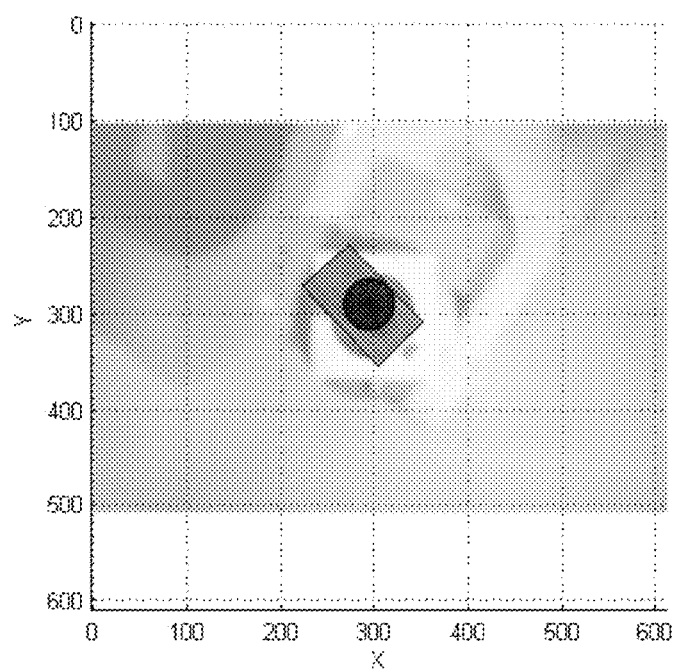

Note that in FIG. 33B (at the bottom) and in FIG. 33E, a third, top-down image or "Z" image is included. This is shown for comparison, to clarify that, indeed, the X-Y derived label bounding box does contain the label; however, it is not tightly defined since Z image information has yet to be applied to obtain orientation. Within certain applications, such as those requiring rapid imaging of the insect specimens only, the X-Y derived model may be sufficient. In such embodiments, the orientation-finding steps may be skipped, proceeding directly to image acquisition.

Figure 50:
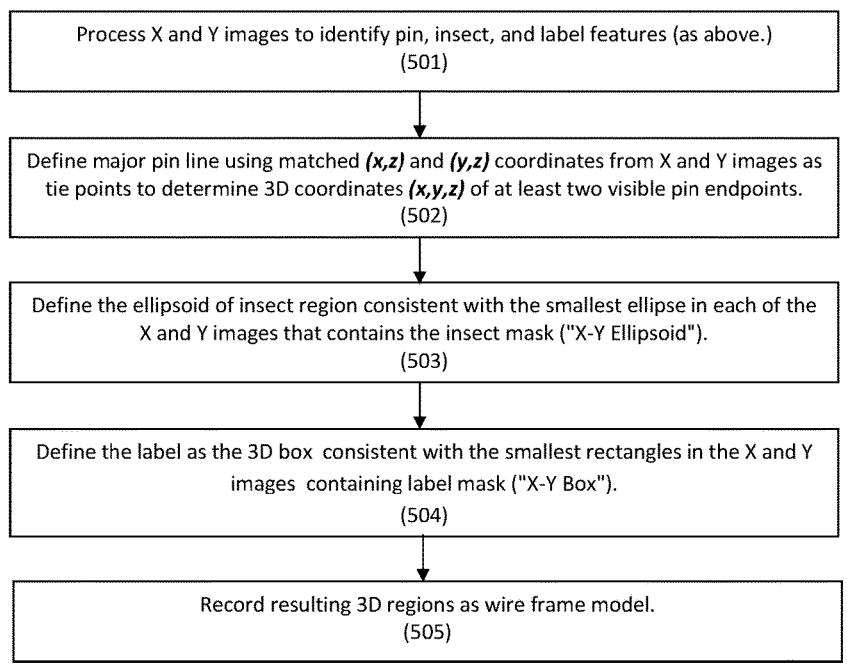

The flow chart shown in FIG. 50 illustrates a flow of processes in accordance with an exemplary embodiment of the present invention to create a 3-D stick figure or wireframe model estimation for the given work piece. At block 501, the X an Y reference images are suitably processed to obtain pin, insect, and label features as described in preceding paragraphs. At block 502, the major pin line is defined in (x,y,z) using matched (x,z) and (y,z) coordinates from the X and Y reference images. At block 503, the ellipsoid of the insect specimen is defined consistent with the smallest ellipse in each of the X and Y images that contains the insect specimen mask. The label is defined at block 504 as the 3-D box consistent with the smallest rectangles in the X and Y images containing the label mask.

Finding Label Orientation from Z Image in Robot-Manipulated System Example

The Z image may be used to identify the orientation angle of the label. To do so within the exemplary embodiment, the insect specimen is first found in the image by first masking the image to keep only pixels within the square containing the insect ellipsoid found in the X and Y images, expanded to include a predetermined buffer border. The same insect specimen finding measures as described in preceding paragraphs for the X and Y reference images are applied to the masked image to find the Z image mask of the insect specimen.

The next step is to find the label in the Z image. In this regard, holes of the insect specimen mask are filled in, then pixels are identified in the images located within the rectangle of the label as previously estimated. A mask is then constructed that eliminates the insect specimen from the label's mask. Using the same edge parameters, edges in the original (unmasked) image are calculated. Edges are eliminated from the masked image that would extend beyond a predetermined small number of pixels from the label's mask (in the unmasked edges). Next a Hough Transform is performed, and search is made of the strongest line in the remaining edges. Once the strongest line is indentified, it is counted as the first edge of the label. The edge that contributed most to the line is then eliminated from consideration, and the search resumed for additional lines using the same process with additional constraints. There should be only one more line having an angle within a predetermined range of the first line, and two lines having an angle orthogonal (within a predetermined range) to the first line. In addition, it is notable that these lines must be separated by no less than a minimum number of pixels in order to ensure a far edge of the label is revealed rather than two lines linked to the same edge. At this point, four line segments have been identified, and the intersection points of these lines are found to identify the corners of the label (4 corners for each of the minimum and maximum z values of the label). A check is made to ensure that the pin intersects with the label. If it does not, it is generally assumed that the label was not found. The system may then refer back to the information obtained from the XY images (or possibly use another suitable approach to determine the orientation angle). If the label passes this check, the system calculates the length of each edge of the label and uses the angle of the longest edge to determine the angle of the label.

FIG. 33A illustrates a top-down Z image of the label edges for determination of relative angular orientation along the pin's axis relative to the insect specimen. The white lines indicate a set of edges retained from the masked image, and the green lines correspond to the label edges, as determined by the system's processing.

With this orientation (accompanied by the tilt angles of the pin), the coordinate system may be rotated to correspond with the work piece structure and label orientation. The coordinates of the label and pin may be accordingly rotated upon calculation of the insect specimen's offset therefrom, and the results passed to the robot along with the location and orientation of the insect specimen.

FIG. 33A show the edges of the label detected in the Z Image used to calculate the orientation of the work piece structure. FIGS. 34A-D show the stick figure calculated from the images, using the Z Image to calculate the angle of the label. It is noted that, generally, the label is much smaller than in previous figures now that it is oriented properly.

Figure 51A:
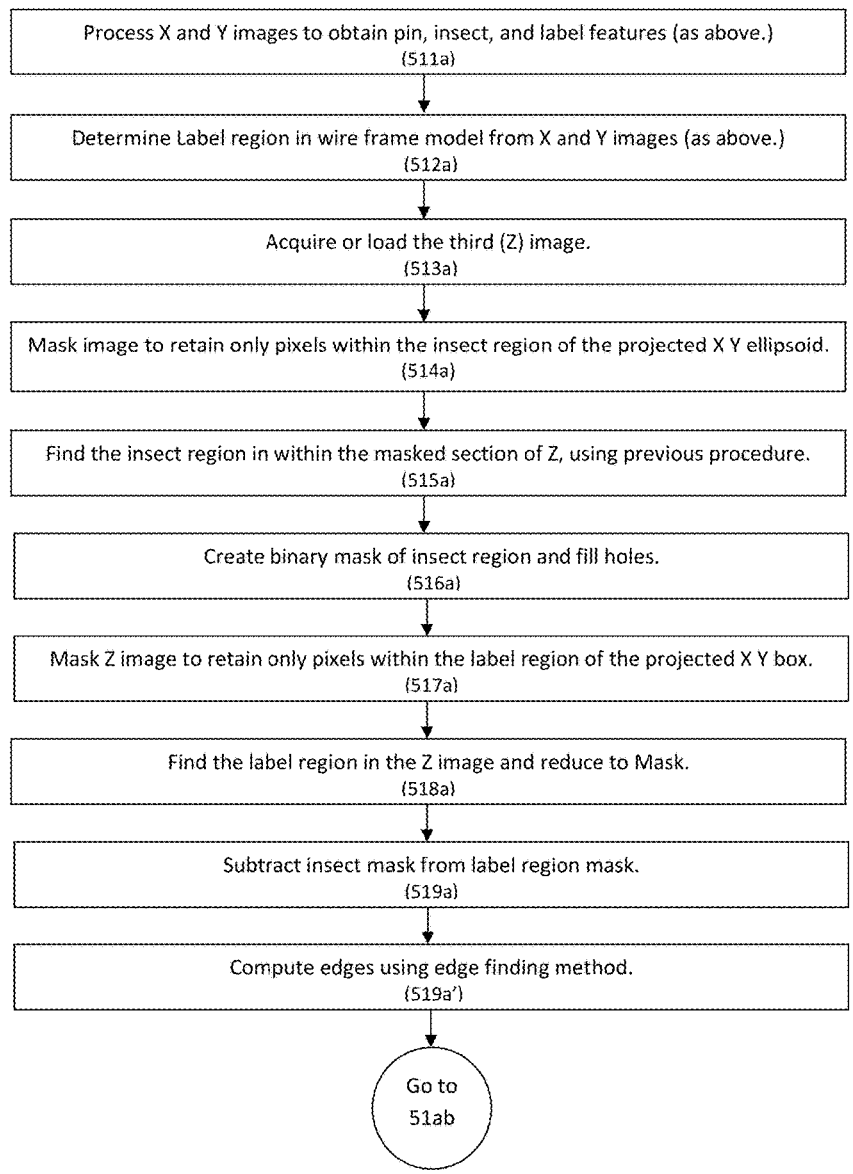
Figure 51B:
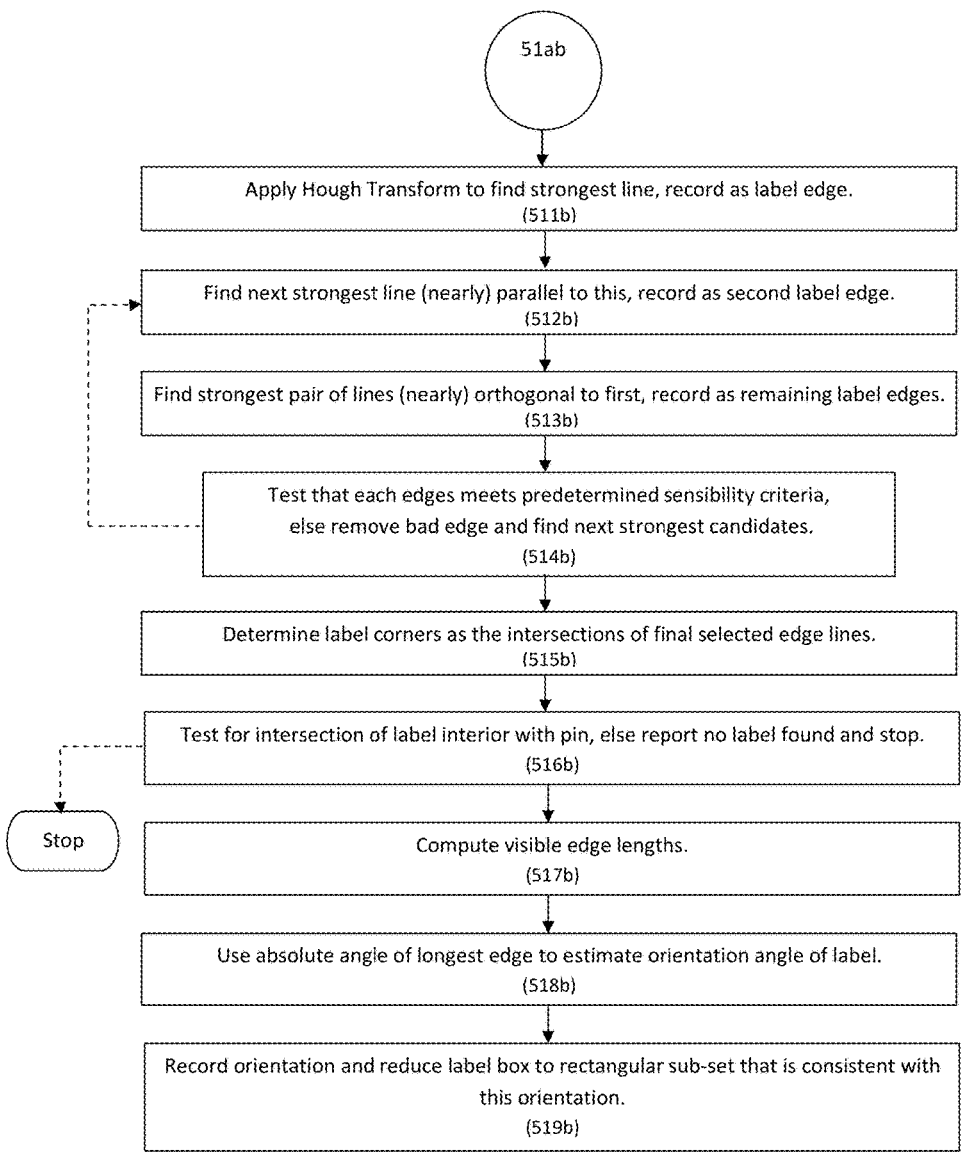

The flow chart collectively shown in FIGS. 51A-B illustrates a flow of processes in accordance with an exemplary embodiment of the present invention to create a 3-D stick figure model estimation for the given work piece, upon resolution of label orientation from a third Z-axis image. At block 511a, the X and Y references image are processed to obtain pin, insect specimen, and label features as described in preceding paragraphs. At block 512*a*, the label region is determined in the 3-D stick figure as described in preceding paragraphs. At block 513*a*, a Z reference image is acquired and masked at block 514*a* to retain only pixels within the insect specimen region of the projected XY ellipsoid. The insect specimen region is found in within the masked section of the Z image at block 515*a*, in much the manner the insect specimen region is found in the X and Y images. A mask of insect specimen region in the resulting image is created at block 516*a*, and any holes are filled. The Z image is masked at block 517*a* to retain only pixels within the label region of the projected X Y determined box. At block 518*a*, the label region is found in the Z image and reduced to a mask. The Z image insect specimen mask is subtracted from Z image label region mask at block 519*a*. The edges are then computed at block 519*a'* using a suitable edge finding technique (e.g. Canny edge detection).

At block 511*b* of FIG. 51B, a Hough Transform is applied to find the strongest line in the resulting Z image, which is record as a label edge. At block 512*b*, the next strongest line parallel or near-parallel to the strongest line is found and record as a second label edge. The strongest pair of lines orthogonal or nearly orthogonal to the first line are found and record as remaining label edges at block 513*b*. Each of the edges is tested at block 514*b* to ensure it meets predetermined sensibility criteria. If not, such edge is removed and the next strongest candidate found. At block 515*b*, label corners are found as intersection of edge lines, and at block 516*b*, a test is made for the intersection the label interior's with the pin. The process is stopped if the test fails, and a report is made of no label having been found. At block 517*b*, the edge lengths are computed, with the angle of the longest edge being used at block 518*b* to estimate the orientation angle of the label. The orientation is reported at block 519*b*, and the label box reduced to a rectangular sub-set (of the box found using the X and Y reference images) consistent with the orientation.

Figures 35A, 35B:
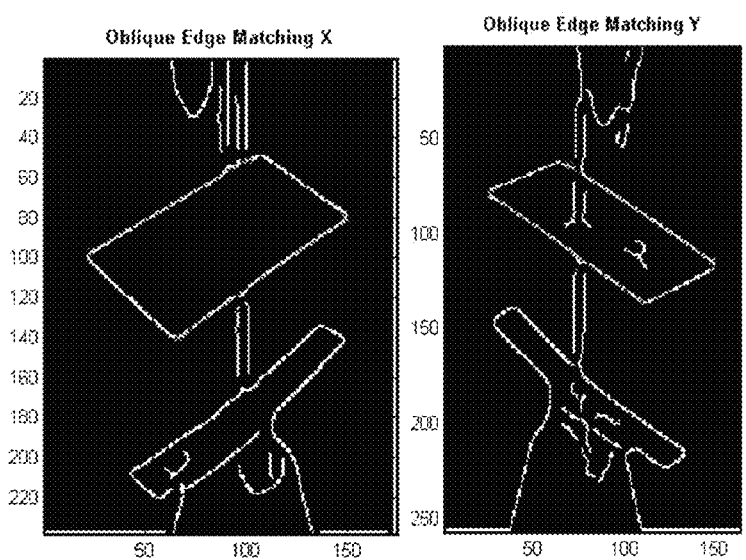
FIGS. 35A-B is a set of graphic renderings illustrating different aspects of a scene segmentation process carried out with supplemental oblique reference images captured for feature orientation discovery in accordance with an exemplary embodiment of the present invention with respect to an insect specimen work piece.
Figure 52:
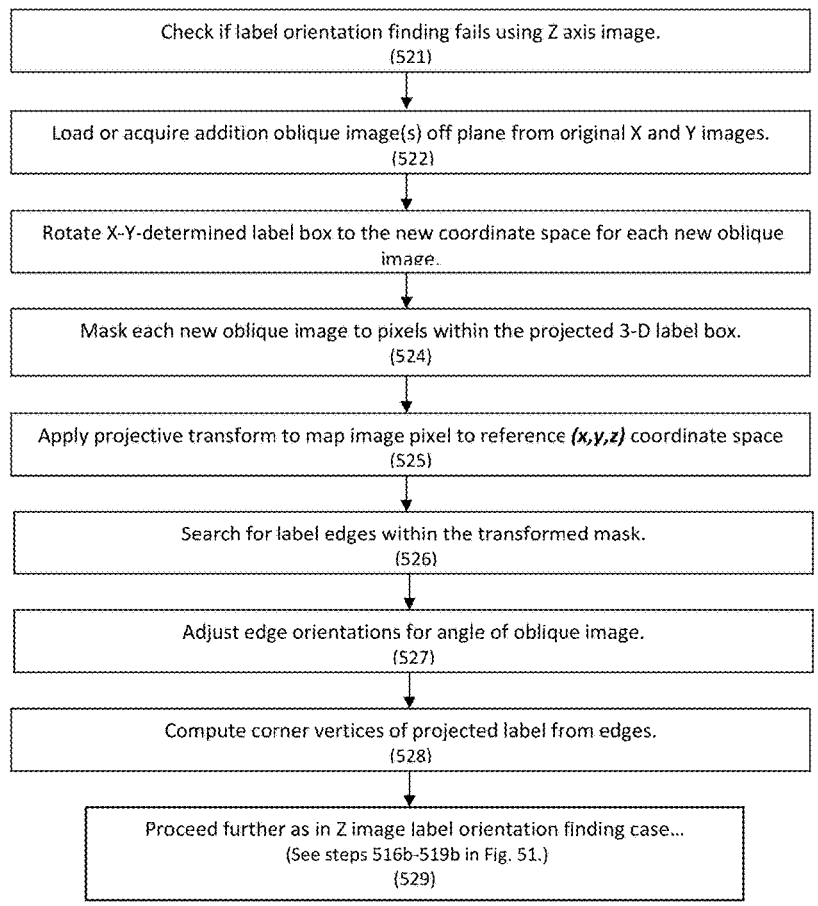

Finding Label Orientation from Oblique Images in Robot-Manipulated System Example:

If the Z Image label orientation fails, oblique images may be used to search around the insect specimen to find the label. To do this, additional reference images are taken from an offset elevation angle of, for example, 22.5° above each of the X and Y image planes. The label box is first rotated to be in pixel space of the additionally acquired oblique reference images. Next, the image is masked to include only those pixels contained within the XY box of the label derived from the X and Y images. The masked image is then transformed (using a suitable projective transformation) to convert the oblique-referenced pixels to actual (x,y,z) pixel space as oriented to the work piece. Edges of the transformed masked image are then calculated, and a search is made for label edges. This is similar to the processing steps applied to the Z image, but with an additional constraint: the first discovered line is forced to be within a predefined threshold angle of horizontal, and only the two strongest parallel edges are considered. With reference to the azimuthal angle at which the oblique image was taken (for determining the primary angle of the label), all four angles are averaged together (one for each of the parallel lines in both oblique images). Based on the domain knowledge that the label includes a corner for each edge of the label rectangle calculated from the X and Y images, one coordinate may thus be set for each vertex of the label. Another coordinate may be calculated from the primary angle of the label just calculated. With this information, the process further flows much as in the Z image-based label orientation finding case (i.e. checking that the pin intersects the label, using the longest label edge to identify the orientation, and so forth, steps 516*b*-519*b* in FIG. 51). FIGS. 35A-B illustrate the X- and Y-matched edges in the two oblique images used to find the orientation of the label in this manner The flow chart shown in FIG. 52 illustrates a flow of processes in accordance with an exemplary embodiment of the present invention to alternatively find label orientation angle, where the label is obscured in a Z axis image of the specimen work piece. At block 521, it is determined whether label finding using a supplemental Z image has in fact failed. If so, the flow proceeds to block 522 additional oblique angle reference images are acquired from view points above the planes of the original X and Y reference images. At block 523, the X Y determined label box is rotated to the new pixel space for each new oblique angle reference image. Each new reference image is masked to keep only those pixels within the projected 3D label box at block 524. A projective transform is applied at block 525 to convert image pixels to actual X, Y coordinate space. A search is made at block 536 for label edges within the transformed mask, as with the Z image processing. At block 527, the edge orientations are adjusted for the view angle of oblique image, and at block 528, vertices of the projected label are computed from the edges. The remaining processes flow from there on much as in steps 516*b*-519*b* in the flow chart of FIG. 51B for Z image processing.

Figure 36:
FIG. 36 is a graphically marked photographic view of a Z-axis reference image captured in a scene segmentation process for feature orientation discovery in accordance with an exemplary embodiment of the present invention with respect to an insect specimen work piece.

Finding Insect Specimen Orientation from Z Image in Robot-Manipulated System Example:

It is desirable to determine the major axis of the insect specimen so that the imaging sequence may be properly aligned to the specimen work piece. Typically, there are two main cases of interest, depending on whether the insect specimen is mounted on the main pin or on secondary pin or other structure attached to the main pin. The system first executes a check to determine if the insect specimen's ellipsoid intersects with the pin. If the insect specimen is not found actually on the main pin, the angle of the line that connects the pin to the center of the insect specimen is considered. If the insect specimen is found on the main pin, a high resolution Hough Transform of the insect specimen mask is performed, and the angle of the strongest line obtained. FIG. 36 shows the orientation of the longest such line within the insect specimen indicated by a green line, as computed from the Z Image. The highlighted region about the green line represents the mask of the insect specimen in this sample image. By averaging over several examples of such lines, taken from among the strongest Hough transform peeks and limited to be within a predetermined threshold angle of the longest such line, an improved estimate is made of the orientation of the insect body center line (not shown).

Figure 53:
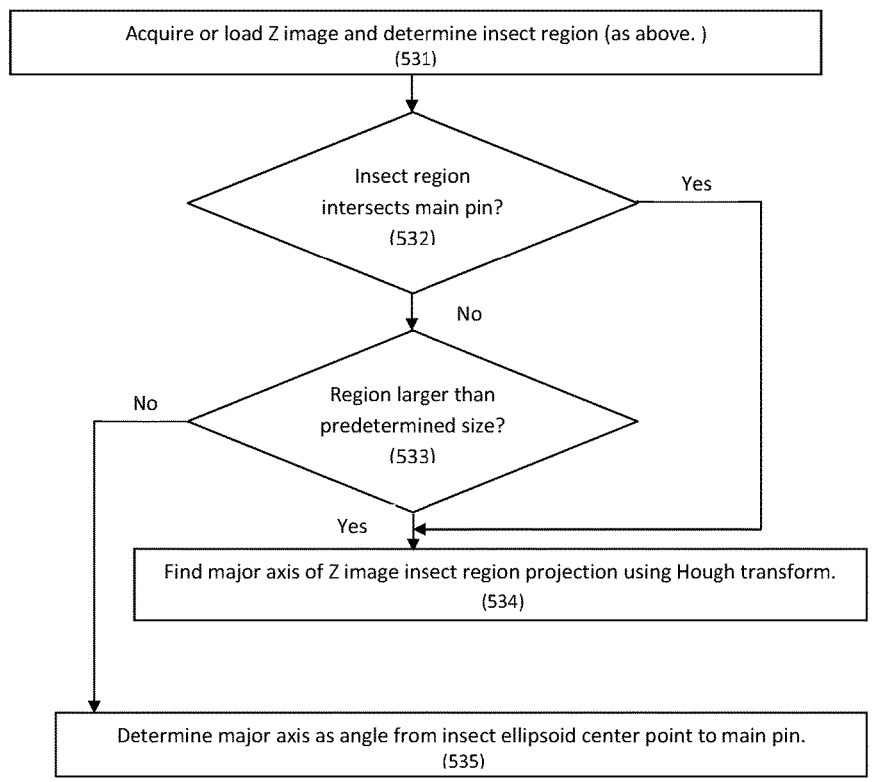

The flow chart shown in FIG. 53 illustrates a flow of processes in accordance with an exemplary embodiment of the present invention to find the insect specimen's orientation angle from the Z-axis image. At block 531, the Z-axis reference image is acquired, and insect specimen region is determined thereon, much as described in preceding paragraphs. If insect specimen region is found to intersect the main pin, as indicated at block 532, the major axis of the Z reference image projection is determined at block 534, preferably using a Hough transform as described in the preceding paragraphs. Otherwise, if the insect specimen region is found to not intersect the main pin, a check is made at block 533 as to whether the insect specimen is larger than a predetermined pixel size. If so, the flow proceeds to block 534, where the major axis of Z image projection is determined, preferably using Hough transform. If not, the flow alternatively proceeds to block 535, where the major axis of the Z image projection is determined as the angled line from the ellipsoid's center point to the main pin.

Within the exemplary system embodiment, insect body orientation information is applied to adaptively orient the pre-programmed relative image acquisition points to the actual specimen orientation. In certain alternate embodiments, the line from the insect specimen center to the pin is exploited as a primary reference orientation as described in preceding paragraphs. In other alternate embodiments, the label orientation is used as also described in preceding paragraphs as a primary reference orientation for the insect acquisition. This proves particularly useful with irregularly shaped specimen work pieces, and where mounting standards have been established by curators to enforce label/specimen alignments.

Additional Notes on Adaptively Conformed Acquisition Path Processing in Robot-Manipulated System Example Viewing Angle Verification in Robot-Manipulated System Example:

With the information obtained from scene segmentation of the pinned specimen work piece, an optimal viewing angle for the label is defined, as is the limit of the viewing angle for the insect specimen to be imaged from below without obstruction. These angles are essentially the same, except that they are defined from opposing directions along a viewing plane. To calculate this angle, the edges of the label are intersected with the opposite edge of the insect specimen ellipsoid as described in preceding paragraphs. The line when extended defines a plane in the depth dimension of the image.

To compute physically achievable acquisition points, a set of input test points are provided preferably in spherical coordinates, and a determination is made by the system as to whether they are achievable. As described in connection with FIGS. 10A-B and 18, the normal vectors of the plane are then computed along with the signed distance of each input point to each of the planes. If an input point is unachievable, it is moved to be on the plane and then moved along the plane to maintain a distance from the specimen center consistent with the requested radius. A check ensures that this adjusted point is closer to the originally requested point than any other point on the planes, and that it does not lie within the stay away zone defined about and between the insect specimen and label models.

In acquiring images of the label (as opposed to the insect specimen), an additional check is made to ensure that the final elevation of an acquisition point is above an input minimum threshold elevation below a certain critical elevation angle, information or other indicia provided on a top surface of the label is not visually discernible. This critical angle will vary by the type of print, flatness and deterioration of label, and other characteristics, but may typically range between 5 and 18 degrees.

This angle verification process generally presumes the entirety of the ellipsoid is occupied by the insect specimen and that important label information is disposed to extend the edges of the box. This means that in most instances the process is conservative and returns a slightly shallower elevation angle than is strictly required for acquiring the label. Thus, a suitable control is preferably provided on a user interface for the system which permits user modification of the elevation angles for label image acquisition. Preferably, acquisition points are provided in advance in spherical coordinates about the insect specimen's midpoint, or may be offset therefrom to allow the acquisition points to be referenced to some feature other than the insect specimen center. Alternatively, the input acquisition points may be provided in terms of radii off the surface of the insect specimen's ellipsoid, thus keeping the camera at a fixed distance from the specimen surface rather than its midpoint.

Figure 37A:
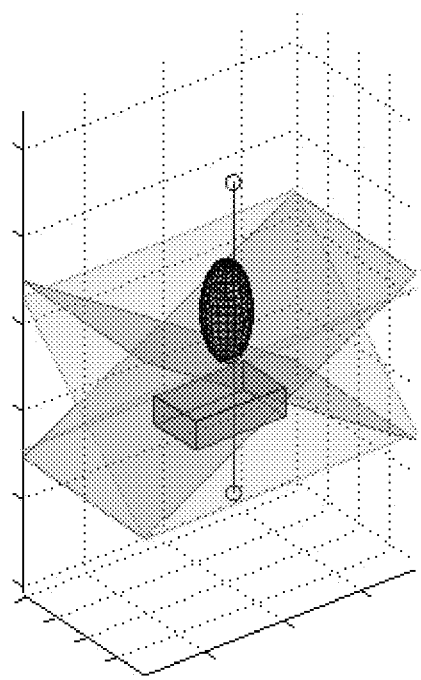
FIGS. 37A-B are a set of graphic rendering illustrating viewing angle confirmation for distinguished features of an insect specimen work piece in a scene segmentation process carried out in accordance with an exemplary embodiment of the present invention.
Figure 37B:
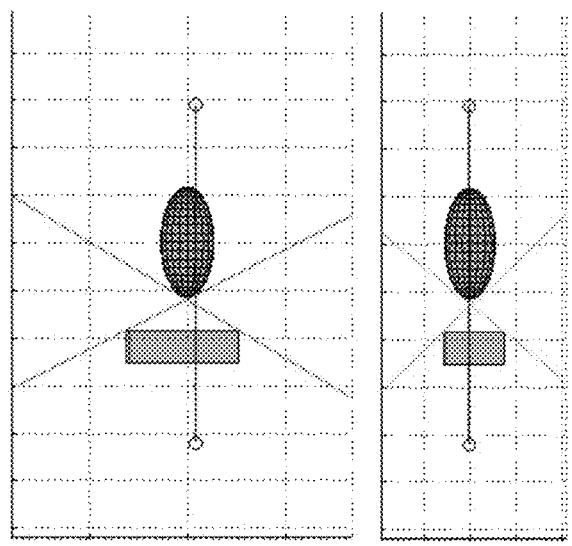
Figure 54:
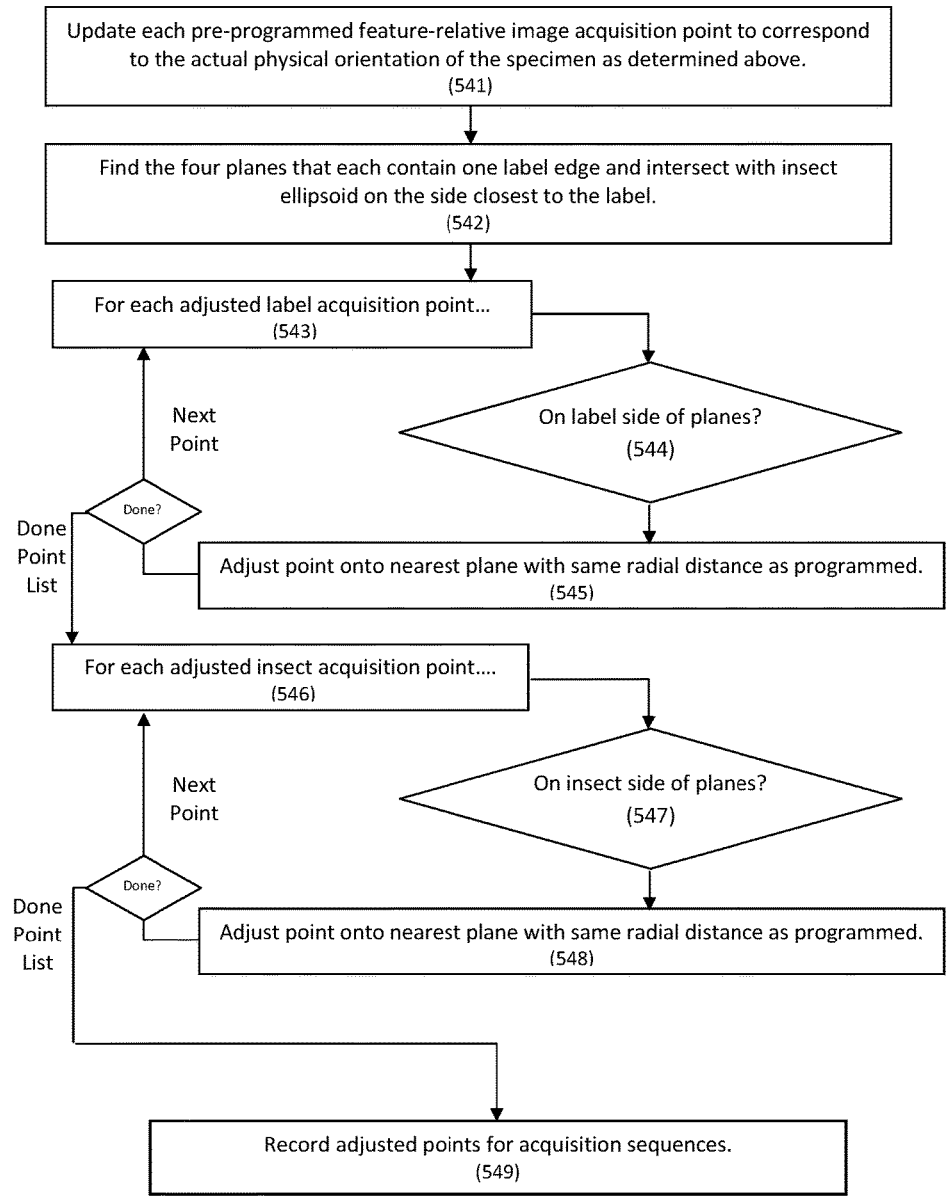

FIGS. 37A-B schematically illustrate the optimal viewing angles computed for the work piece after re-orienting based on Z-image label orientation. The flow chart shown in FIG. 54 illustrates a flow of processes in accordance with an exemplary embodiment of the present invention to carry out adaptive viewing angle verification. At block 541, each programmed acquisition point is updated to correspond to the actual orientation of the specimen work piece determined as herein described. At block 542, four view-limiting planes are found which contain each label edge and intersect with insect specimen ellipsoid at a near side. A determination is then made at blocks 543 and 544 for each adjusted label acquisition point as to whether the point is disposed on a label side of the viewing planes. If so, the adjusted acquisition point is left unchanged, and flow proceeds to block 546. Otherwise, the adjusted acquisition point is moved onto the nearest view-limiting plane and adjusted to the same radial distance from center as the programmed acquisition point, as indicated at block 545. At blocks 546 and 547, another determination is made for each adjusted insect specimen acquisition point as to whether the point is disposed on the insect specimen side of the viewing planes. If so, the adjusted acquisition point is left unchanged, and flow proceeds to block 549. Otherwise, the adjusted acquisition point is moved at block 548 onto the nearest viewing plane, and adjusted so as to have the same radial distance from center as the programmed acquisition point. At block 549, the adjusted or confirmed acquisition points are recorded for further acquisition path processing.

Figure 39A:
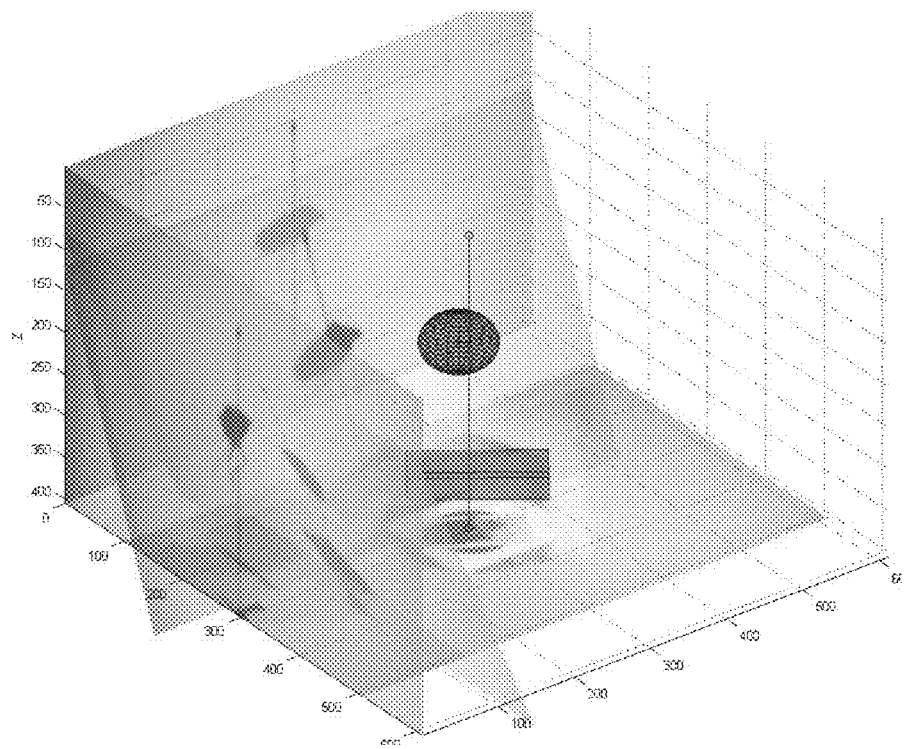
FIGS. 39A-B are a set of graphic rendering illustrating various portions of scene segmentation process carried out with feature orientation in accordance with an exemplary embodiment of the present invention.
Figure 39B:
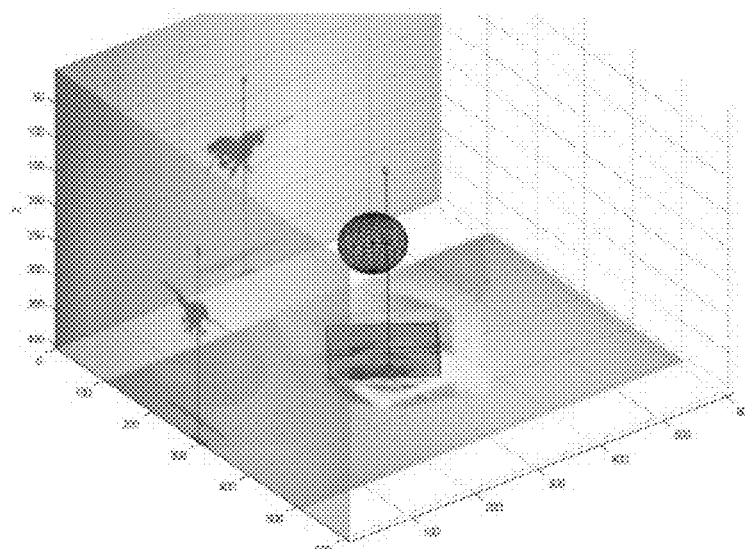
Figure 39B:
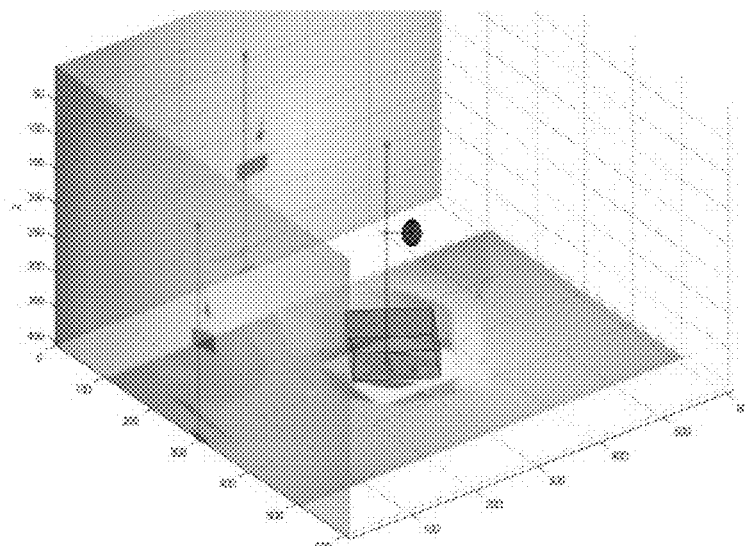
Figure 39B:
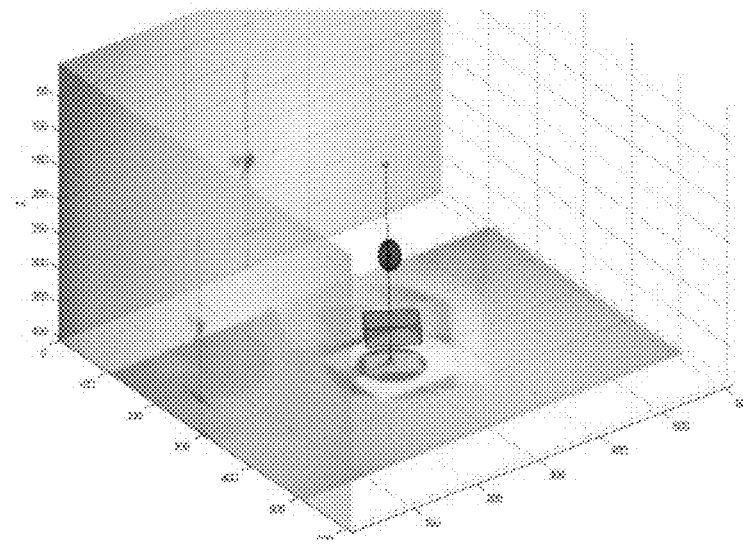
Figure 39B:
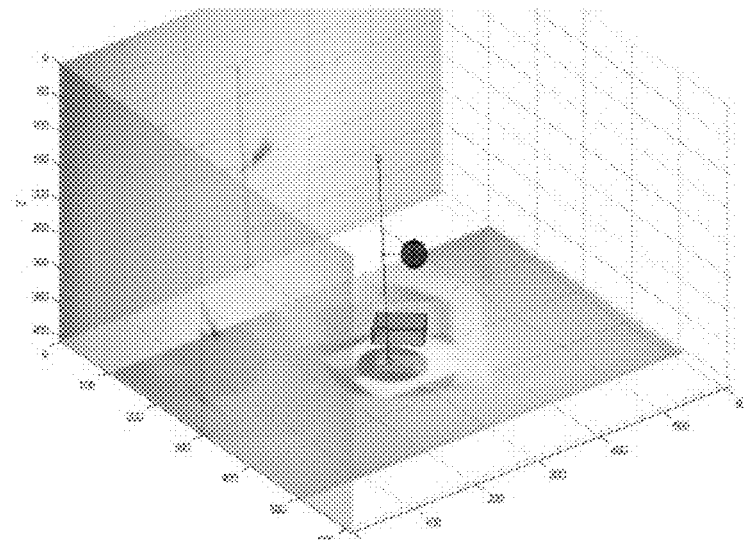

Most specimen work pieces required only three reference images (including the Z-axis reference image), such as with the bee insect specimen work piece example shown in FIGS. 32-36. Additional oblique reference images are automatically acquired by the system where a larger insect specimen occluded the label in the top Z-axis view. Oblique angle reference images, as illustrated in FIG. 39A, are used (as described herein) for both label and stick figure determination in various embodiments, particularly in situations where important work-piece features are occluded in the X, Y, or Z axis. Such a situation would occur, for example, in the case of certain butterflies with wing extent larger than the label or, conversely, where a very small insect is mounted close to a very large label. The number of required reference images depends primarily on the insect specimen in question, as large-bodied or long-winged insect specimens tend to obscure more of the label from visibility in a top-down Z-axis view. The supplemental oblique angle reference images are found sufficiently remedial to such situations, enabling the system as described in preceding paragraphs to nonetheless obtain proper estimation of label orientation Scene segmentation was found to be successful on operation of the system with a widely varied range of test insect specimen types. This was regardless of insect specimen size or the location of the insect specimen on the work piece (whether disposed directly on the main pin or on a secondary structure extending therefrom). Examples of the various work piece configurations for the test insect specimens successfully scene-segmented (and adaptively imaged) by the system in fully automatic operation are illustrated in FIG. 39B.

Image Acquisition Path Planning in Robot-Manipulated System Example

Figure 40A:
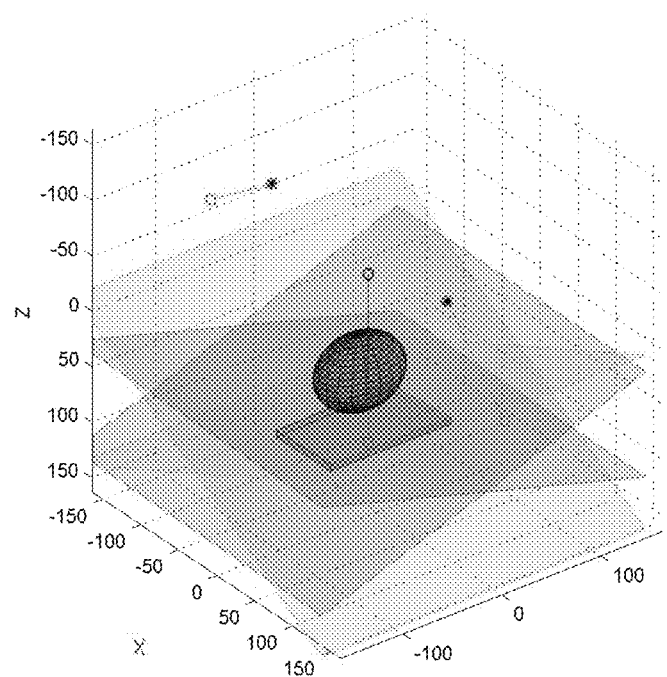
FIGS. 40A-B are graphic renderings illustrating examples of acquisition paths adaptively generated by an acquisition point planning process carried out in accordance with an exemplary embodiment of the present invention for viewing different features distinguished for an insect specimen work piece.
Figure 40B:
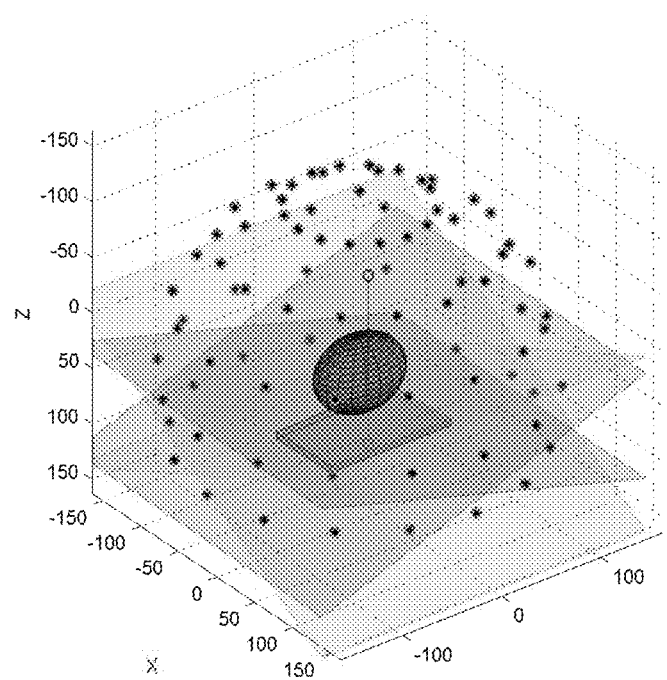

Referring to FIGS. 40A-B, the views illustrate the planning of image acquisition point locations for imaging the label (FIG. 40A) and insect specimen (FIG. 40B). The blue and magenta planes demarcate areas in which the label or insect specimen is fully visible from respective sides. The acquisition points "*" are adjusted as necessary (the adjusted points marked by green squares) to avoid occlusion of the targeted feature, be it the label or insect specimen.

Acquisition points are planned based on the discovered location of features within the 3-D scene formed by the work piece. Some typical acquisition points are shown. Possible image occlusions are determined by finding planar surfaces that are tangent to the insect specimen ellipsoid and intersect edges of the uppermost surface of the label box. Label acquisition, as illustrated in FIG. 40A, is planned as two images taken from points at opposing sides of the pin, with the label oriented lengthwise across the camera lens. If an attempt is made to capture a label image from a view point disposed at a 45-degree elevation above the label plane, for example, control software programmed in the system automatically detects occlusions of the view angle by the insect specimen body and adjusts the point to one at a lower elevation angle to ensure that the entire label is visible in each image. Insect specimen acquisitions typically include views equally spaced angularly about an upper-hemisphere of the insect specimen and typically as far as about 20 degrees of view angle elevation into its lower hemisphere (depending on the relative geometries of the specimen and label). These view angles (and the corresponding acquisition points) are also monitored and adaptively adjusted automatically by system software to avoid any occlusions by the label, as well as to avoid collision with any part of the work piece, manipulator, or any other potential obstruction in or near the given work space.

Figure 41A:
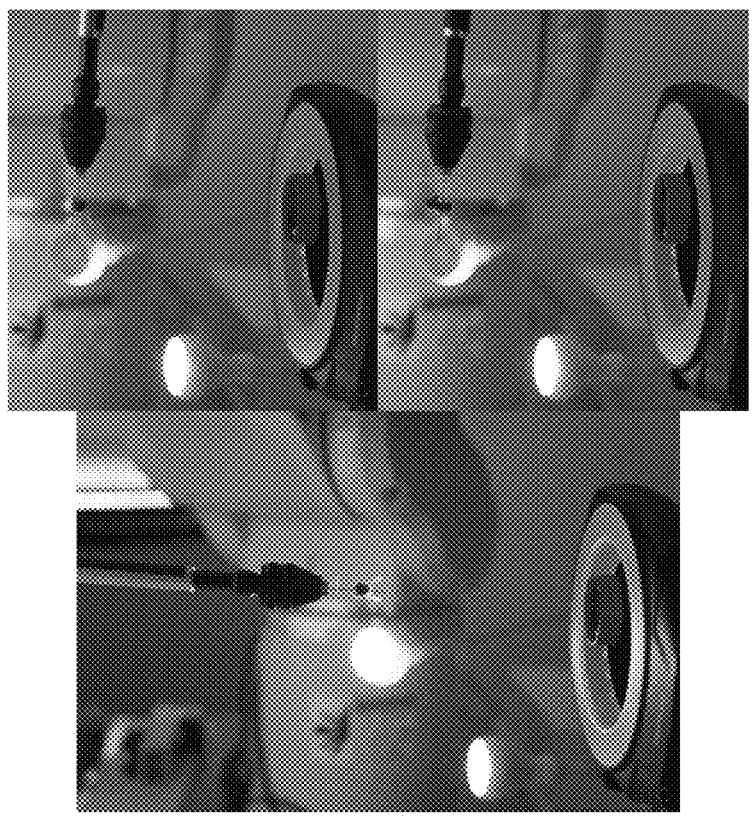
FIG. 41A is a set of photographic views illustrating a preliminary acquisition sequence for capturing a set of reference images of an insect specimen work piece, including a Z-axis reference image, by a manipulator-based system formed in accordance with an exemplary embodiment of the present invention.

Combined Scene Segmentation and Adaptive Image Acquisition in Robot-Manipulated System Example Adaptively Conformed Image Acquisition:

By way of illustrative example, FIG. 41A illustrates a typical three X, Y, and Z initial reference image acquisition sequence used to support scene segmentation processing in accordance with one exemplary embodiment of the present invention. An insect specimen work piece-in-motion configuration is illustrated, wherein the work piece is turned and re-positioned by the manipulator as needed relative to a stationary camera, to be preliminarily imaged from two orthogonal sides (top two captioned views), then from the top side (bottom captioned view). The system executes scene segmentation processing on the reference images thus required (as the label is sufficiently visible beneath the insect specimen in this case to obviate the need for any supplemental oblique reference images).

Figure 41B:
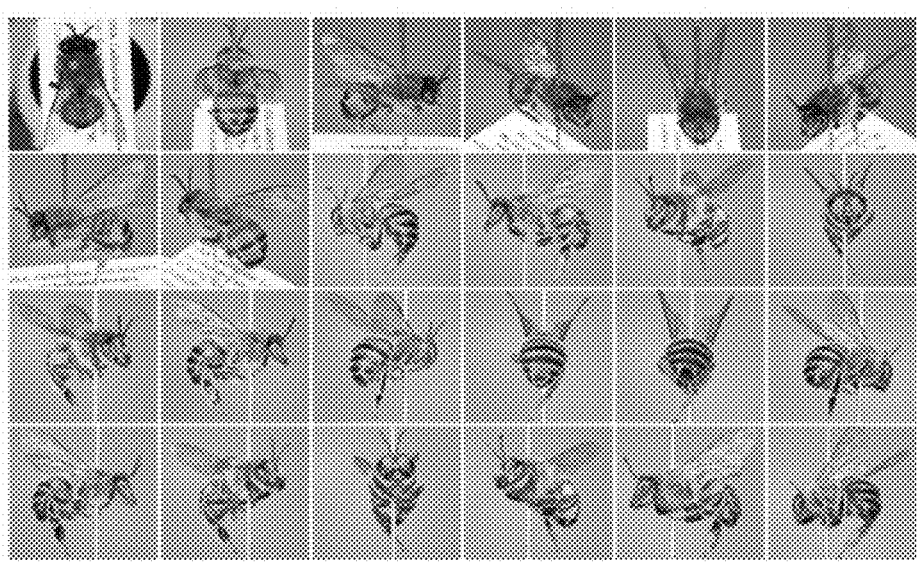
FIG. 41B is a series of sample images acquired for an insect specimen work piece over an adaptively generated acquisition path by a manipulator-based system formed in accordance with an exemplary embodiment of the present invention.

The system further executes adaptive acquisition path planning based on scene segmentation of the given work piece, after which it actuates capture of the requisite the work piece images from the acquisition points prescribed along the path. The series of images acquired by the system thereby are illustrated in FIG. 41B, which shows three sets of eight consecutive images captured at 45-degree increments in azimuth about the work piece, at each of three different elevation angle levels (above the insect specimen, at its mid-point, and below the specimen). The images are sequenced in order of capture from left to right in each row, from the top row to the bottom row. Note that the system in this manner automatically finds the specimen and collected equidistant images about the specimen, centered in the frame and aligned with the rotation so that near perfect head-on and side-on views are included. This comprehensive, near 360° capture of high resolution images for the insect specimen is acquired automatically and far more quickly (acquisition time of approximately 37 seconds) than could be acquired manually, even by a highly skilled operator.

Label Post Processing:

Label image acquisition is typically planned so as to acquire at least two images of the label, taken from opposite sides of the work piece pin. This ensures that any text obscured from one side is visible from the other, although in practice, most labels tend to be human readable even with but one captured image.

Having accurately located the label on the pin, the label images are typically acquired at an elevation angle of between 10 degrees and 45 degrees above the label plane. Based on the wire-frame model of the specimen work piece, system software executes to crop each image to the projected region containing the label. (See FIG. 42 (A1), (A2).) The system then preferably performs edge detection, finds the bounding lines of the label using a Hough transform, estimating corner locations from projected line intersections. (See FIG. 42 (B1), (B2).) Based upon these intersections, the system constructs a projective transform that maps each acquired image of the label to produce an approximation of the label as if were viewed flat (viewing down squarely from over top of the label; see FIG. 42 (C1), (C2)), then crops the flattened label image at its edges and saves the same. (See FIG. 42 (D1), (D2).)

Domain knowledge is used to limit the aspect ratio range of the final label image. The process is fully independent of label finding during 3-D scene segmentation, so it does not propagate any errors that may occur in those estimates. The system is robust, and the process is not, as a general matter, critically dependent on finding the label's exact orientation during 3-D scene segmentation. The result is normally human readable, and OCR ready. In test runs of the process, readable text from elevation angles as small as 10 degrees or less were recovered; hence, imaging multiple labels in a stack is readily achievable.

Figure 42:
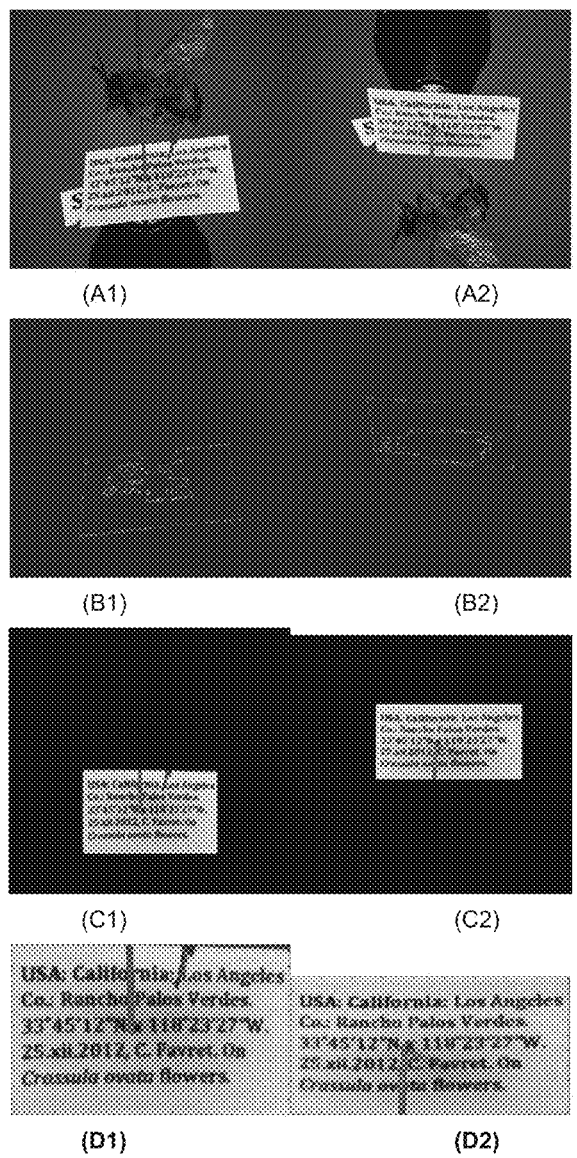
FIG. 42 is a set of photographic views illustrating label postprocessing for an insect specimen work piece adaptively executed by a system formed in accordance with an exemplary embodiment of the present invention; and, FIGS. 43-55 are flow charts illustrating different processing functions carried out by controlling software executed by a system formed in accordance with an exemplary embodiment of the present invention.

FIG. 42 illustrates a sequence of views of post processing steps applied sequentially top to bottom (A1), (A2) through (D1), (D2).

Figure 55:
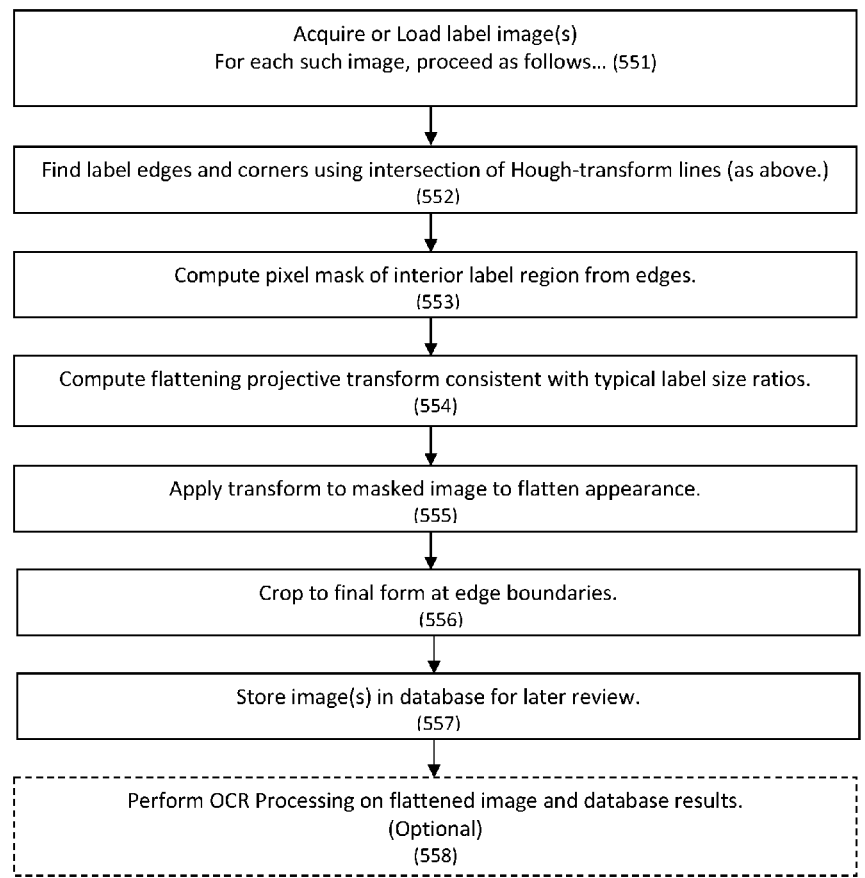

The flow chart shown in FIG. 55 illustrates a flow of processes in accordance with an exemplary embodiment of the present invention to carry out label post processing in this manner. At block 551, label images are captured at two or more view angles. At block 552, the physical edges and corners of the imaged label are found based on the intersection of Hough transform lines as described in preceding paragraphs. A pixel mask of the interior label region is computed from the edges at block 553. A suitable flattening projective transform is then applied at block 554 consistent with domain knowledge of typical label sizes. At block 555, the transform is applied to the masked image to flatten out its appearance. Then at block 556, the flattened image is cropped to final form at its edge boundaries. The cropped final form image is stored at block 557 for later review or, optionally, for OCR processing thereof at block 558.

Having understood the disclosed approach, systems, and methods, one may construct related systems and adopt the disclosed methods to other means of imaging and sensing and to handle myriad other classes of semi-uniform and non-uniform work piece specimens. The system and methods described herein will have broad application apparent to those skilled in the art once they have understood the present disclosure. Upon reviewing the novel combinations of elements disclosed in the specification and drawings disclosed herein, and the teachings relating thereto, it will be clear to those skilled in the art that there are numerous ways in which the disclosed systems and methods may be implemented and applied. The descriptions herein relates to the preferred modes and exemplary embodiments of the invention.

The descriptions herein are intended to illustrate possible implementations of the present invention and are not restrictive. It is contemplated that numerous variations and additional features and functions within the skill of the art may be incorporated to suit various applications, as well as to reflect and/or adapt to advances in operational technology. Preferably, the disclosed method steps and system units are programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims, along with their full range of equivalents.

What is claimed is:

1. A system for adaptively conformed imaging of work pieces having disparate configurations, comprising:
   a mount unit for holding at least one work piece;
   at least one imaging unit for capturing images of the work piece held by said mount unit;
   at least one manipulator unit coupled to selectively manipulate at least one of said mount and imaging units for relative angular displacement therebetween; and,
   a controller coupled to said manipulator and imaging units, said controller automatically actuating said manipulator and imaging units to acquire a plurality of reference images of the held work piece from different aspect angles, and to execute:
      a scene segmentation about the held work piece, wherein at least one zone of operation is spatially defined in peripherally conformed manner about the held work piece;
      feature discovery, wherein said reference images are processed to distinguish discrete features of the held work piece; and,
      an acquisition path mapping for the held work piece, wherein a sequence of spatially offset acquisition points are mapped within said zone of operation, each said acquisition point defining a vantage point from which said imaging unit thereafter captures an adaptive image of the held work piece.

2. The system as recited in claim 1, wherein said discrete features distinguished by said feature discovery include a mounting structure, and a specimen and label respectively mounted thereon.

3. The system as recited in claim 1, wherein said scene segmentation includes:
   three-dimensional alignment, wherein relative spatial orientations of said discrete features distinguished by said feature discovery are estimated with respect to at least one tie point between said reference images; and,
   scene modeling, wherein a three-dimensional frame model is generated for each of said discrete features and disposed according to said relative spatial orientations estimated by said three-dimensional alignment;
   wherein said zone of operation is maintained outside said three-dimensional frame models.

4. The system as recited in claim 3, wherein said three-dimensional frame models include an ellipsoid defining a peripheral envelope for said specimen and a rectangular box defining a peripheral envelope for said label.

5. The system as recited in claim 1, wherein said manipulator unit includes a robotic mechanism configured for multi-axis manipulation, said robotic mechanism holding at least one of said imaging unit and the work piece.

6. The system as recited in claim 1, wherein said imaging unit is of a sensing type selected from the group consisting of: photo-sensed imaging, laser line scanning, LIDAR scanning, moray pattern imaging, infrared-sensed imaging, ultra-violet-sensed imaging, radio frequency (RF) aperture sensed imaging, acoustic imaging, multi-spectral imaging, and hyper-spectral imaging.

7. A system for adaptively conformed imaging of work pieces having disparate configurations, comprising:
   a portable mount unit for holding at least one work piece in selectively manipulated manner, said mount unit including an angularly displaceable hub and a holding bracket slidably coupled thereto, wherein said holding bracket includes a manipulation base plate having said hub coupled thereto for selective rotation about a center axis, said bracket being configured for slidable displacement along a curved length thereof with respect to said hub;
   at least one portable imaging unit for capturing images of the work piece held by said mount unit;
   a control interface coupled to said mount and imaging units;
   a controller coupled by a communications link to said control interface, said controller automatically actuating said mount and imaging units through said control interface to acquire a plurality of reference images of the held work piece from different aspect angles, and to execute:
      a scene segmentation about the held work piece, wherein at least one zone of operation is spatially defined in peripherally conformed manner about the held work piece;
      feature discovery, wherein said reference images are processed to distinguish discrete features of the held work piece; and,
      an acquisition path mapping for the held work piece, wherein a sequence of spatially offset acquisition points are mapped within said zone of operation, each said acquisition point defining a relative vantage point from which said imaging unit captures an image of the held work piece.

8. The system as recited in claim 7, wherein the work piece includes at least a longitudinally extended pin and a specimen impaled thereon; and, a relative longitudinal distance between the work piece and said imaging unit is adjustable.

9. The system as recited in claim 8, wherein said mount unit includes at least one pin holder for securing the work piece, said pin holder including at least one of: a foam pin mount portion and a retractably clamping pin vice portion.

10. The system as recited in claim 7, wherein:
said mount unit includes at least one pin holder for securing at least one work piece thereto;
said controller actuates a three-dimensional scene segmentation about the held work piece; and,
the reference images are processed to distinguish discrete features including at least a pin and a specimen impaled thereon.

11. The system as recited in claim 10, wherein said acquisition path mapping includes mapping a constellation of spatially offset acquisition points about the held work piece within said zone of operation, each said acquisition point defining one said vantage point.

12. The system as recited in claim 7, wherein said scene segmentation includes:
three-dimensional alignment, wherein relative spatial orientations of said discrete features distinguished by said feature discovery are estimated with respect to at least one tie point between said reference images; and,
scene modeling, wherein a three-dimensional frame model is generated for each of said discrete features and disposed according to said relative spatial orientations estimated by said three-dimensional alignment, said three-dimensional frame models include an ellipsoid defining a peripheral envelope for said specimen and a rectangular box defining a peripheral envelope for said label;
wherein said zone of operation is maintained outside said three-dimensional frame models.

13. The system as recited in claim 12, wherein said control interface is remotely disposed from said controller, and linked thereto by a wireless communications link.

14. A method for adaptively conformed imaging of work pieces having disparate configurations, comprising:
securing at least one work piece on a mount unit;
establishing at least one imaging unit for capturing images of the work piece held by said mount unit;
establishing at least one manipulator unit to selectively manipulate at least one of said mount and imaging units for relative angular displacement therebetween; and,
actuating a controller coupled to said manipulator and imaging units to automatically actuate said manipulator and imaging units to acquire a plurality of reference images of the held work piece from different aspect angles;
actuating said controller to execute:
a scene segmentation about the held work piece, wherein at least one zone of operation is spatially defined in peripherally conformed manner about the held work piece;
feature discovery, wherein said reference images are processed to distinguish discrete features of the held work piece; and,
an acquisition path mapping for the held work piece, wherein a sequence of spatially offset acquisition points are mapped within said zone of operation, each said acquisition point defining a vantage point from which said imaging unit thereafter captures an adaptive image of the held work piece.

15. The method as recited in claim 14, wherein said scene segmentation includes:
three-dimensional alignment, wherein relative spatial orientations of said discrete features distinguished by said feature discovery are estimated with respect to at least one tie point between said reference images; and,
scene modeling, wherein a three-dimensional frame model is generated for each of said discrete features and disposed according to said relative spatial orientations estimated by said three-dimensional alignment;
wherein said zone of operation is maintained outside said three-dimensional frame models.

16. The method as recited in claim 14, wherein:
said discrete features distinguished by said feature discovery include a pin, and a specimen, and label respectively impaled thereon; and,
said three-dimensional frame models include an ellipsoid defining a peripheral envelope for said specimen and a rectangular box defining a peripheral envelope for said label.

17. The method as recited in claim 14, wherein said acquisition path mapping includes mapping a constellation of spatially offset acquisition points about the held work piece within said zone of operation, each said acquisition point defining one said vantage point.

18. The method as recited in claim 14 wherein said control interface is remotely disposed from said controller, and linked thereto by a wireless communications link.

* * * * *